US006522650B1

(12) United States Patent
Yonge, III et al.

(10) Patent No.: US 6,522,650 B1
(45) Date of Patent: Feb. 18, 2003

(54) MULTICAST AND BROADCAST TRANSMISSION WITH PARTIAL ARQ

(75) Inventors: Lawrence W. Yonge, III, Ocala, FL (US); Stanley J. Kostoff, II, Ocala, FL (US)

(73) Assignee: Intellon Corporation, Ocala, FL (US)

( * ) Notice: Subject to any disclaimer, the term of this patent is extended or adjusted under 35 U.S.C. 154(b) by 0 days.

(21) Appl. No.: 09/632,595

(22) Filed: Aug. 4, 2000

(51) Int. Cl.[7] .............................................. H04L 12/28
(52) U.S. Cl. ....................... 370/390; 370/445; 714/748
(58) Field of Search ................................. 370/389, 390, 370/445; 714/748, 749

(56) References Cited

U.S. PATENT DOCUMENTS

| 4,720,850 | A | * | 1/1988 | Oberlander et al. ........... 379/90 |
| 5,473,602 | A | | 12/1995 | McKenna et al. ........... 370/256 |
| 5,537,414 | A | * | 7/1996 | Takiyasu et al. ............ 370/347 |
| 5,629,948 | A | * | 5/1997 | Hagiwara et al. ............ 714/748 |
| 5,636,230 | A | * | 6/1997 | Marturano et al. ............ 371/32 |
| 5,717,689 | A | * | 2/1998 | Ayanoglu .................... 370/349 |
| 5,790,541 | A | | 8/1998 | Patrick et al. .............. 370/392 |
| 5,828,677 | A | * | 10/1998 | Sayeed et al. ................. 371/41 |
| 5,970,062 | A | | 10/1999 | Bauchot ..................... 370/345 |
| 5,987,011 | A | | 11/1999 | Toh ........................... 370/331 |
| 6,125,150 | A | | 9/2000 | Wesel et al. ................. 375/265 |
| 6,278,716 | B1 | * | 8/2001 | Rubenstein et al. ......... 370/432 |
| 6,182,147 | B1 | * | 1/2002 | Farinacci .................... 709/238 |

OTHER PUBLICATIONS

U.S. Application Ser. No. 09/455,186.
U.S. Application Ser. No. 09/445,110.
U.S. Application Ser. No. 09/377,131.

ISO/IEC 8802–3: 1996 International Standard (ANSI/IEEE Std 802.3) Carrier sense multiple access with collision detection (CSMA/CD) access method and physical layer specifications.
ISO/IEC 8802–11: 1999 International Standard (ANSI/IEEE Std 802.11) Wireless LAN Medium Access Control (MAC) and Physical Layer (PHY) specifications.
Shared Wireless Access Protocol (cordless Access) Specification, SWAP–CA Revision 1.21, Jan. 27, 1999, by the HomeRF™ Technical Committee.
Interface Specification for HomePNA™ 2.0—10M8 Technology, Dec. 1, 1999.
Interface Specification for HomePNA™ 2.0—10M8 Technology—Link Layer Protocols, Dec. 1, 1999.

* cited by examiner

*Primary Examiner*—Min Jung
(74) *Attorney, Agent, or Firm*—Fish & Richardson P.C.

(57) ABSTRACT

A partial ARQ protocol for multicast and broadcast transmissions in network devices operating in a shared medium access network. To support the partial ARQ, a media access control (MAC) protocol uses robustly transmitted frame delimiters and a MAC management frame structure. In a multicast or broadcast frame with partial ARQ, a destination address field is set to that of a selected proxy device's address, and the address of the intended recipients (of group address of the intended recipients) is placed in an entry in the MAC management frame structure. The frame also contains a multicast flag set to indicate that the transmission is intended for more than one device and a value in the frame delimiters to indicate that a response is requested. Upon receipt of such a frame, the proxy device specified by the destination address field provides an appropriate response type on behalf of the group. The non-proxy recipients, detecting the multicast flag setting, know to ignore the DA in the destination address field and instead look to the MAC management entry for actual destination addresses.

26 Claims, 48 Drawing Sheets

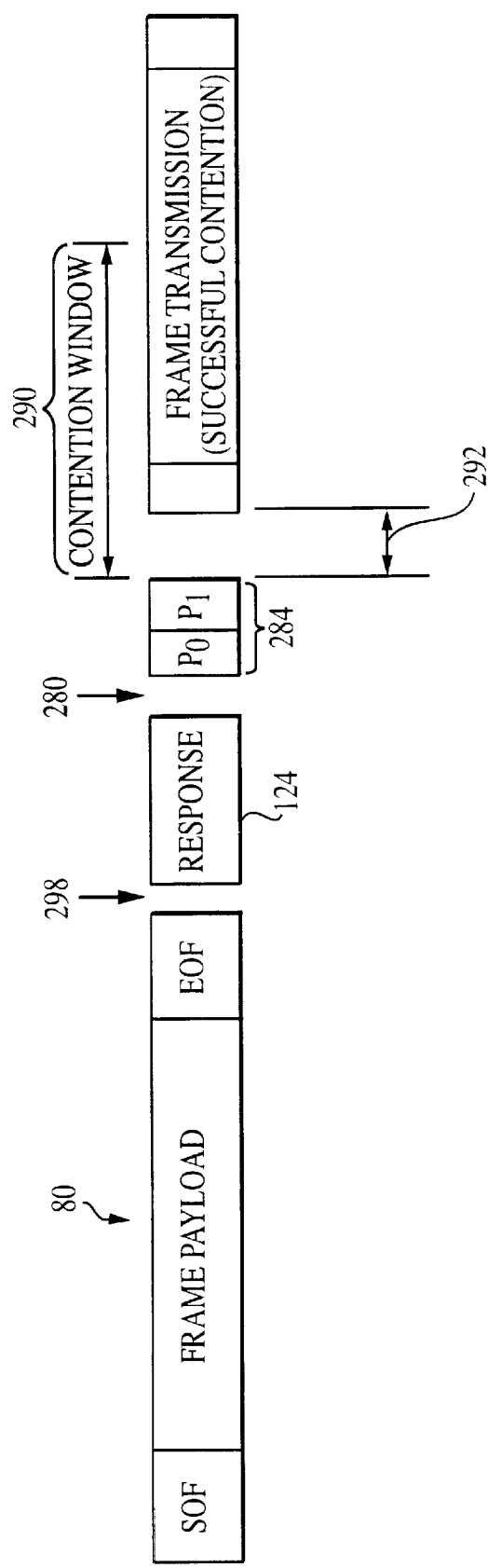
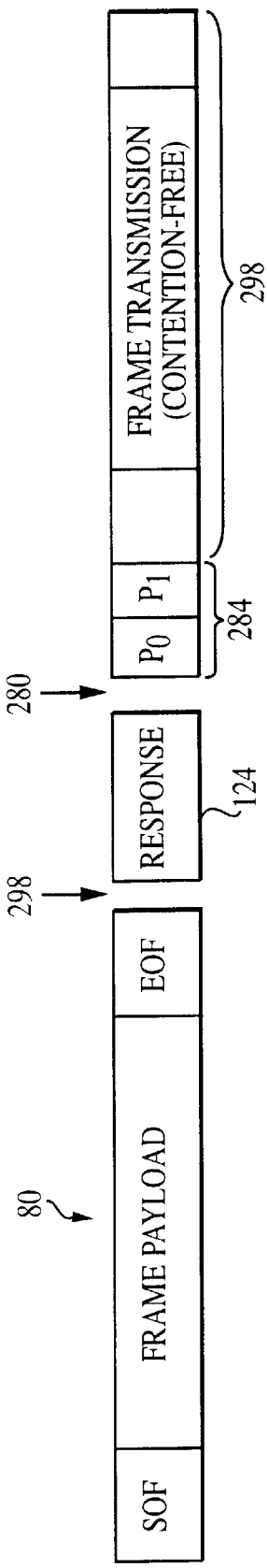
FIG. 19C
FIG. 19D

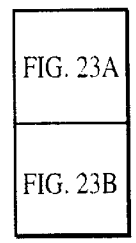
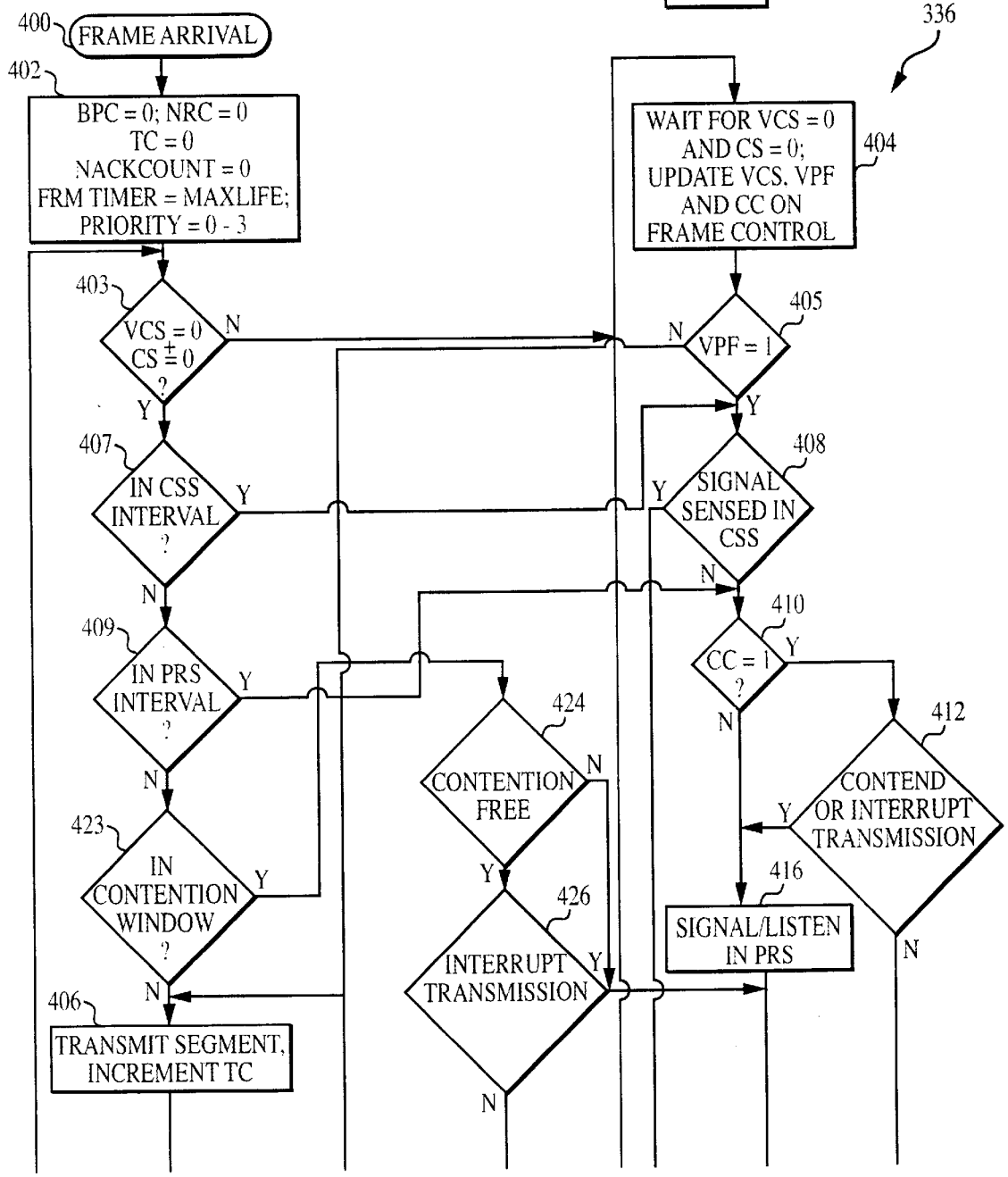
FIG. 23

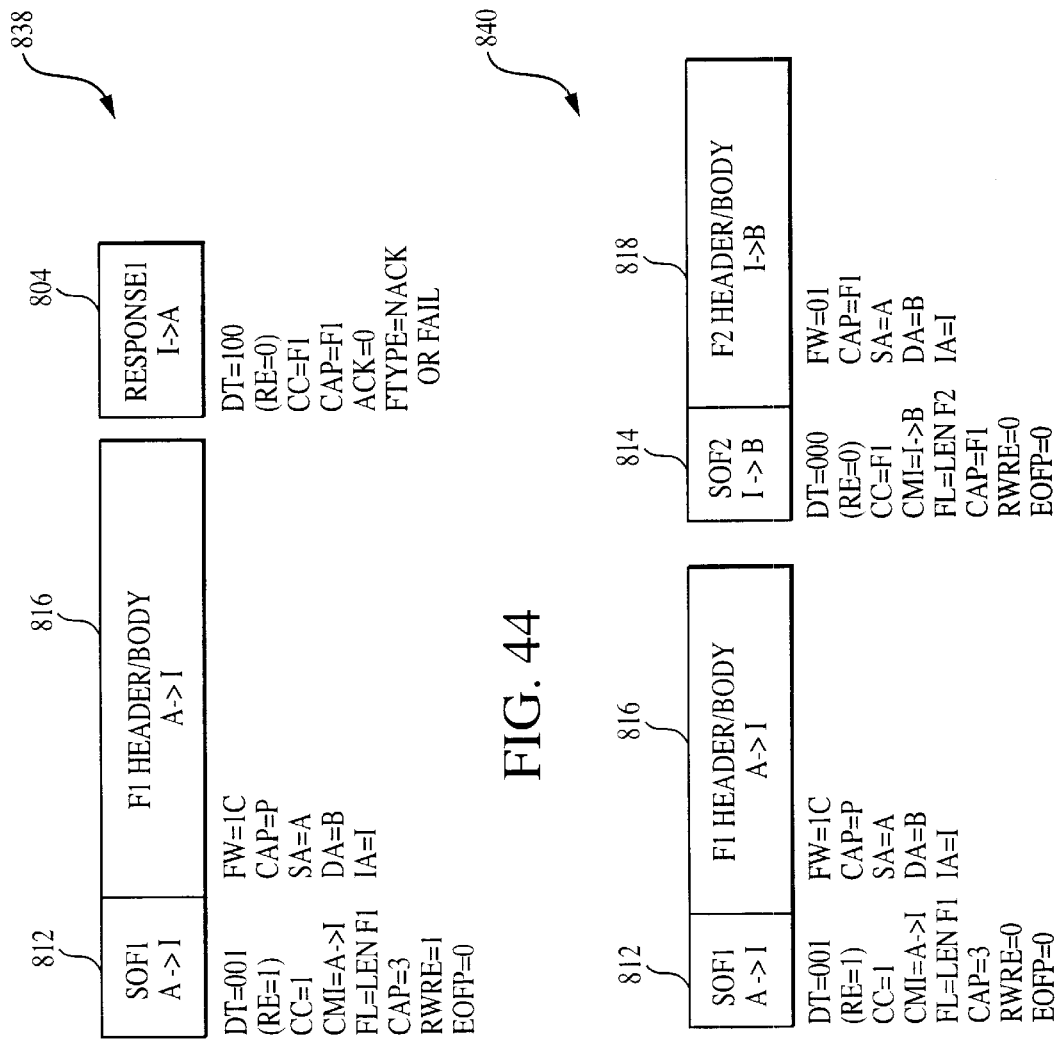

MULTICAST AND BROADCAST TRANSMISSION WITH PARTIAL ARQ

TECHNICAL FIELD

The invention relates to Medium Access Control (MAC) protocols in CSMA networks.

BACKGROUND

A protocol known as the Automatic Repeat request (ARQ) protocol may be defined as any protocol that uses positive or negative acknowledgments with retransmission techniques to ensure reliability. A transmitting station automatically repeats a transmission if it receives a negative acknowledgment or no response at all when a response was expected. Standard ARQ schemes can be used by unicast transmissions that involve only one destination and thus one response. Typically, transmissions involving more than one destination, such as multicast and broadcast transmissions, do not use standard ARQ mechanisms because the medium would be flooded with response-related traffic, causing overall network performance to suffer.

SUMMARY

In one aspect of the invention, operating in a network of devices connected to a shared transmission medium includes selecting one of the devices and indicating in a frame to be transmitted onto the shared medium in the frame transmission to intended recipients that a response is expected and that the selected device is to provide the response.

Embodiments of the invention may include one or more of the following features.

Selecting can include selecting the device from among those of the devices that correspond to the intended recipients. Indicating can include specifying in the frame an address of the selected device as a destination address. Indicating can further include a multicast flag for indicating that the frame transmission is intended for more than one recipient. Indicating can further include MAC management information for indicating actual destination addresses of the intended recipients of the frame transmission. Indicating can further include MAC management information for indicating a group address associated with the actual destination addresses of the intended recipients of the frame transmission.

The frame transmission may be a multicast transmission.

The frame transmission may be a broadcast transmission.

The selected device can be a station or, alternatively, a bridge.

Selecting can include identifying which of the devices is least likely to receive the frame transmission. Identifying can include using channel maps for the devices to determine which of the channel maps supports a lowest data rate.

Alternatively, selecting can include selecting the proxy in a random manner.

Among the advantages of the present invention are the following. The "partial ARQ" mechanism increases reliability of a multicast or broadcast transmission at the MAC. It allows one member of a group of intended recipients, or, alternatively, any device connected to the same network medium, to acknowledge a transmission directed to the group of intended recipients as a proxy for the group. Although partial ARQ does not guarantee delivery to the entire group, it provides an indication that the transmission was received by at least one device on the same network. The proxy can be chosen as the device least likely to receive the transmission (and therefore representing the worst-case transmission path), thus improving reliability of the partial ARQ mechanism itself.

Other features and advantages of the invention will be apparent from the following detailed description and from the claims.

DESCRIPTION OF DRAWINGS

FIGS. 19C and 19D are depictions of response frame transmissions utilizing priority and contention-based access (FIG. 19C) and priority and contention-free access (FIG. 19D).

FIG. 44 is a depiction of a forwarding frame structure that uses the start delimiter frame control field of FIG. 42 for frame forwarding with response and a NACK or FAIL occurring after a first frame.

FIG. 45 is a depiction of a forwarding frame structure that uses the start delimiter frame control field of FIG. 42 for frame forwarding with no response.

DETAILED DESCRIPTION

Figure 1:
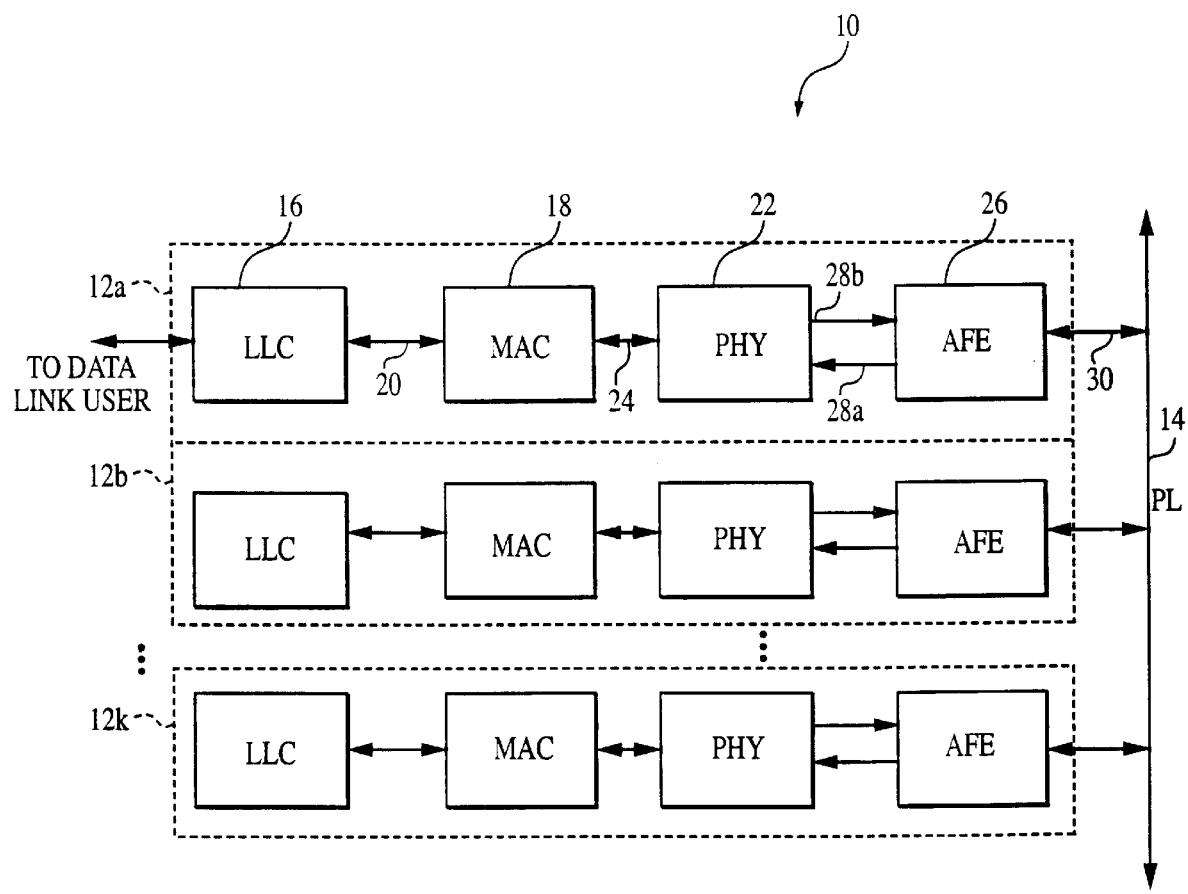
FIG. 1 is a block diagram of a network of network stations coupled to a transmission channel, each of the stations in the network including a media access control (MAC) unit and a physical layer (PHY) device.

Referring to FIG. 1, a network 10 includes network stations 12a, 12b . . . 12k coupled to a transmission medium or channel 14, e.g., a power line (PL), as shown. During a communication between at least two of the network stations 12 over the transmission medium 14, a first network station, for example, 12a, serves as a transmitting network station (or transmitter) and at least one second network station, for example, 12b, serves as a receiving network station (or receiver). Each network station 12 includes a Logical Link Control (LAC) unit 16 for connecting to a Data Link User, e.g., an end device such as a host computer, cable modem, or other device (not shown). The network station 12 further includes a media access control (MAC) unit 18 connected to the LAC unit 16 by a data interface 20, a physical layer (PHY) unit 22 connected to the MAC unit 18 by a MAC-to-PHY I/O bus 24 and an analog front-end (AFE) unit 26. The AFE unit 26 connects to the PHY unit 22 by separate AFE input lines 28a and output lines 28b, as well as connects to the transmission medium 14 by an AFE-to-PL interface 30. Each station 12 represents any combination of hardware, software and firmware that appears to other stations as a single functional and addressable unit on the network.

Generally, the LLC, MAC and PHY units conform to the Open System Interconnect (OSI) Model. More particularly, the LLC and MAC units conform to the OSI Model's data link layer and PHY layer unit to the OSI Model's physical layer. The MAC unit 18 performs data encapsulation/decapsulation, as well as media access management for transmit (TX) and receive (RX) functions. Preferably, the MAC unit 18 employs a collision avoidance medium access control scheme like carrier sense multiple access with collision avoidance (CSMA/CA) as described by the IEEE 802.11 standard, although other suitable MAC protocols of the collision avoidance type or other MAC protocol types may be used. For example, Time Division Multiple Access (TDMA) schemes may be used. The MAC unit 18 also provides Automatic Repeat request (ARQ) protocol support. The PHY unit 22 performs transmit encoding and receive decoding, among other functions, as described more fully below. The AFE unit 26 provides for attachment to the transmission medium 14. The AFE unit 26 may be implemented in any manner and therefore will be discussed no further herein.

The unit of communication exchanged between stations is in the form of a frame or packet. As used herein, the terms "frame" and "packet" both refer to a PHY layer protocol data unit (PDU). A frame may include data (i.e., payload) in conjunction with a delimiter, or a delimiter by itself, as will be discussed. The delimiter is a combination of preamble and frame control information. The data and frame control information are received from the MAC unit 18, but are handled differently by the PHY unit 22, as will be described below with reference to FIG. 2. Frame and delimiter structures will be described in further detail with reference to FIGS. 3–6.

Figure 2:
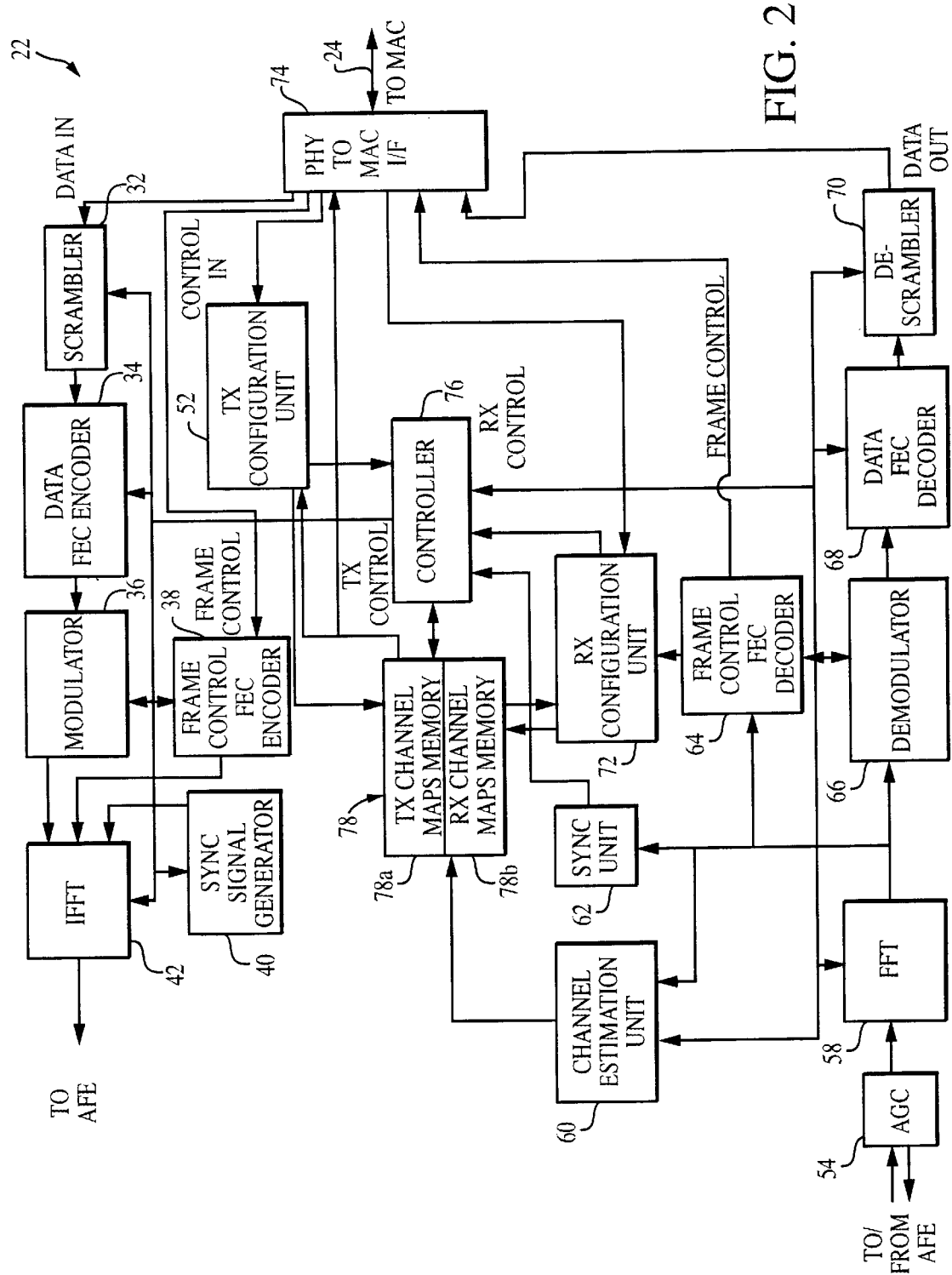
FIG. 2 is a detailed block diagram of the PHY device (shown in FIG. 1).

Referring to FIG. 2, the PHY unit 22 performs both TX and RX functions for a single station. To support TX functions, the PHY unit 22 includes a scrambler 32, a data FEC encoder 34 (for encoding the data received from the MAC unit 18), a modulator 36, a frame control FEC encoder 38 for encoding frame control information, a synchronization signal generator 40, (for defining a preamble signal used for automatic gain control and synchronization) and an IFFT unit 42. Conventional post-IFFT devices are omitted for purpose of simplification. The post-IFFT devices may include, for example, a cyclic prefix block with raised cosine windowing and a peak limiter, as well as output buffering. Also included is a TX configuration unit 52. To support RX functions, the PHY unit 22 includes an automatic gain control (AGC) unit 54, an FFT unit 58, a channel estimation unit 60, a synchronization unit 62, a frame control FEC decoder 64, a demodulator 66, a data FEC decoder 68, a descrambler 70, and an RX configuration unit 72. Included in the PHY unit 22 and shared by both the transmit and receive functions are a MAC interface 74, a PHY controller 76 and a channel maps memory 78. The channel maps memory 78 includes a TX channel maps memory 78*a* and an RX channel maps memory 78*b*.

During a data transmit process, data and control information are received at the PHY-to-MAC interface (MAC interface) 74 over the PHY-to-MAC bus 24. The MAC interface provides the data to the scrambler 32, which ensures that the data as presented to the input of the data FEC encoder 34 are substantially random in pattern. The data FEC encoder 34 encodes the scrambled data pattern in a forward error correction code and subsequently interleaves the encoded data. Any forward error correction code, for example, a Reed-Solomon, or both a Reed-Solomon code and a convolution code, can be used for this purpose. The modulator 36 reads the FEC encoded data and FEC encoded control information from the frame control FEC encoder 38, and modulates the encoded data and control information onto carriers in OFDM symbols in accordance with conventional OFDM modulation techniques. Those modulation techniques may be coherent or differential. The modulation mode or type may be Binary Phase Shift Keying with □ rate coding (□□ BPSK□), Quadrature Phase Shift Keying with □ rate coding (□ QPSK□□), QPSK with ¾ rate coding (□¾ QPSK□), among others. The IFFT unit 42 receives input from the modulator 36, the frame control FEC encoder 38 and synchronization signal generator 40, and provides processed data to post IFFT functional units (not shown), which further process the contents of the frame before transferring it to the AFE unit 26 (from FIG. 1).

The TX configuration unit 52 receives the control information from the PHY-to-MAC I/F 74. This control information includes information about the channel over which data is to be transmitted from the MAC interface 74. The TX configuration unit 52 uses this information to select an appropriate channel (or tone) map from the TX channel maps memory 78*a*. The selected channel map specifies a transmission mode, as well as a modulation type (including an associated coding rate) for all carriers (or, alternatively, for each of the carriers) and set of carriers to be used for the transmission of the data, and therefore specifies OFDM symbol block sizes (both fixed and variable) associated with the data transmission. An OFDM symbol block includes a plurality of symbols and may correspond to a frame or a portion thereof. The TX configuration unit 52 generates TX configuration information from the channel map data. The TX configuration information includes transmission mode, modulation type (including an associated FEC coding rate) for the set of carriers or each carrier, number of symbols and number of bits per symbol. The TX configuration unit 52 provides the TX configuration information to the PHY controller 76, which uses the information to control the configuration of the data FEC encoder 34. In addition to configuration control signals, the controller 76 also provides other conventional control signals to the data FEC encoder 34, as well as the scrambler 32, the modulator 36, the frame control FEC encoder 38, the synchronization signal generator 40 and the IFFT unit 42.

The frame control FEC encoder 38 receives from the MAC via the PHY-to-MAC Interface unit 74 frame control information to be included in the delimiter, such as delimiter type, e.g., start (start-of-frame or "SOF"), end (end-of-frame or "EOF"), and other information appropriate to the type. For example, if the delimiter is a start delimiter, a channel map index for conveying the transmission mode and other information, and the number of OFDM symbols (to be transmitted) in a frame are provided for use by the receiving station 12*b*.

During a data receive process, OFDM frames transmitted over the channel to the receiving network node 12*b* by the transmitting network node 12*a* are received at the PHY unit 22 from the AFE unit 26 by the AGC unit 54. The output of the AGC unit 54 is processed by the FFT unit 58. The output of the FFT unit 58 is provided to the channel estimation unit 60, the synchronization unit 62, the frame control FEC decoder 64 and the demodulator 66. More specifically, phase and amplitude values of the processed receive data are provided to the channel estimation unit 60, which produces a new channel map that may be sent over the channel to the transmitting network station 12*a*. The channel map is then used by both stations for subsequent communications with each other in the same transmissions direction (that is, when station 12*a* is transmitting packet information to station 12*b* and station 12*b* is receiving packet information transmitted by station 12*a*). The RX configuration unit 72 receives the channel map index and the number of OFDM symbols from the frame control FEC decoder 64, retrieves from the RX channel map 78*b* the channel map specified by the channel map index provided by the frame control FEC decoder 64, and provides RX configuration information (derived from the channel map parameters) to the controller 76. The RX configuration information is used to configure the data FEC decoder 68 and thus includes block size and other information necessary for decoding the frame. The synchronization unit 62 provides a start-of-frame signal to the controller 76. In response to these inputs, the controller 76 provides configuration and control signals to the data FEC decoder and to the demodulator 66. For example, it conveys the modulation type associated with the received data to the demodulator 66.

The demodulator 66 demodulates the OFDM symbols in the processed data received from the FFT unit 58 and converts phase angles of the data in each carrier of each symbol to metric values, which are used by the data FEC decoder for decoding purposes. The data FEC decoder 68 corrects bit errors occurring during transmission from the data FEC encoder 34 (of a transmitting node) to the data FEC decoder 68, and forwards the decoded data to the de-scrambler 70, which performs an operation that is the reverse of that which did the scrambler 32 perform. The output of the de-scrambler 70 is then provided to the MAC interface unit 74 for transfer to the MAC unit 18.

The frame control FEC decoder 64 receives coded frame control information from the FFT 58 and control signals from the controller 76. The frame control FEC decoder 64 uses these inputs to decode and demodulate the frame control information in the frame delimiter. Once decoded and demodulated, the frame control information is passed to the MAC interface unit 74 for transfer to the MAC unit 18. The MAC unit 18 determines from the information if the delimiter indicates a start-of-frame. If a start-of-frame is indicated, the RX configuration unit receives from the MAC unit 18 frame control information (channel map index and length) to indicate that further decoding is necessary and the RX configuration unit uses the frame control information to direct the controller to configure the receiver units for further decoding.

For purposes of simplification and clarity, other details of the PHY unit□s transmitter/receiver functional units (which are known to those skilled in the art and not pertinent to the invention) have been largely omitted herein.

Figure 3:
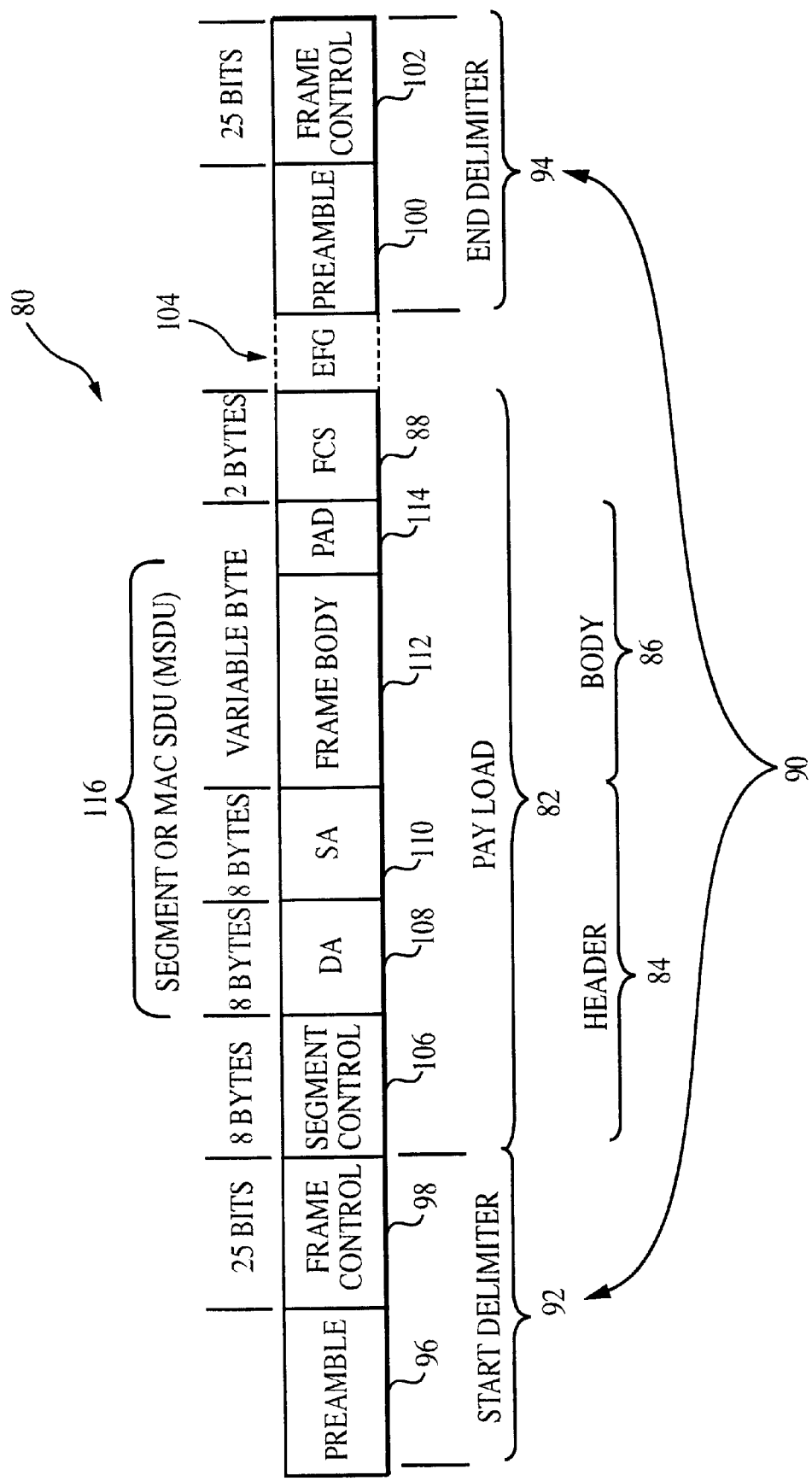
FIG. 3 is a depiction of the format of an OFDM frame, including a start delimiter followed by a payload and an end delimiter.

Referring to FIG. 3, a format of a data transmission frame 80 to be transmitted over the transmission medium 14 by the transmitting network station 12a is shown. The data transmission frame 80 includes a payload 82, which carries the data received from the MAC unit 18. This data includes a header 84, body 86 and frame check sequence (FCS) 88. Preferably, the payload 82 is transmitted and received by the functional units illustrated in FIG. 2 in accordance with techniques described in co-pending U.S. patent application Ser. No. 09/455,186, entitled "Forward Error Correction With Channel Estimation," in the name of Lawrence W. Yonge III et al., co-pending U.S. patent application Ser. No. 09/455,110, entitled "Enhanced Channel Estimation," in the name of Lawrence W. Yonge III et al., and U.S. Pat. No. 6,278,685, entitled "Robust Transmission Mode," in the name of Lawrence W. Yonge III et al., all of which are incorporated herein by reference; however, other techniques may be used. The aforementioned U.S. Pat. No. 6,278,685 ("Robust Transmission Mode") describes a standard mode and a reduced data rate robust mode (hereinafter, simply referred to as "ROBO mode"), the ROBO mode providing for extensive diversity (in time and frequency) and data redundancy to improve the ability of the network stations to operate under adverse conditions.

Still referring to FIG. 3, the frame 80 further includes one or two delimiters 90, referred to more generally as delimiter information. The delimiter information 90 includes a delimiter that precedes the payload 82, that is, a start (or SOF) delimiter 92. Preferably, in addition to the start delimiter 92, the delimiter information 90 includes a delimiter that follows the payload 82, i.e., an end (or EOF) delimiter 94. The start delimiter 92 includes a first preamble 96 and a first frame control field 98. The end delimiter 94 includes a second preamble 100, as well as a second frame control field 102. The preambles 96, 100 are multi-symbol fields used to perform or enable automatic gain control, time and frequency based synchronization and physical carrier sensing. The preambles 96, 100 may be the same length or different lengths. An EFG 104 separates the end delimiter 94 and the payload 82. The inclusion of the EFG 104 in the frame 80 is optional.

With continuing reference to FIG. 3, the header 84 includes a Segment Control field 106, a Destination Address (DA) 108 and a Source Address (SA) 110. The SA and DA fields (6 bytes each) are the same as the corresponding fields described in the IEEE Std. 802.3. Each address is in an IEEE 48-bit MAC address format.

The body 86 includes a frame body 112 and a pad field 114. Collectively, fields 108, 110 and 112 represent a segment of or an entire MAC Service Data Unit (MSDU) 116. The MSDU thus refers to any information that the MAC layer has been tasked to transport by upper OSI layers (those OSI layers to which the MAC layer provides services), along with any MAC management information provided by the MAC layer. The last segment of a frame may require padding to ensure that the segment fills an entire OFDM block. Thus, the pad field 114 provides zeros between the Segment data bits and the FCS 88 at the end of the segment. The FCS 88 is a 16-bit CRC computed as a function of the contents of all fields starting with the first bit of the Segment Control field 106 through the last bit of the pad field 114. Alternatively, the pad field 114 may be located after the FCS 88, in which case the pad field 114 is excluded from the FCS computation.

The payload 82 has a maximum length in time (for latency considerations) and a varying byte capacity determined by length and channel conditions. Therefore, the payload 82 may have the capacity to contain an entire MSDU or only a segment of the MSDU. A "long" frame includes the delimiters 92, 94, as well the payload 82. Both the header 84 and the FCS 88 are transmitted in cleartext (i.e., unencrypted), while a portion of the body 86 may be encrypted as an option. The payload fields are presented to the PHY unit 22 most significant byte first, most significant bit (MSB) first (bit number 7 being the MSB of a byte). The long frame, with a start delimiter, payload and end delimiter, is used to convey MSDU information in the form of unicast or multicast transmissions.

Figure 4:
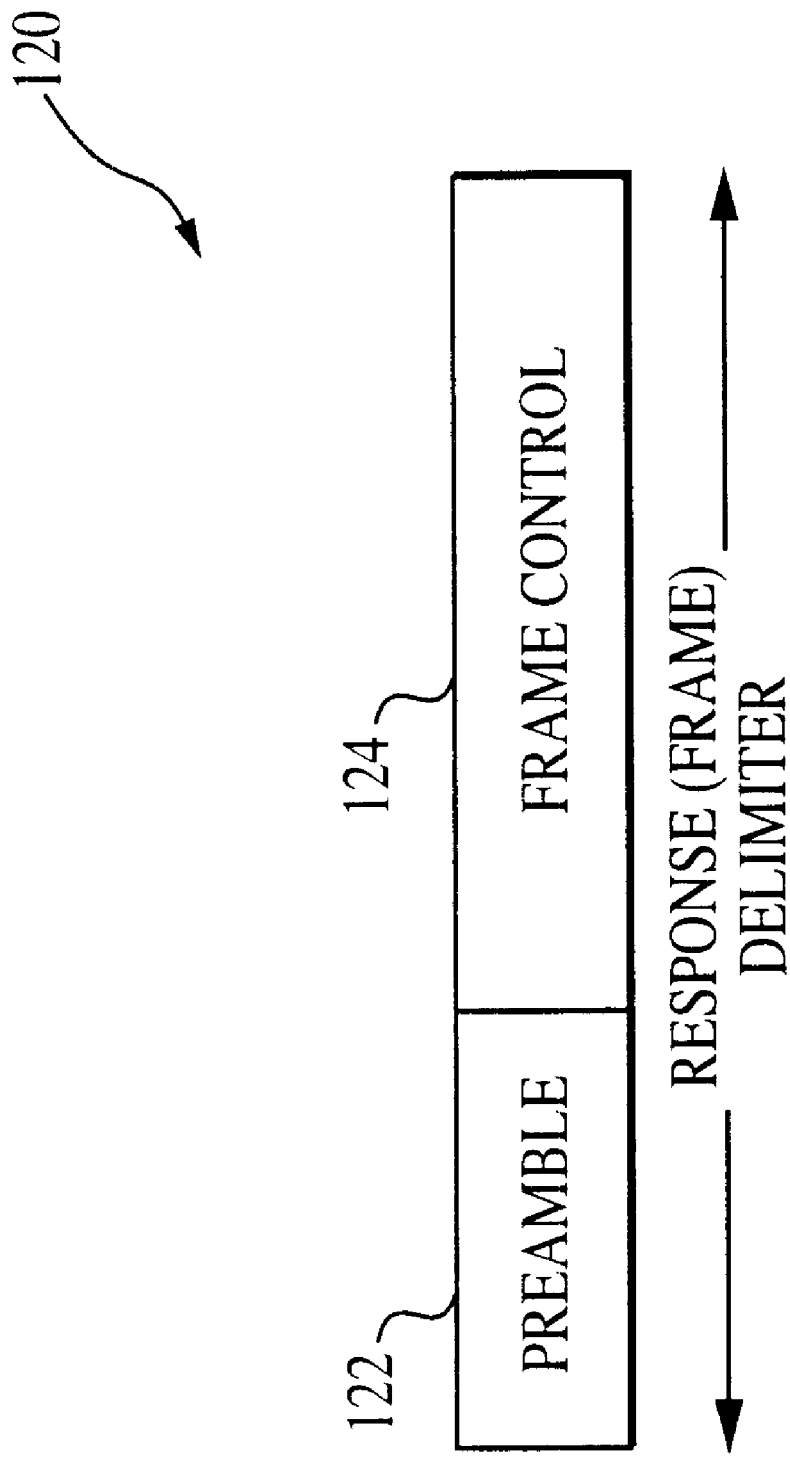
FIG. 4 is a depiction of the format of a delimiter of a response frame.

Although FIG. 3 illustrates delimiters encapsulating a frame payload of a data transmission frame, a delimiter can occur alone, e.g., when used as a response for the MAC ARQ scheme. Referring to FIG. 4, a response delimiter 120 includes a third preamble 122 and a third frame control field 124. A frame that includes only a delimiter, that is, the delimiter that is transmitted separately from a data transmission frame, and is used by a receiving station to respond to a data transmission frame for which a response is expected is referred to herein as a "short" frame.

Other exemplary delimiters may be associated with other types of "short" frames used to gain access to the channel, for example, "request-to-send" (RTS) frames, which may be used to reduce overhead caused by collisions occurring during heavy traffic conditions and thus improve network efficiency. The delimiter may be of a type that includes the kind of management information required. by other media access mechanisms, such as TDMA (commonly used for isochronous traffic), and thus need not be contention-oriented. For example, a TDMA network transmission could include a beacon type of delimiter (beacon delimiter) to maintain network synchronization and manage when each node should transmit and receive frames.

The first frame control field 98, the second frame control field 102 and the third frame control field 124 are produced by the frame control FEC encoder 38 in conjunction with the modulator 36 based on control information received from the MAC unit 18. Generally, the frame control fields 98, 102 and 124 include information used by all stations in the network for channel access, and, in the case of frame control field 98, information used by the destination for receiver demodulation. Because the frame control fields 98, 102 and 124 are intended to be heard by all stations, it is desirable for the frame control fields 98, 102 and 124 to have a robust form of physical layer encoding and modulation. Preferably, they are protected from transmission errors by a block code enhanced with time and frequency domain interleaving, as well as redundancy in accordance with techniques described in a co-pending U.S. application Ser. No. 09/574,959, entitled "Frame Control Encoder/Decoder for Robust OFDM Frame Transmissions," in the name of Lawrence W. Yonge III, incorporated herein by reference, although other techniques may be used.

Generally, the MAC unit 18 supports standard MAC functions, such as framing. It also ensures Quality of Service through a number of different mechanisms. The CSMA/CA protocol is optimized for a multi-level priority scheme that controls delay for data types requiring better than best effort delivery. Four contention-based access priority levels are supported. Each transmission wishing to contend need only contend with other transmissions of equal priority. Although only four levels are described, the priority scheme could be extended to include additional priority levels. Additionally, the MAC unit 18 provides for contention-free access, enabling a station to maintain or direct control of medium access, relinquishing ownership only to higher priorities. Segmentation is used to limit the amount of time that the channel is unavailable to higher priority traffic and thus bound delay for higher priority traffic.

In addition, the MAC unit 18 enables station frame forwarding so that a station that wishes to communicate with another station on the network can do so indirectly (via another, intermediate station), as well as bridging between the network 10 and other networks.

The MAC unit 18 further provides for reliable frame delivery. It supports rate adaptive PHY characteristics and channel estimation control between each transmitter/receiver to establish PHY modulation parameters that are optimized for channel conditions in each direction. Also, ARQ is used to ensure delivery for unicast transmissions. The receipt of certain frame types requires acknowledgment by the receiver and ARQ uses different types of acknowledgments. The acknowledgment can be positive or negative depending on the status of the received frame. A correctly addressed frame with a valid PHY frame Check Sequence causes the receiver to transmit a positive acknowledgment (or "ACK") response to the originator. Transmitting stations attempt error recovery by retransmitting frames that are known or are inferred to have failed. Failures occur due to collisions or bad channel conditions, or lack of sufficient resources at the receiver. Transmissions are known to have failed if a "NACK" (in the case of bad channel conditions) or "FAIL" (in the case of insufficient resources) response is received. Transmissions are inferred to have failed for some other reason (for example, due to collisions) if no response is received when one is expected.

In addition to the unicast ARQ, a "partial ARQ" is used for increased reliability of multicast and broadcast transmissions at the MAC level. The "partial ARQ" allows a transmitter to know that at least one station received the frame.

The MAC unit 18 also provides privacy on a shared medium through encryption, as will be described.

These and other features are supported by the frame structure detailed in FIGS. 5 through 18 to follow.

Figure 5A:
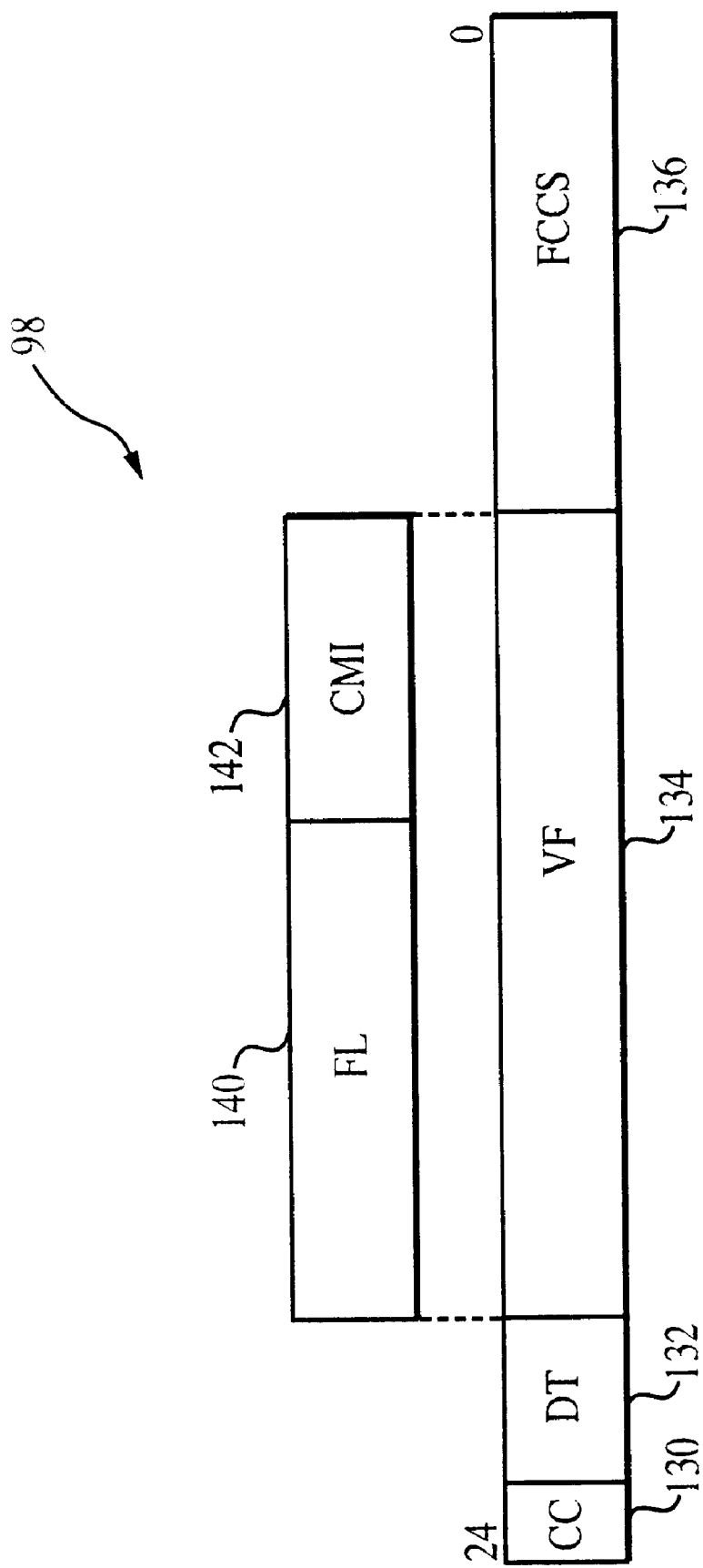
FIG. 5A is a depiction of the format of a frame control field in the start delimiter (of FIG. 3).
Figure 5B:
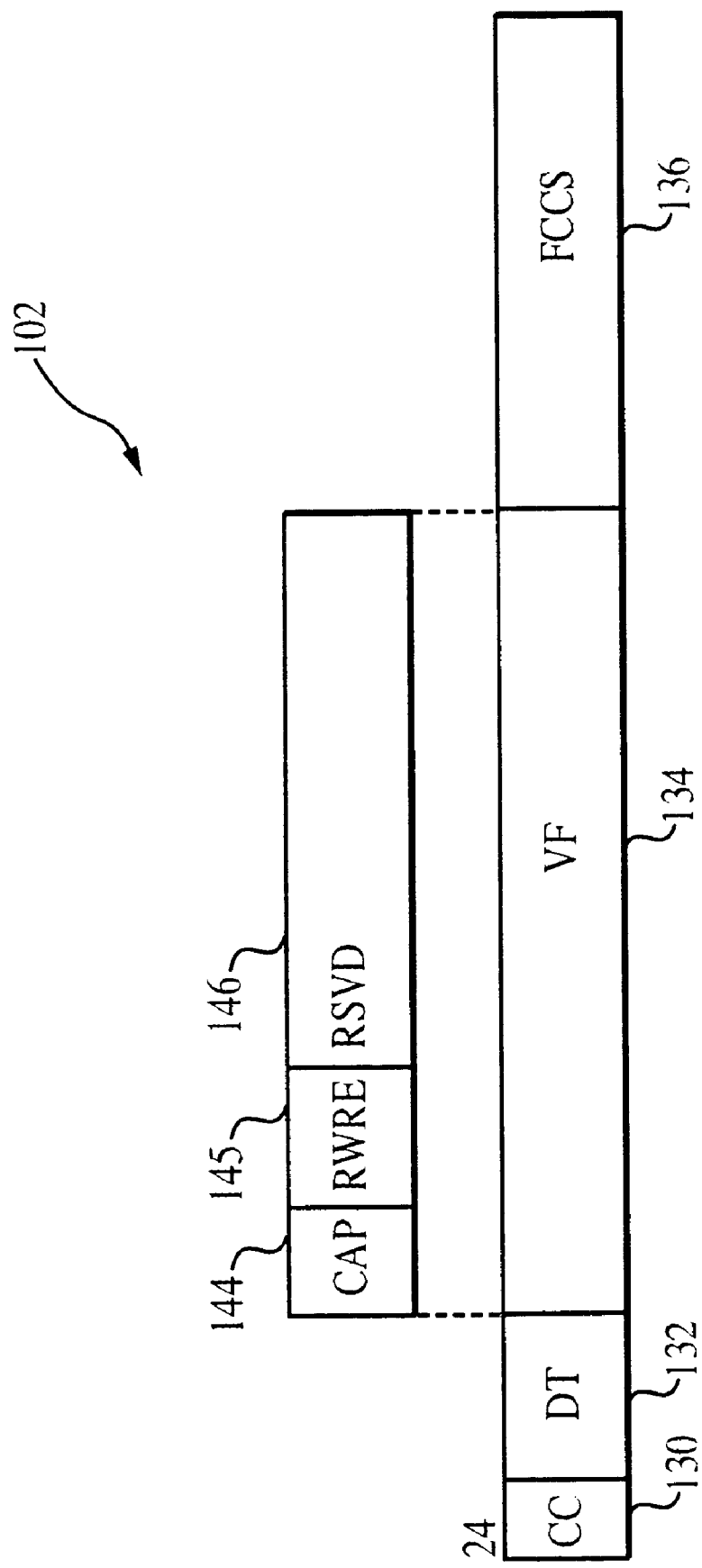
FIG. 5B is a depiction of the format of a frame control field in the end delimiter (of FIG. 3).

FIGS. 5A and 5B depict the bit field definition of the frame control field 98 and the frame control field 102, respectively. Referring to FIG. 5A, the frame control field 98 includes a Contention Control (CC) field 130, a Delimiter Type (DT) 132, a Variant Field (VF) 134 and a Frame Control Check Sequence (FCCS) field 136. The Contention Control indicator bit 130 is observed by all stations and indicates whether the next contention period (or "window") is contention-based or is contention-free with respect to all but pending frames of a higher priority. For a CC=1, indicating contention-free access, contention is allowed only if the priority of a pending frame is higher than the priority of the frame containing the set CC bit. If CC=0, indicating contention-based access, contention is allowed in the next contention window. The Delimiter Type field 132 identifies the delimiter and its position relative to the frame with which it is associated. For a start delimiter, the Delimiter Type may have one of two values, a value '000', interpreted as a Start-of-Frame (SOF) with no response expected, or a value '001', interpreted as an SOF with a response expected. For a delimiter of either of the start delimiter types, the Variant Field 134 includes an 8-bit Frame Length (FL) 140 and a 5-bit Channel map Index (CMI) 142, which are used by the PHY device 22 in a receiving station to decode a received frame payload. The Frame Control Check Sequence (FCCS) field 136 includes an 8-bit Cyclic Redundancy Check (CRC). The FCCS is computed as a function of the sequence starting with the CC bit and ending with the VF bits.

Referring to FIG. 5B, the frame control field 102 includes the same general field format, that is, it includes the fields 130, 132, 134 and 136. The DT field may have one of two values, a value of '010' corresponding to an End-of-Frame (EOF) with no response expected, or a value of '011' corresponding to an EOF with a response expected. For either of these end delimiter types, the Variant Field 134 includes a two-bit Channel Access Priority (CAP) 144, a 1-bit Response With Response Expected (RWRE) field 145 and a ten-bit Reserved field (RSVD) 146. The CAP field 144 indicates a priority level associated with the current segment, information that is used by all stations in the network to determine if a multiple-segment transmission or burst (for which the CC bit is typically set), can be interrupted. The RWRE field 145 is used to indicate that two responses are to follow. The Reserved field 146 is set to zero by the transmitter and ignored by the receiver.

Referring again to FIG. 5A, it will be appreciated that the start delimiter's frame control field 98 may be defined differently (e.g., different field lengths, fields added or omitted). For example, if the end delimiter is not to be used, then it may be desirable to use the available bits to include additional information, such as the CAP field 144 (shown in the frame control field 102 in FIG. 5B), in the frame control field 98 of the start delimiter 92.

Figure 6:
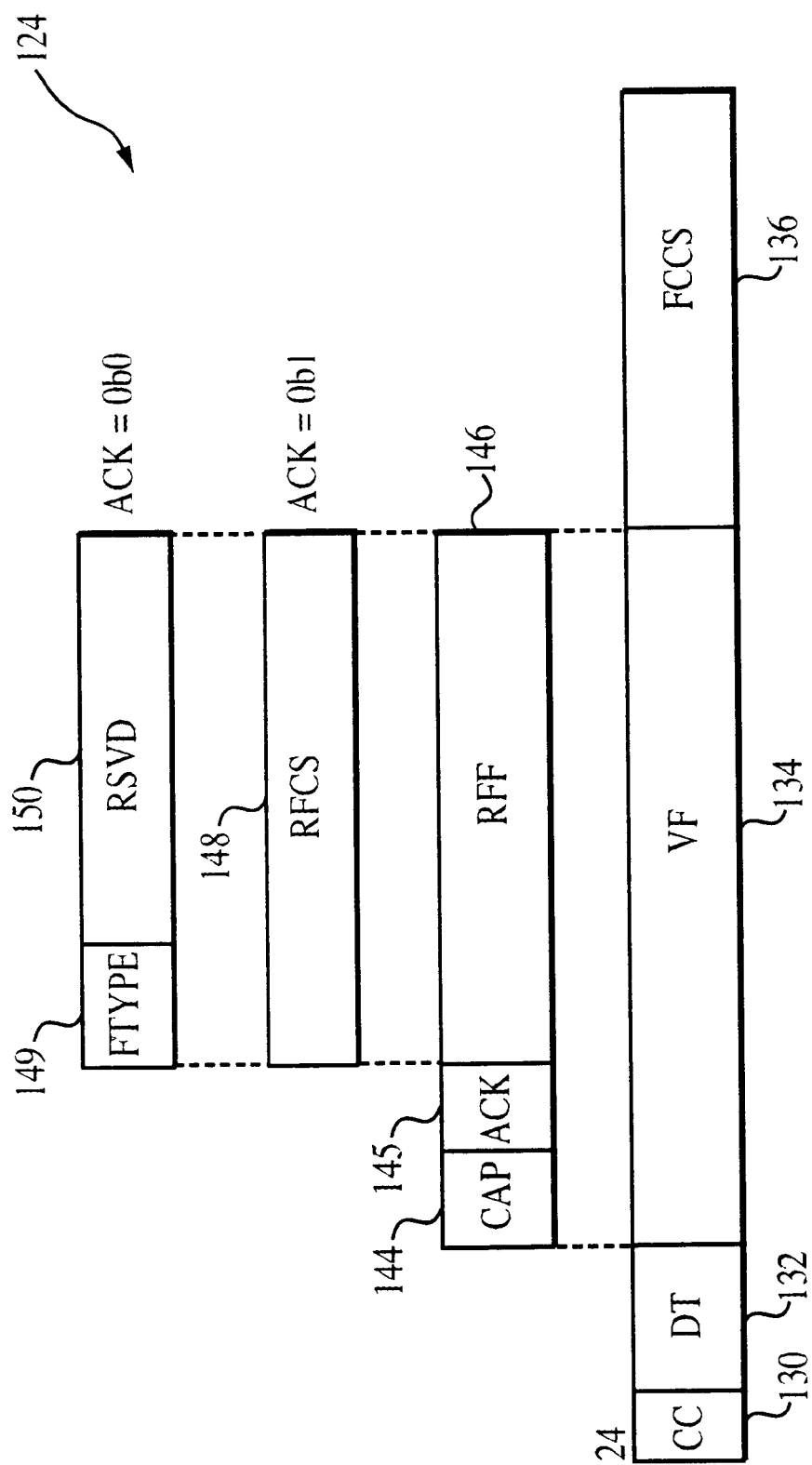
FIG. 6 is a depiction of the format of a frame control field in the response delimiter (of FIG. 4).

Referring to FIG. 6, the frame control field 124 of the response delimiter 120 (of FIG. 4) includes the same general field format as the frame control fields 98, 102. For a DT value corresponding to a response (see Table 1 below), however, the VF field 134 is defined to include the Channel Access Priority (CAP) 144 copied from the Variant field in the end delimiter of the frame for which the response is created, a 1-bit ACK field 145 and a 10-bit Response Frame Field (RFF) 146. The RFF 146 is defined as a Received Frame Check Sequence (RFCS) 148 when the value of ACK=0b01 (ACK). The RFCS 148 includes a portion corresponding to the least significant 10 bits of the 16-bit CRC (FCS field) received in the frame for which the response is being sent. The transmitting station that sent the frame requesting the response compares the RFCS against the corresponding transmitted CRC bits in the FCS to determine the validity of the response. If the transmitting station detects a match, the response is accepted. If the RFCS does not match the relevant portion of the FCS, the response is ignored and treated as if no response was received. Other information from the frame (that requested the response) that is similarly unique or likely to be unique to the frame could be used instead. If the value of ACK=0b0, then the response is not an ACK and the RFF 146 is defined as a 1-bit FTYPE field 149 and a Reserved (RSVD) field 150. The FTYPE field 149 specifies the type of response (if other than an ACK). A value of 0b0 in the FTYPE field 149 indicates a NACK. If FTYPE=0b1, then the response type is a FAIL. The DT field values for the response delimiter are shown in Table 1 below.

TABLE 1

| DT Value | Interpretation |
| --- | --- |
| 100 | Frame response with positive acknowledgment (ACK) indicating the frame was received without FCS or FEC errors (ACK = 0b1); Frame response with negative acknowledgment (NACK) indicating the frame passed the address filter but contained one or more uncorrectable FEC errors or the received FCS did not match the calculated (expected) FCS (ACK = 0b0, FTYPE = 0b0); Frame response with fail acknowledgment (FAIL) indicating that the frame was received (with or without errors) but receive resources were not available to process it (ACK = 0b0, FTYPE = 0b1). |
| 101 | Frame response with ACK/NACK/FAIL (same as above) to be followed by another response ("Response With Response Expected" (RWR)). |
| 110 | Reserved on transmit, discard on receive. |
| 111 | Reserved on transmit, discard on receive. |

With reference to FIGS. 5A–5B and FIG. 6, it can be appreciated that the content of the Variant field 134 is dependent on the Delimiter Type 132. In the exemplary frame control fields shown in FIGS. 5A–B and FIG. 6, the CC field 130 is one bit in length and corresponds to bit 24. The DT field 132 is 3 bits long and corresponds to bits 23-21. The VF field 134 is a 13-bit field and corresponds to bits 20-8. The FCCS field 136 is 8 bits long and corresponds to the least significant byte (LSB), bits 7-0.

Figure 7:
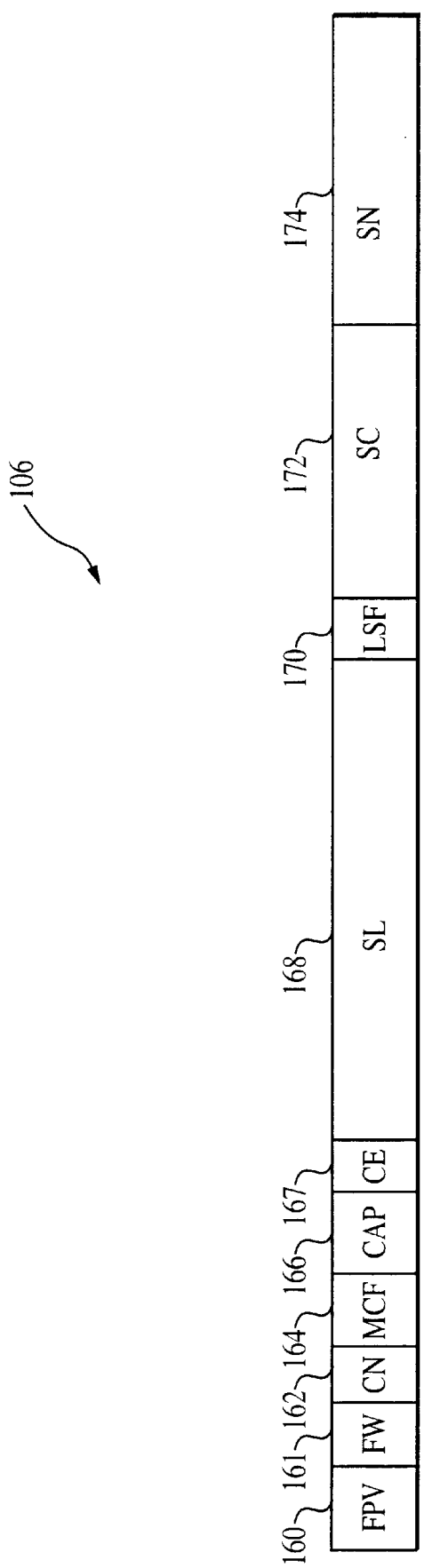
FIG. 7 is a depiction of the format of a segment control field in the payload of the frame shown in FIG. 3.

Referring to FIG. 7, the segment control field 106 (from FIG. 3) is a 40-bit field, which includes fields necessary to receive MSDU segments and perform reassembly of segmented MSDUs. The segment control field 106 includes the following subfields: a Frame Protocol Version (FPV) 160; a Frame Forwarding (FW) field 161; a Connection Number (CN) 162; a Multicast flag (MCF) 164; a Channel Access Priority (CAP) 166; a Channel Estimation (CE) field 167; a Segment Length (SL) 168; a Last Segment Flag (LSF) 170; a Segment Count (SC) 172; and a Segment Number (SN) 174. The FPV field 160 is a 3-bit field used to indicate the protocol version in use. For example, for a particular version of the protocol, the transmitter sets the field to all zeros and the receiver discards the frame if the field (after decoding) is not equal to zero. The FW field 161 is used to indicate, when set, that the frame is to be forwarded. The CN field 162 specifies a connection number assigned to a connection between two stations. The MCF 164 indicates that the frame includes a multicast payload regardless of the interpretation of the DA field 108 (and thus the receiver should look elsewhere for the actual DA in determining the validity of the frame for acceptance purposes, as will be described). This flag allows the MAC to execute the partial ARQ scheme, as will be described in more detail later. The CAP field 166 is a 2-bit field that is identical to the like-named field in the Variant Field 134 of the end delimiter 102 and response delimiter 124 (shown in FIGS. 5B and 6, respectively). The information is repeated in the Segment Control field 106 so that the receiver is able to extract this information to build a response without having to receive the end delimiter 94. The CE field 167 is a flag that is used by a receiver indicate to a transmitter that a new channel estimation cycle for the transmitter/receiver connection is recommended (as will be described). The SL field 168 includes the number of bytes in the frame body 112 (and thus excludes the PAD 114). The Last Segment flag 170 is a one bit flag that is set if the current segment is the last (or only) segment of the MSDU. The segment count field 172 stores the incrementing sequential count of the transmitted segment(s) and is used for segmentation and reassembly of MSDUs. The SN field 174 maintains a 10-bit sequence number that is associated with an MSDU (and each of its segments, if the MSDU is segmented) and is incremented for each new MSDU to be transmitted. It is also used for reassembly and to prevent the frame with which it is associated from being passed to the LLC more than once.

Figure 8:
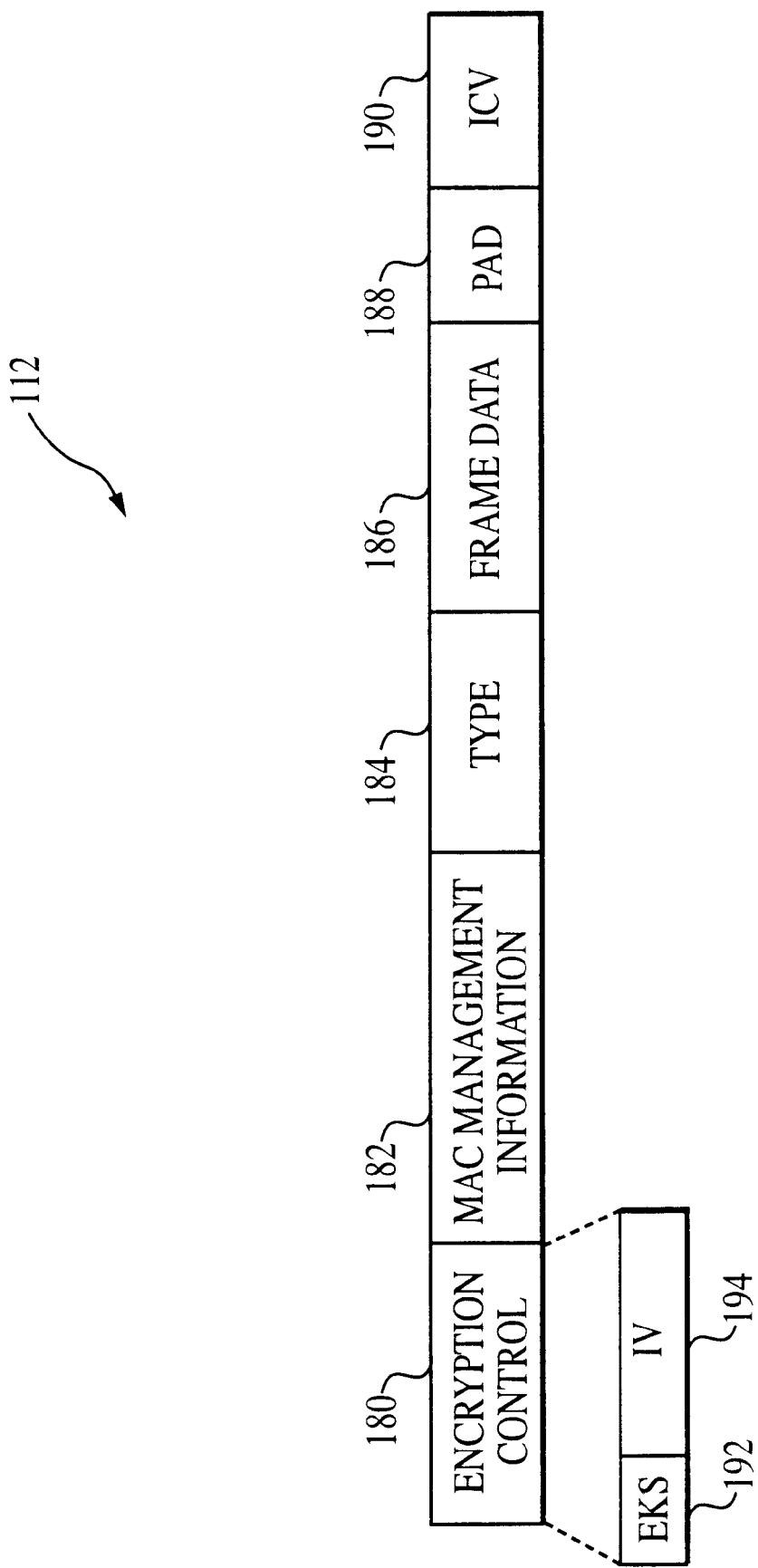
FIG. 8 is a depiction of the format of a frame body in the payload of the frame shown in FIG. 3.

Referring to FIG. 8, the frame body field 112 may include the following subfields: encryption control 180; MAC management information 182; type 184; frame data 186; PAD 188; and Integrity Check Value (ICV) 190. When a frame undergoes segmentation, it is the frame body field 112 that is partitioned into the various segments. The Encryption Control subfield 180 and the ICV 190 occur in every frame body field 112 except when the frame body field is segmented. Other subfields of the frame body field 112 may not appear in every frame.

The Encryption Control field 180 includes an Encryption Key Select (EKS) subfield 192 and an Initialization Vector (IV) subfield 194. The 1-octet EKS field 192 selects either a default encryption/decryption key (EKS=0x00) or one of 255 network keys. The 8-octet IV field 194 is used with the selected key to encrypt/decrypt the frame data. Data to be encrypted or decrypted start with the first byte following the IV field 194 and end with (and include) the ICV 190. A setting of the IV field 194 to all zeros causes the transmitter to bypass encryption and the receiver to bypass decryption (that is, the transmission/reception is cleartext).

The type 184 and frame data 186 are present in all frames that carry an MSDU. The amount of required padding (that is, number of bits to be added to the frame body 112), which is determined from the segment length 168 of the SC field 106, is implementation-dependent. In the described embodiment, because the encryption processes data presented in blocks divisible by 64 bits, the pad field 188 adds zeros to the frame body 112 to make the number of bits in the frame an integer multiple of 64 bits. The ICV 190 is a 32-bit cyclic redundancy check calculated over the bytes beginning with the first byte following the IV and ending with the PAD field 188 (if the PAD field 188 is present). The polynomial used to calculate the ICV 190 is the 32-bit CRC-CCITT polynomial used in IEEE Standard 802.11; however, other CRCs, e.g., CRCs based on other polynomials, may be used. In an alternative implementation, the encrypted information may not include the ICV 190.

The ICV field 190 is used by a receiver for frame filtering (that is, to prevent a decrypted frame from being passed to the LLC) when the frame has been decrypted in error. For example, a frame could be decrypted with the wrong network key if the EKS is not unique but in fact shared by two or more network keys. This common key select issue could occur if different logical networks choose the same EKS for different network keys.

The frame body 112 may contain the MAC management information 182. If this field is present in the Frame Body 112, its format and content are as follows.

Figure 9:
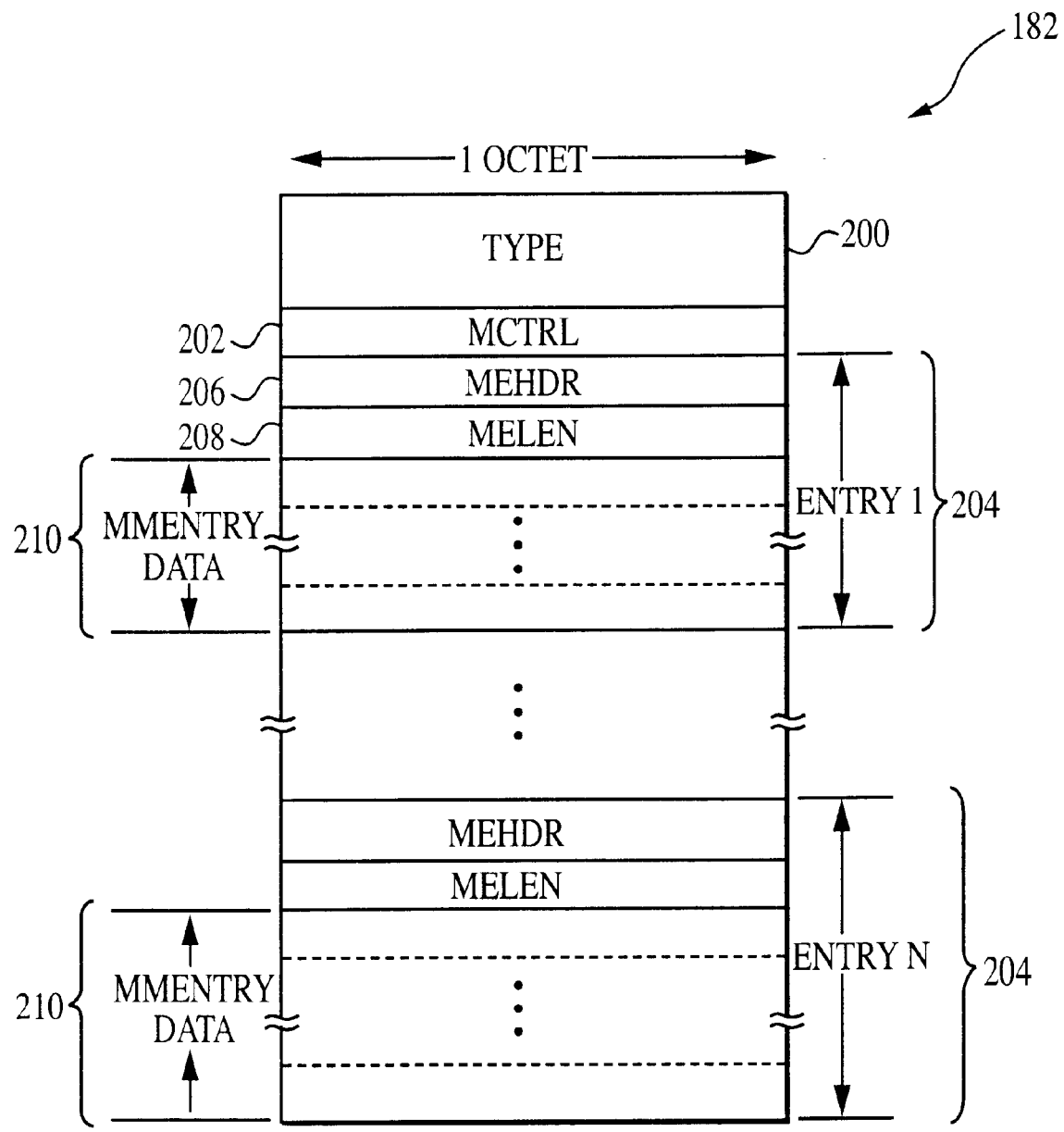
FIG. 9 is a depiction of the format of a MAC Management Information field in the frame body shown in FIG. 8.

Referring to FIG. 9, the MAC management information 182 includes the following subfields: Type 200; MAC control (MCTRL) 202; and N entry fields 204, each entry field 204 including a MAC Entry Header (MEHDR) 206, a MAC Entry Length (MELEN) 208 and MAC Management Entry Data (MMENTRY) 210. The Type 200 specifies that the frame includes MAC Management Information and that MAC Management Information fields are to follow. The MELEN 208 specifies how many bytes are contained in the associated MMENTRY 210 of the current entry field 204 and thus serves as a pointer to the next entry field 204.

Figure 10:
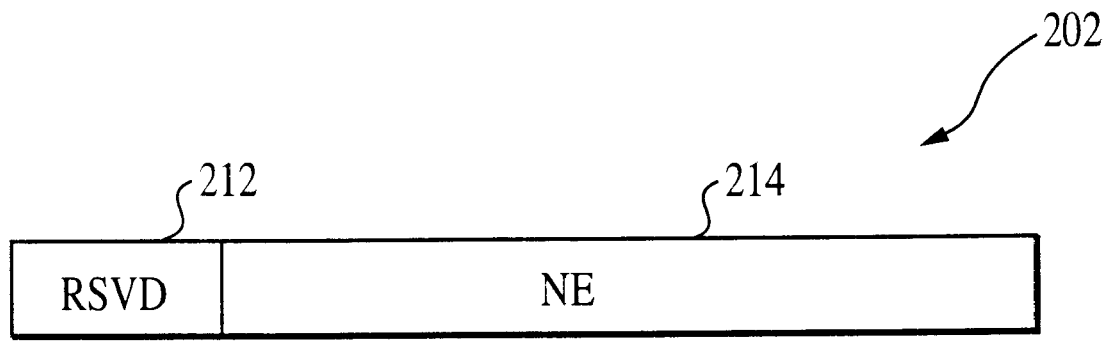
FIG. 10 is a depiction of the format of an MCTRL field in the MAC Management Information field shown in FIG. 9.

Referring to FIG. 10, the MCTRL field 202 includes two subfields: a 1-bit Reserved field 212 and a second, 7-bit field, a Number of Entries (NE) field 214 indicating the number of MAC entries (NE) 204 following in the MAC management information.

Figure 11:
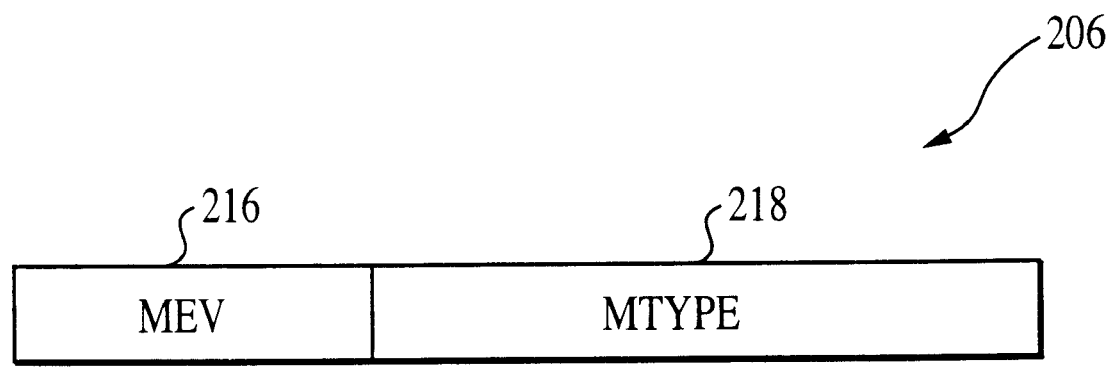
FIG. 11 is a depiction of the format of an MEHDR field in the MAC Management Information field shown in FIG. 9.

Referring to FIG. 11, the MEHDR field 206 includes two subfields: a MAC Entry Version (MEV) 216 and a MAC Entry Type (MTYPE) 218. The MEV 216 is a 3-bit field for indicating the interpretation protocol version in use. The transmitter sets MEV to all zeros. If the receiver determines that MEV≠0b000, the receiver discards the entire layer management MAC frame. The 5-bit MAC Entry Type 218 defines the MAC entry command or request which follows. The various MAC Entry Type values and interpretations are shown in Table 2.

TABLE 2

| MTYPE Value | MTYPE Value Interpretation | Local Use (Host-to-MAC) | Prepend Frame/ Transmit for Remote Use | Transmit for Remote Use |
| --- | --- | --- | --- | --- |
| 0 0000 | Request Channel Estimation | | X | X |
| 0 0001 | Channel Estimation Response | | X | X |
| 0 0010 | Set Local Parameters | X | | |
| 0 0011 | Replace Bridge Address | | X | X |
| 0 0100 | Set Network Encryption Key | X | X | X |
| 0 0101 | Multicast With Response | | X | X |
| 0 0110 | Set Connection | X | | |
| 0 0111 | Use Connection | X | | |
| 0 1000 | Request Parameters and Statistics | X | X | X |
| 0 1001 | Parameters and Statistics Response | X | X | X |

TABLE 2-continued

| MTYPE Value | MTYPE Value Interpretation | Local Use (Host-to-MAC) | Prepend Frame/ Transmit for Remote Use | Transmit for Remote Use |
| --- | --- | --- | --- | --- |
| 0 1010 | Request Connection Information | | X | X |
| 0 1011 | Connection Information Response | | X | X |
| 0 1100 | Dummy Frame | | X | X |
| 0 1101 | Concatenate | | | X |
| –1 1111 | Reserved MTYPE on transmit, discard entire layer management frame on receive | | | |

Table 2 also indicates, in columns 3–5, if the entry is received by a station's MAC from a higher layer for local use by that MAC (col. 3), is prepended to a data frame, (that is, an MSDU or MSDU segment) for transmission over the medium (col. 4) or is transmitted over the medium without a data frame (col. 5).

Figure 12A:
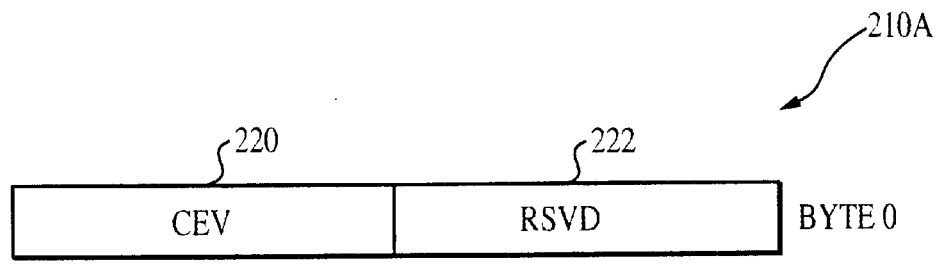
FIG. 12A is a depiction of the format of an MMENTRY data entry field in a MAC Management Information field in which the MEHDR field identifies the data entry type as a Channel Estimation request type.

Referring to FIG. 12A, the MMENTRY field 210 following the MTYPE 218 (in the MEHDR field 206) specifying Request Channel Estimation is a Request Channel Estimation MAC Management Entry 210A. The Request Channel Estimation Entry 210A includes a Channel Estimation Version 220 and a reserved field 222. If CEV 220 is not equal to zero, then this entry is ignored.

Figure 12B:
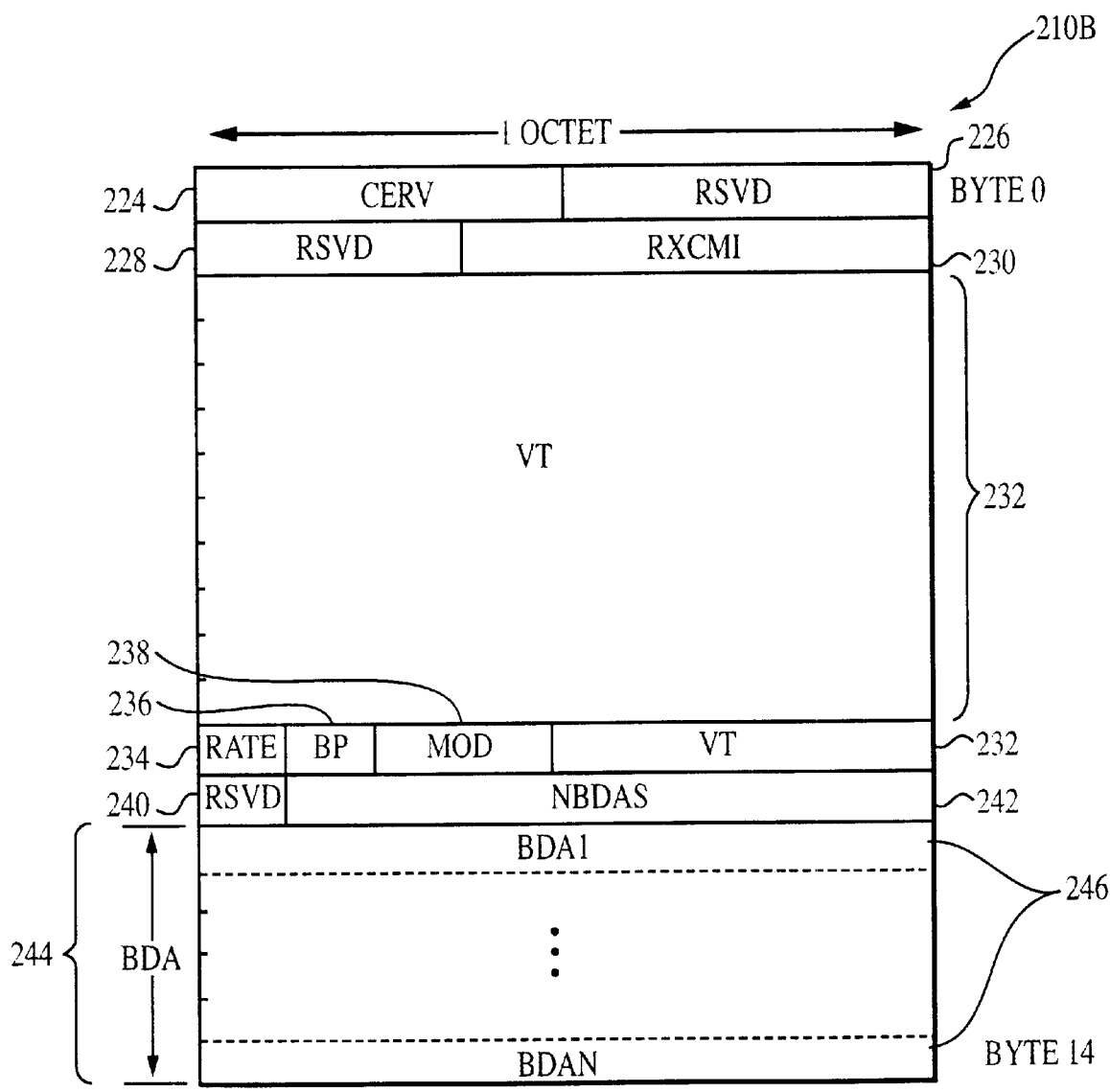
FIG. 12B is a depiction of the format of an MMENTRY data entry field in a MAC Management Information field in which the MEHDR field identifies the data entry type as a Channel Estimation response type.

Referring to FIG. 12B, the Request Channel Estimation MAC Management Entry 210A (of FIG. 12A) causes the receiving station to return a Channel Estimation Response in the form of a Response Channel Estimation MAC Management Entry 210B. This field is the MMENTRY field, which follows an MTYPE 218 specifying Channel Estimation Response. The Channel Estimation Response Entry 210B is a variable length MAC data entry sent by a receiver after receiving a Channel Estimation Request. This sequence is part of the MAC Channel Estimation Control Function, as described below.

Still referring to FIG. 12B, the subfields of the Channel Estimation Response Entry 210B include the following: Channel Estimation Response Version (CERV) 224; Reserved (RSVD) 226 and 228; Receive Channel Map Index (RXCMI) 230 (to be inserted by the requester in the CMI 142); Valid Tone Flags (VT) 232; FEC Rate (RATE) 234; Bridge Proxy (BP) 236; Modulation Method (MOD) 238; another reserved field 240; Number of Bridged Destination Addresses (NBDAS) 242; and Bridged Destination Addresses 244, including Bridged Destination Addresses 1 through n (BDAn) 246. The RXCMI field 230 includes the value to be associated with the Source Address of the station returning the Channel Estimation Response. The station receiving this response thus inserts the value in the CMI field 142 of the Start of Frame Delimiter 98 when transmitting to the responder. The Valid Tone Flags 232 indicate whether a specific tone is valid (VT[x]=0b1) or invalid (VT[x]=0b0). The RATE field bit 234 indicates whether the convolutional coding rate is ½ (RATE=0b0) or ¾ (RATE=0b1). The Bridge Proxy bit 236 indicates that the channel map is being proxied for one or more destination addresses. The NBDAS 242 indicates the number of proxied destination addresses, and each of BDA1 . . . n 246 contains a different destination address. The MOD field 238 specifies one of four different modulation types: a MOD value '00' corresponding to ROBO mode; a MOD value '01' corresponding to DBPSK modulation; a MOD value '10' corresponding to DQPSK modulation; and a MOD value '11' being a reserved value (which, if used on transmit, is ignored on reception).

In the network 10, the channel or connection between any two of the stations 12 can be unique with respect to the viability of tones (carriers) and the acceptability of various modulation types. Therefore, the MAC unit 18 provides a channel estimation control function to discover the attributes of the channel. The channel estimation function develops and maintains a point-to-point transmitter-receiver connection for achieving a maximum transmission data rate. Multicast transmissions are made in the ROBO mode, which has no dependency on the channel characteristics between transmitter and receiver. Unicast transmissions to a specific destination address for which a valid Channel Map does not exist are also made in the ROBO mode.

If the connection is new (the transmitter has not communicated with the receiver or, equivalently, no valid channel map exists for the DA), the transmitter includes the Channel Estimation Request MAC Entry 210A (FIG. 12A) with the MSDU in a frame before transmitting the frame to the receiver in ROBO mode. Upon receipt of the Channel Estimation Request MAC Entry 210A, the receiver analyzes the characteristics of the first received block (of 40 symbols) or multiple blocks of the segment, or even the entire frame, to determine the best set of tones and optimum modulation type for the connection. This analysis is performed by the CE unit 60 in the PHY device 22 (FIG. 2) of the receiving station, preferably according to a channel estimation process described in the above-referenced U.S. application Ser. No. 09/455,110. The receiving station returns a channel map resulting from the channel estimation in the Channel Estimation Response MAC Entry 210B (FIG. 12B). The Channel Estimation Response MAC Entry 210B is also transmitted in ROBO mode if no channel map exists for that direction. Upon receipt of this response, the transmitter utilizes the channel map—the Valid Tone Flags 232, FEC rate 234 and modulation 238—specified in the response, along with the associated Channel Map Index (which it provides in CMI 142 in the delimiter 98, FIG. 5A), for any further transmission to the DA while the Channel Map (to which the Channel Map Index 142 corresponds) is valid.

If the connection is not new (i.e., a previous channel estimation cycle was executed), the Channel Map may have become stale, e.g., after some estimation timeout, or, alternatively, no longer represents the optimum data rate (as determined by the receiver). After the estimation timeout, any subsequent transmission on this connection causes a new channel estimation cycle to occur, thus ensuring that the connection is maintained at an optimum state. If the receiver determines that channel conditions have improved or deteriorated (by detecting a decrease in the number of errors or an increase in the number of errors, respectively), it may recommend to the transmitter that a new channel estimation occur. The receiver makes this recommendation by setting the CE flag 167 in the Segment Control 106 (FIG. 7) in a frame sent to the transmitter. The receipt of the frame with the set CE flag 167 causes the transmitter to initiate a channel estimation with a frame sent in ROBO mode. Alternatively, the receiver could make the recommendation using a MAC management entry. Channel estimation also occurs as part of a recovery procedure during a frame transmission, if the transmitter is required to drop to ROBO mode during retransmission, as will be discussed.

Figure 13A:
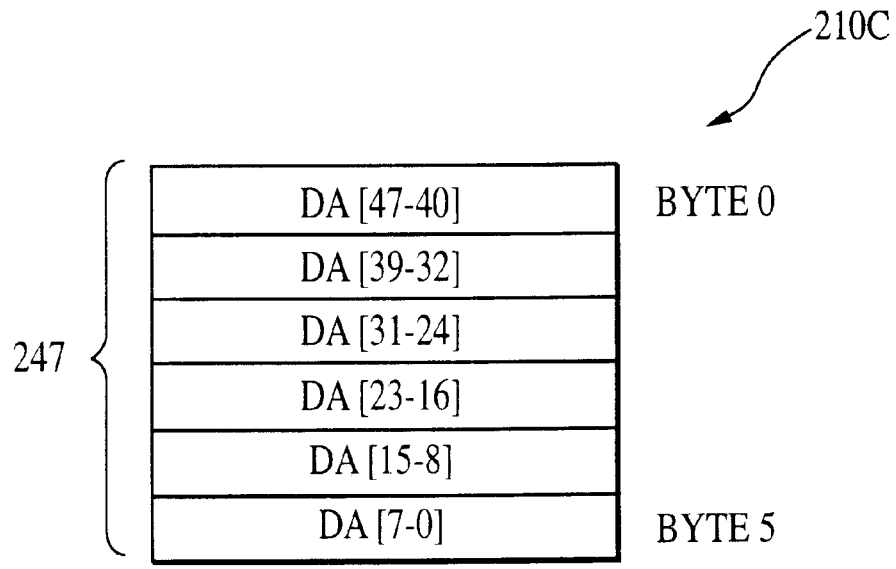
FIG. 13A is a depiction of the format of an MMENTRY data entry field in a MAC Management Information field in which the MEHDR field identifies the data entry type as a Connection Information Request type.
Figure 13B:
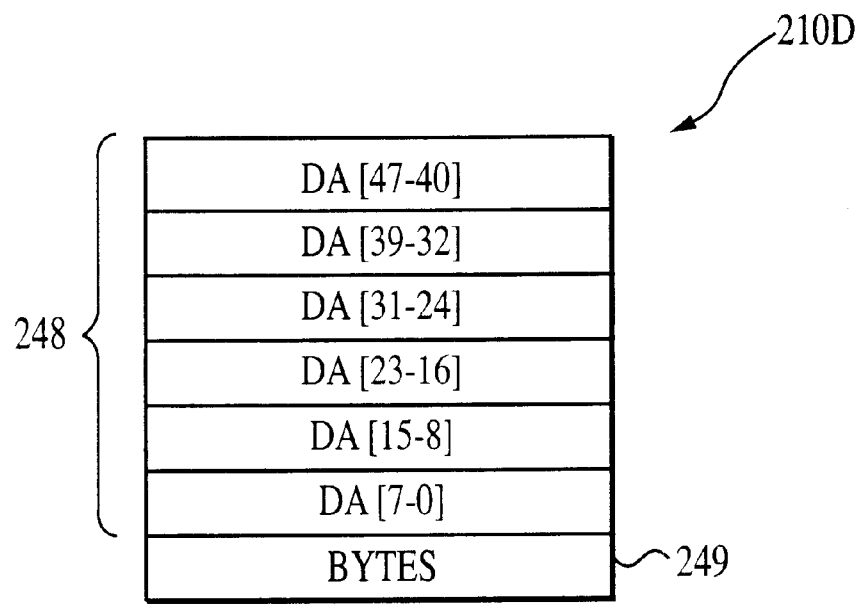
FIG. 13B is a depiction of the format of an MMENTRY data entry field in a MAC Management Information field in which the MEHDR field identifies the data entry type as a Connection Information Response type.

Referring to FIGS. 13A–B, the MMENTRY fields 210 following MTYPEs 218 specifying Connection Information Request and Connection Information Response types are Connection Information Request 210C (FIG. 13A) and Connection Information Response 210D (FIG. 13B), respectively. Referring to FIG. 13A, the Connection Information Request field 210C includes a Destination Address (DA) field 247. The DA specified by the DA field 247 is the address of the station for which the requesting station desires connection information. Referring to FIG. 13B, the Connection Information Response field 210D includes a DA field 248 that includes a copy of the DA specified by the like-named field in the Connection Information Request 210C. The Connection Information Response field 210D further includes a Bytes field 249 which specifies the number of bytes in a 40 symbol block (or alternatively, the number of bytes in a maximum length frame) based on the TX channel map of the responder to the DA. Connection Information Request and Response are used for frame forwarding, as later described with reference to FIGS. 40–46.

Figure 14:
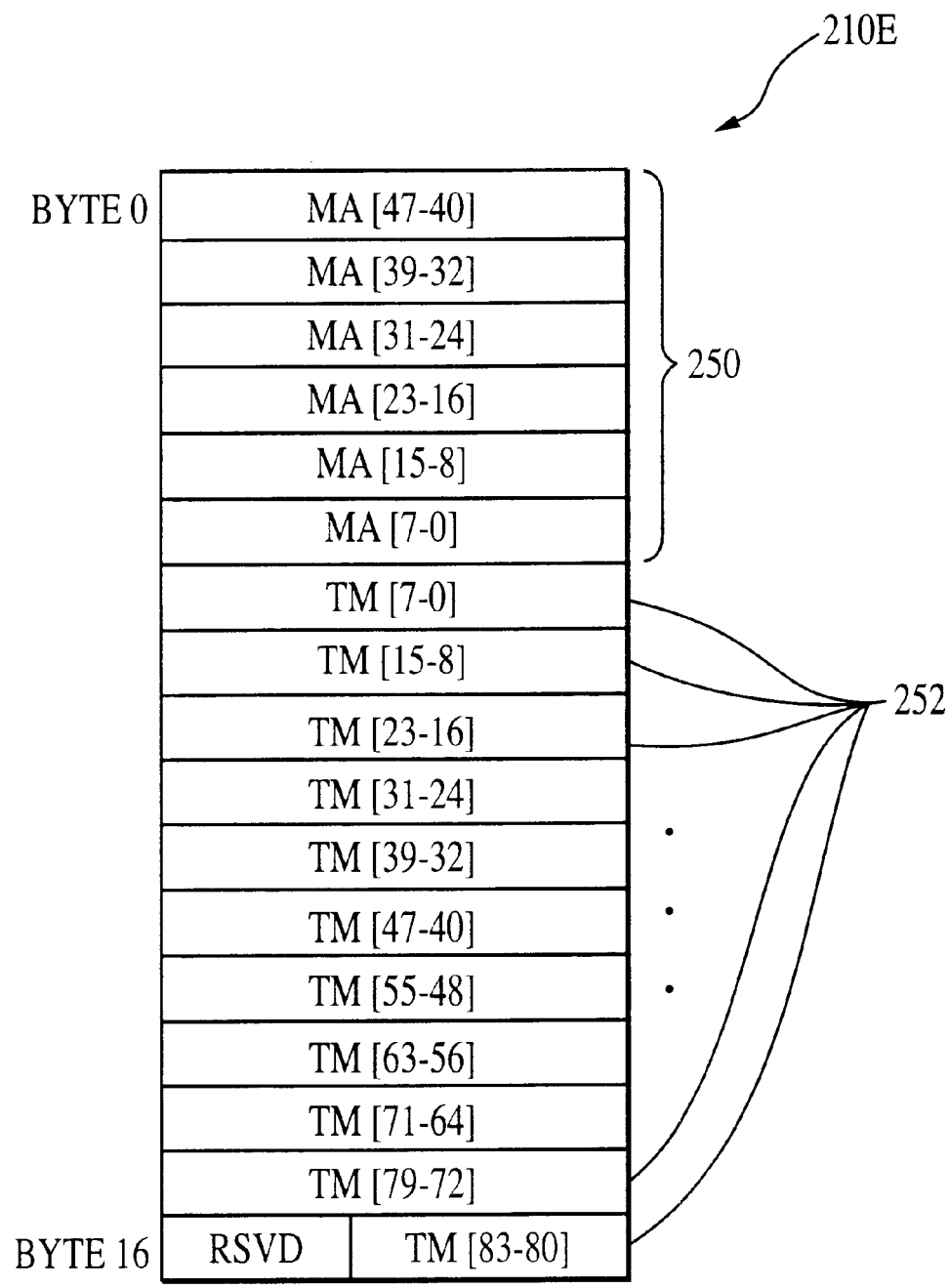
FIG. 14 is a depiction of the format of an MMENTRY data entry field in a MAC Management Information field in which the MEHDR field identifies the data entry type as a Set Local Parameters type.

Referring to FIG. 14, a Set Local Parameters field 210E is an 17-byte data entry that sets a local station MAC address 250 (MA[47-0] being an IEEE 48-bit MAC address format) and tone mask 252, which indicates the tones that are usable by the network. Unused tones will not have any signals applied to them. The tone mask 252 includes 84-bit usable tone flags to indicate whether a specific tone is usable (TM[x]=0b1) or unusable (TM[x]=0b0). TM[0] corresponds to the lowest frequency tone.

Figure 15:
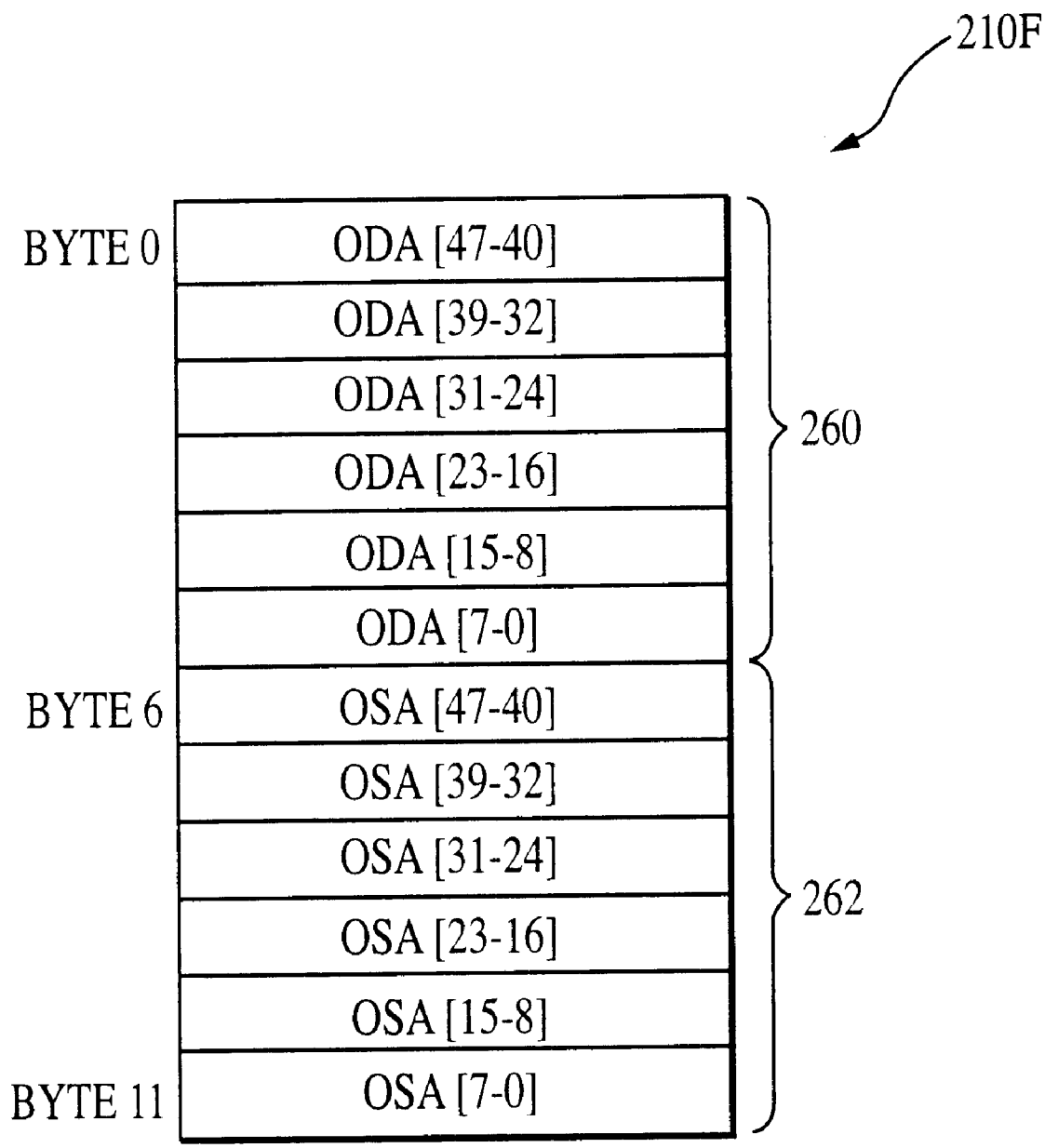
FIG. 15 is a depiction of the format of an MMENTRY data entry field in a MAC Management Information field in which the MEHDR field identifies the data entry type as a Replace Bridge Address type.

Referring to FIG. 15, the MMENTRY field 210 following an MTYPE 218 specifying a Replace Bridge Address entry type. is a Replace Bridge Address Entry field 210F. The entry field includes 6 bytes to identify an Original Destination Address (ODA) 260 of a station which may be on another medium and accessed via a bridge. The entry field 210D further includes 6 bytes to identify an Original Source Address (OSA) 262 of a station which may be on another medium and accessed via a bridge. The station receiving this entry uses these fields to reconstruct the original Ethernet frame. The bridging proxy mechanism will be described in further detail with reference to FIGS. 32–37.

Figure 16:
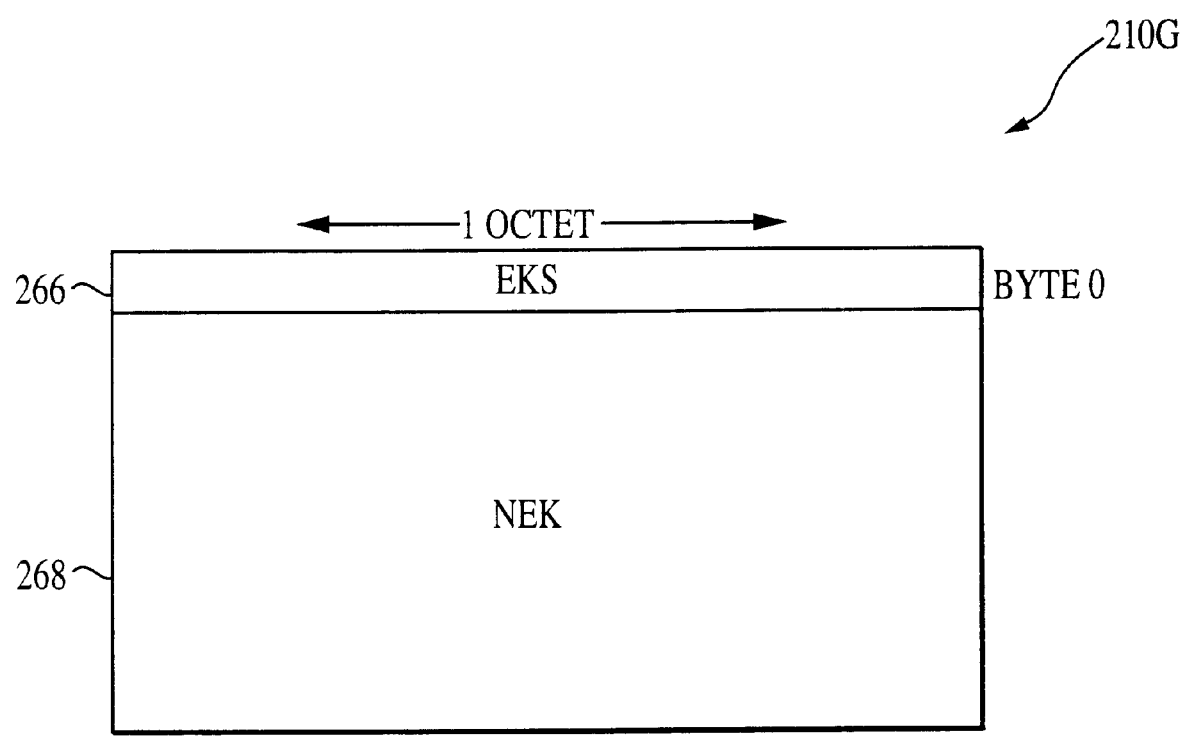
FIG. 16 is a depiction of the format of an MMENTRY data entry field in a MAC Management Information field in which the MEHDR field identifies the data entry type as a Set Network Encryption Key type.
Figure 29:
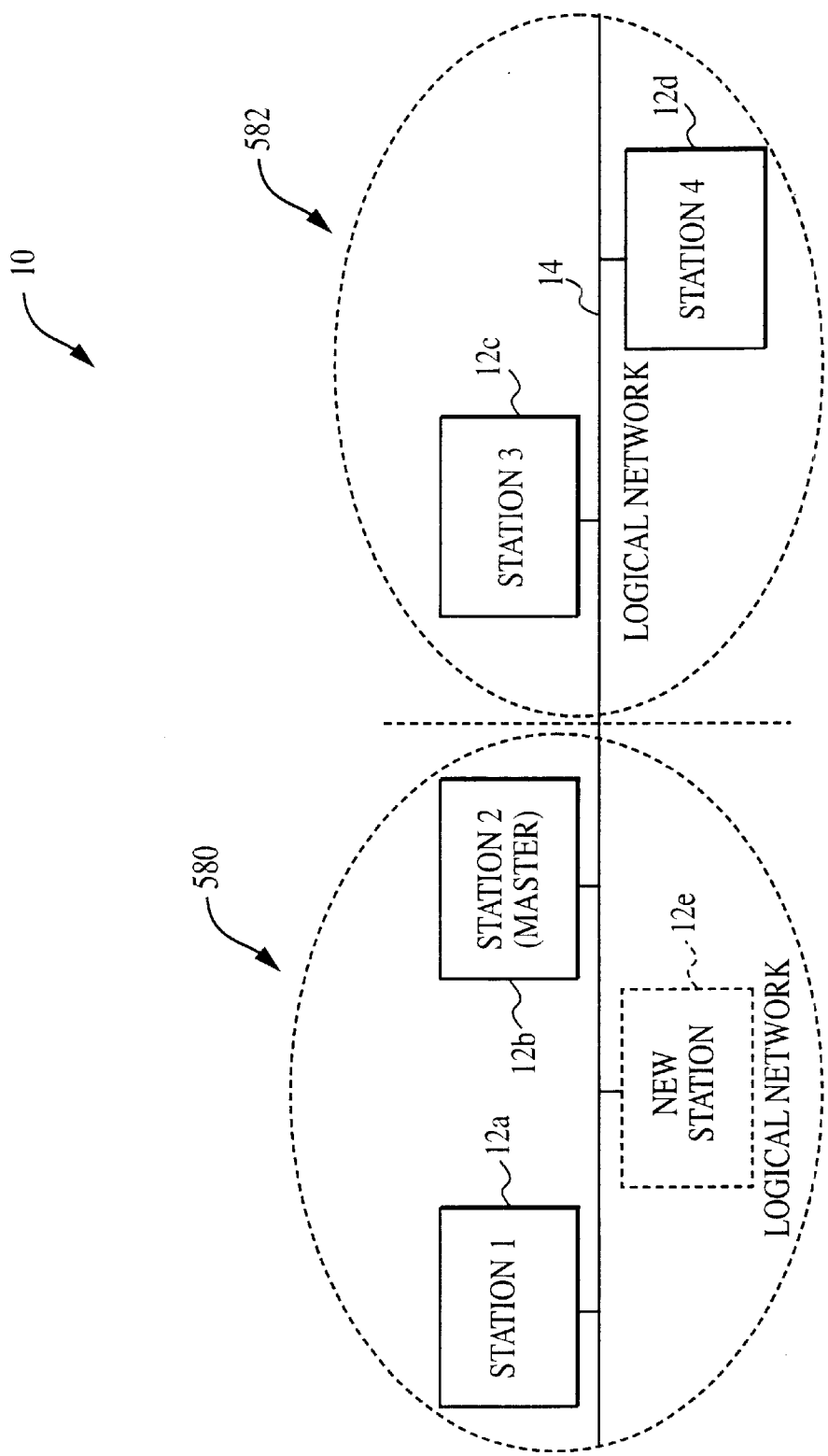
FIG. 29 is a representation of the network as being separated into logical networks, each defined by a unique encryption key.

Referring to FIG. 16, the MMENTRY field 210 following the MTYPE 218 specifying a Set Network Encryption Key is a Set Network Encryption Key entry 210G. The entry 210G includes an Encryption Key Select (EKS) 266 and a Network Encryption Key (NEK) 268. The MAC privacy mechanism, to which these fields apply, will be discussed later in reference to FIGS. 29–31.

Figure 17:
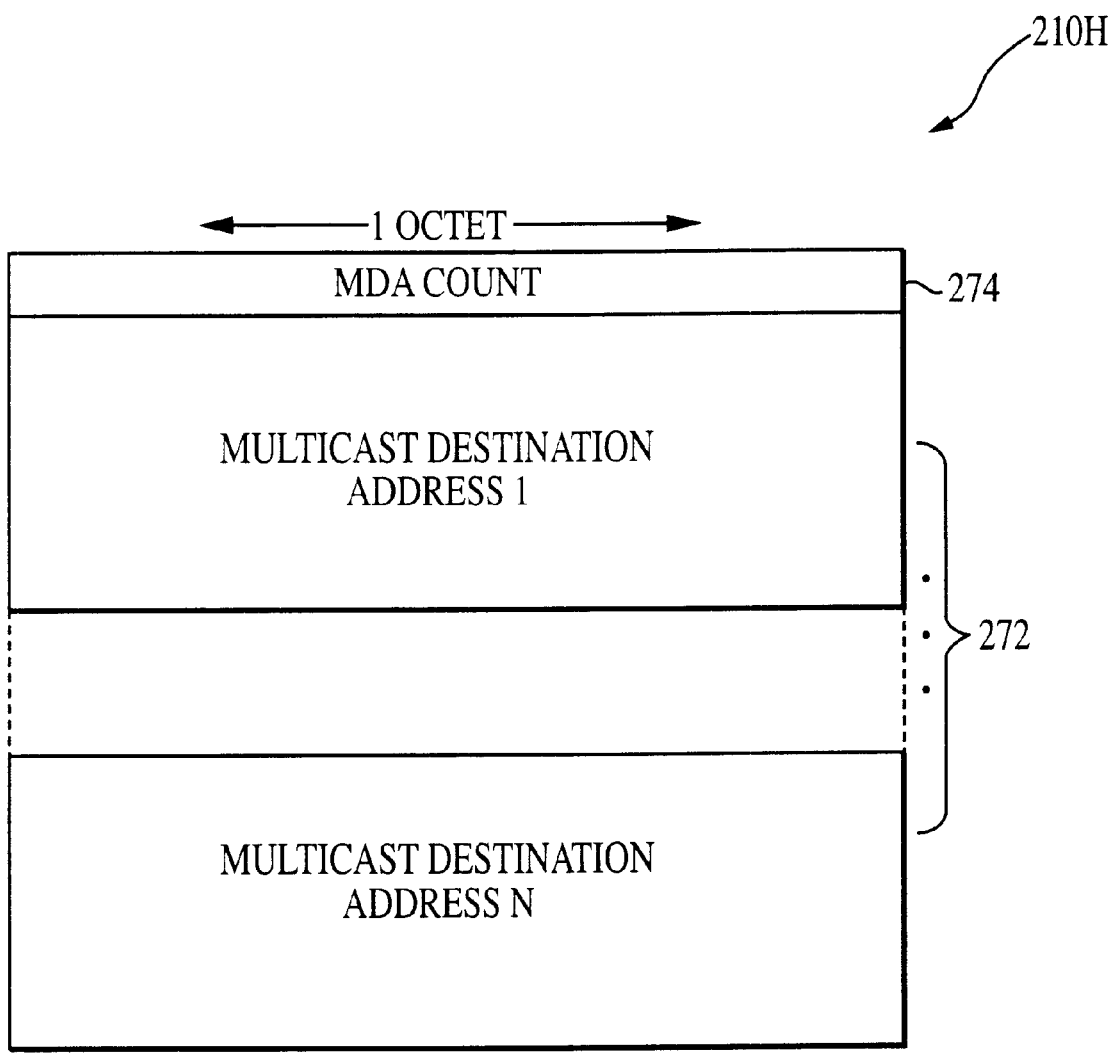
FIG. 17 is a depiction of the format of an MMENTRY data entry field in a MAC Management Information field in which the MEHDR field identifies the data entry type as a Multicast With Response (MWR) type.

Referring to FIG. 17, the MMENTRY field 210 following the MTYPE 218 specifying a Multicast with Response is a Multicast With Response Entry 210H and is used to support partial ARQ for multicast transmissions. The Multicast With Response Entry 210H includes multicast destination addresses 272 (or, alternatively, at least one multicast destination address that represents a group of multicast destination addresses) and a multicast destination address (MDA) count field 274 corresponding to the number of multicast destination addresses in the entry. When this entry is used, the DA 108 in the frame header 84 (FIG. 3) is a proxy for the multicast destination addresses 272 and generates a response if the delimiter type is of the response-requiring type, as discussed above (with reference to FIGS. 5A–5B).

Figure 18:
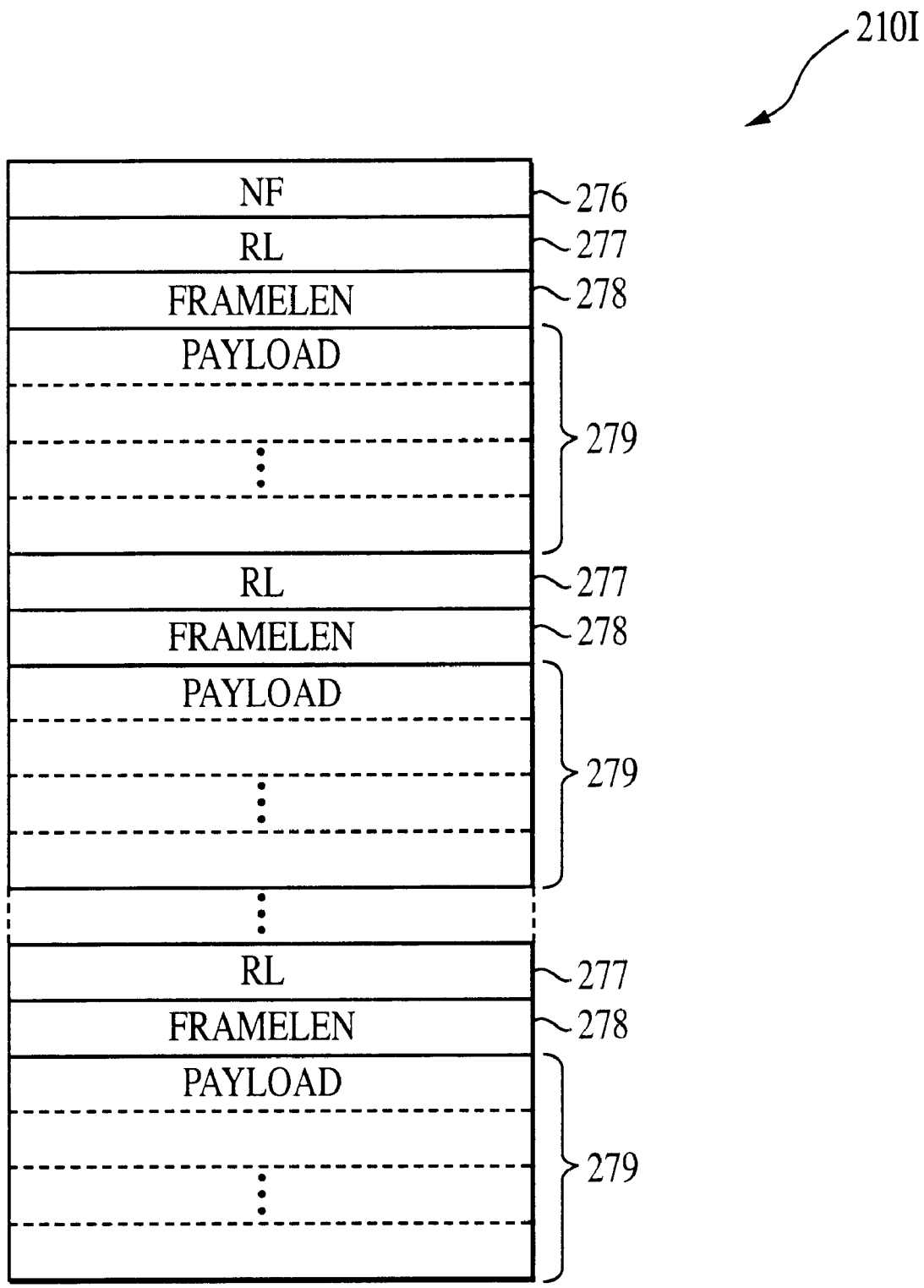
FIG. 18 is a depiction of the format of an MMENTRY data entry field in a MAC Management Information field in which the MEHDR field identifies the data entry type as a Concatenate type.

Referring to FIG. 18, the MMENTRY field 210 following MTYPE 218 specifying a Concatenate type is a Concatenate entry 210I. This entry provides a mechanism by which the host concatenates a number of smaller frames for delivery to a particular destination with the same CAP. This increases network throughput since smaller frames are not efficient given the fixed overhead associated with each frame (e.g., SOF delimiter, EOF delimiter, response, as well as different interframe intervals later described). The Concatenate MMENTRY data field 2101 includes the following fields: an NF field 276 for indicating the number of frames concatenated together; and, for each frame present in the entry, a Remove Length (RL) field 277, a Payload (Frame) Length field (FRAMELEN) 278 and a Payload field 279. The RL field, if set (RL=0b1), indicates to the receiver that the FRAMELEN field 278 for the frame should be removed to extract the original frame. The inclusion of the RL field is used to prevent the duplication of a frame length field when an original type field in the frame actually specifies the frame length. When RL=0b0, the FRAMELEN field 278 is the original type field for the frame and is thus part of the original frame. When this entry is included in the MAC layer management information 182, it is the last entry. Its presence precludes the use of payload fields 184 and 186. For this type of entry, MELEN is set to some value, for example, one, that will indicate to the receiver that the overall length is not specified and that the receiver must therefore look at each occurrence of FRAMELEN to extract the original frames.

Although not shown, entries corresponding to MTYPE values specifying Request Parameters and Statistics as well as Response Parameters and Statistics (described in Table 2 above) are used to gather station-specific parameters and network performance statistics that are useful for diagnostic purposes.

It is possible to define and employ other MAC management entry types as well.

Referring back to Table 2, entries corresponding to the MTYPE values for Set Connection and Use Connection, as well as Dummy Frame, are used to support sessions of contention-free intervals for QoS in a CSMA network. The Dummy Frame entry indicates to the receiver that the frame payload of the frame in which this entry is contained is to be discarded. The format of the Set and Use connection entries and the operation of the contention-free access mechanism that uses these entries (as well as the Dummy Frame entry) are described in detail later with reference to FIGS. 39A–39B and FIGS. 37–38, respectively.

In a distributed medium access scheme such as that employed by the MAC unit 18, the transmitting station 12a senses the transmission medium 14 via a carrier sense mechanism to determine if other stations are transmitting. Carrier sense is a fundamental part of the distributed access procedure. Physical carrier sense is provided by the PHY through the detection of the Preamble and tracking of OFDM symbols through the packet body. In addition to the physical carrier sense signaling provided to the MAC by the PHY, the MAC also employs a virtual carrier sense (VCS) mechanism for greater timing accuracy. The VCS mechanism uses a timer (for maintaining a VCS timeout value) and a flag to track the expected duration of channel occupancy based on information represented in the Frame Control Fields. Therefore, the medium is considered busy if either the physical or virtual carrier sense so indicates. The medium is also considered busy when the station is transmitting.

Figure 19A:
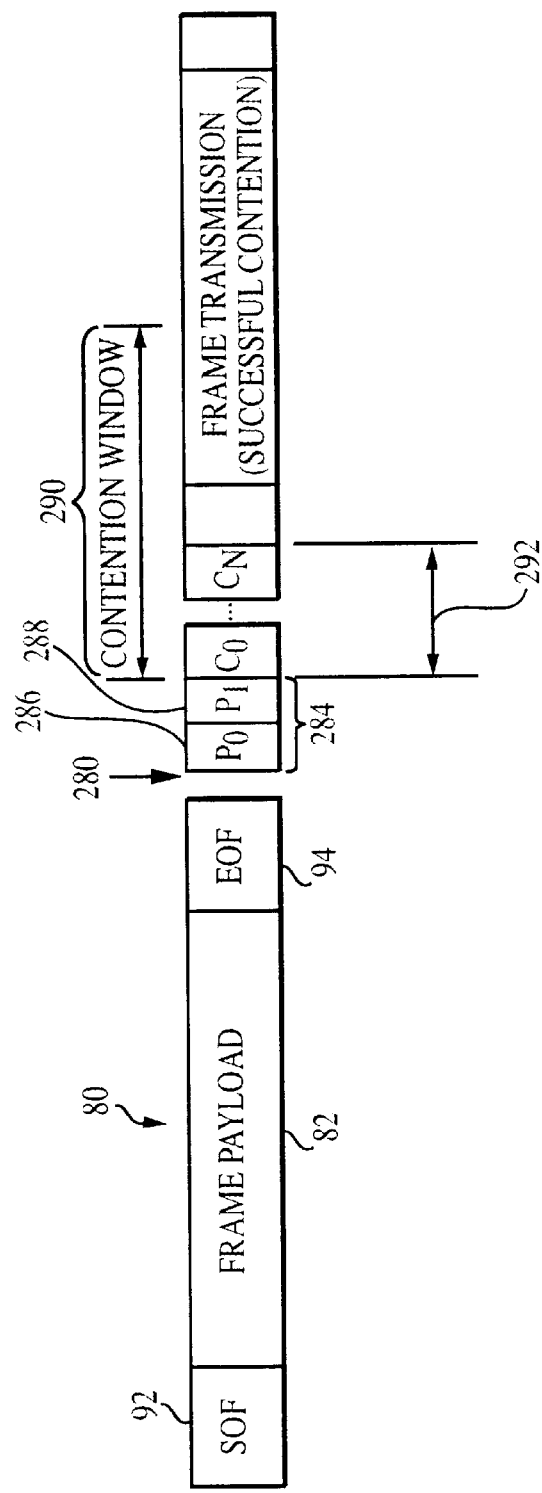
FIGS. 19A and 19B are depictions of data frame transmissions utilizing priority and contention-based access (FIG. 19A) and priority and contention-free access (FIG. 19B).

Referring to FIGS. 19A–19D, a medium sharing technique that utilizes priority resolution and contention following; busy conditions on the channel is shown. A Contention Interspace Frame Space (CIFS) 280 defines the interframe spacing between the end of the last correctly received frame transmission for which no response is expected and the start of a Priority Resolution Period (PRP) 284, which is used to resolve priority for new transmissions. Referring to FIG. 19A, a last frame transmission is in the form of the data frame transmission 80. The Priority Resolution Period 284 includes a first Priority Resolution Slot $P_0$ 286 and a second Priority Resolution Slot $P_1$ 288. There are four levels of Channel Access Priority (CAP): the highest priority is indicated by CA3=0b11 and the lowest priority is indicated by CA0=0b00. Table 3 below maps the CAP to the Priority Resolution Slots 286 and 288.

TABLE 3

| Channel Access Priority | $P_0$ State | $P_1$ State |
|---|---|---|
| CA3 | 1 | 1 |
| CA2 | 1 | 0 |
| CA1 | 0 | 1 |
| CA0 | 0 | 0 |

The current version of IEEE 802.1 standard describes the use of user priorities and access priorities in a bridged network environment. User priorities are priorities that a user of application requests be associated with its traffic. Access priorities are the number of differentiated traffic classes that a MAC provides. The subclause 7.7.3, 802.1D provides a mapping of user priorities to traffic classes. The five differentiated traffic classes discussed herein, i.e., those corresponding to the four channel access priorities (CA0 through CA3), and the contention free access, correspond, one to one, to traffic classes 0 through 4.

Still referring to FIG. 19A, the intention to contend at a particular priority during a Contention Window 290 after a random backoff interval 292, which is expressed in terms of Contention Resolution Slots $C_0, \ldots, C_N$, is signaled in the Priority Resolution Period 284 as follows. A station that requires access to the channel determines if the delimiter received immediately prior to the PRP 284 (in the example, the EOF delimiter 94, also shown in FIG. 5B) included in its frame control field a set Contention Control bit 130 and specified in the CAP field 144 a priority greater than or equal to the priority that would have otherwise been indicated by the station in the PRP 284. If so, the station refrains from indicating an intention to contend in the current PRP. Instead, the station updates the value of the VCS and waits the duration of an Extended Interframe Space (EIFS) or until it detects the end of the next transmission, whichever occurs first.

Figure 19B:
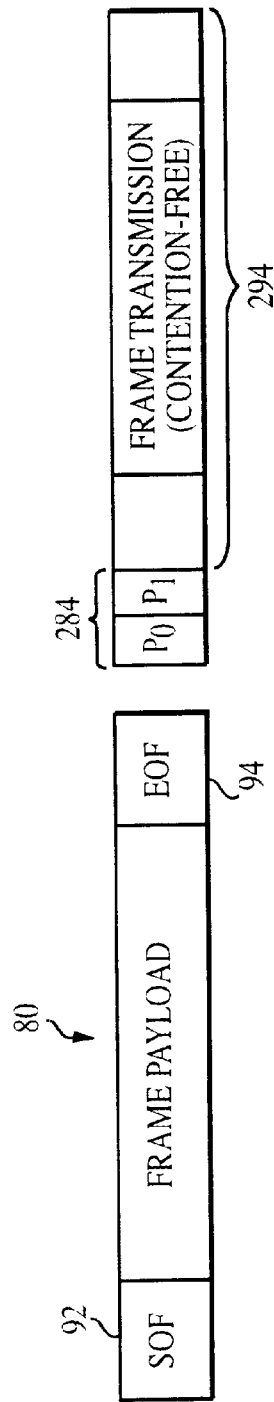

FIG. 19B illustrates an exemplary contention-free frame transmission 294 immediately following the PRP 284. In this example, contention-free status has been established by the station that sent the data frame transmission 80 by using a set Contention Control bit 130 in the delimiter 92 and winning contention during a prior Contention Window 290.

Otherwise, and referring back to FIG. 19A, the station signals its priority during the PRP 284. During $P_0$ 286, the station asserts a Priority Resolution Symbol if the priority requires a binary one in slot 0 (i.e., CA3 or CA2). Alternatively (if a lower priority), the station detects if a Priority Resolution Symbol was transmitted by another station. During $P_1$ 288, if the station signaled in the last slot and the station's priority requires that the station signal in this slot, it does so. If the station signaled in the $P_0$ slot 286 and not the $P_1$ slot 288 but detects (during the $P_1$ slot 288) that another station is signaling in this slot, it defers to the higher priority station and refrains from transmitting during the Contention Window 290. The station also sets the VCS with an appropriate value (according to rules to be described later). If the station did not signal in the $P_0$ slot 286 and detected that other stations did, it refrains from transmitting in the P₁ 288 or transmitting in the Contention Window 290. Again, it sets VCS with an appropriate value. Thus, the station refrains from transmitting in any remaining one of the slots 286, 288 or the Contention Window 290 if it has detected a Priority Resolution Symbol in a one of the slots 286, 288 in which the station did not assert the signal. In this manner, each station determines the highest-level priority for which there is a transmission pending and defers if its own pending transmission is of a lesser priority. If priority signaling has been completed and the station has not been pre-empted by a higher priority, it contends for access in a Contention Window 290 according to a backoff procedure, as will be described.

Referring to FIG. 19C, if the last data transmission 80 requires and is followed by a response 124, the station waits a Response Interframe Space (RIFS) 298, the time between the end of the data frame transmission 80 and the start of the associated response 124. The CIFS 280 follows the response 124. Many protocols assign the shortest interframe space to Responses so that channel ownership is maintained by the stations involved in the exchange. The MAC uses information in the frame header to notify stations whether a response is expected. If no response is expected, the CIFS is in effect.

FIG. 19D illustrates an exemplary contention-free transmission that occurs after a response. In this example, contention-free status has been established by the station that sent the last data transmission 80 with a set Contention Control bit (thus causing the return of the response 124 with a set Contention Control bit) and winning contention during a prior Contention Window 290.

The above-mentioned Extended Interframe Space (EIFS) is calculated by adding the PRP, the CIFS and the RIFS to the maximum frame time (i.e., the maximum allowed frame length and delimiter(s)) in symbols, times the symbol time) and the response time (response length in symbols times the symbol time). The EIFS is used by a station when a contention free access cannot be interrupted (as discussed above). It is also used when the station does not have complete knowledge of the state of the medium. This condition may occur when the station hears only one side of a frame exchange between two other stations, when the station initially attaches to the network, or when errors in the received frames make them impossible to decode unambiguously. The EIFS is significantly longer than the other interframe spaces, providing protection from collision for an ongoing frame transmission or segment burst when any of these conditions occur. If the medium has been idle for the minimum EIFS, no channel access contention is necessary and the frame may be transmitted immediately.

Referring back to FIGS. 19A and 19C, the station generates the random backoff time 292 to create an additional delay, unless backoff is already in effect and no new random value is needed. Backoff time is defined as:

$$\text{BackoffTime} = \text{Random}(\ )*\text{SlotTime} \qquad (1)$$

where Random( ) is a uniformly distributed pseudorandom integer from the interval [0, Contention Window], the Contention Window (CW) value varying from a minimum value of seven (7) to a maximum value of 63, and SlotTime defined as a predetermined slot time. A station entering the backoff procedure sets its Backoff Time as described above.

The MAC unit 18 maintains a number of timers, counters, control flags and other control information to control channel access. The BackoffTime value is maintained by a Backoff counter or count (BC), which decrements by one for each SlotTime that both the physical and virtual carrier sense determines to be idle. The BC is suspended for any slot in which the carrier sense is active. Transmission occurs when the BC decrements to zero. The VCS value is maintained by a VCS timer and interpreted by a Virtual Carrier Sense Pointer Flag (VPF). The VCS timer value is updated whenever valid frame control information is received or transmitted, even when no frame is pending. The VPF is set to a 1 whenever valid frame control information is received, unless conditions dictate that VCS be set to EIFS. If VCS is set to EIFS, then VPF is set to a 0. If VPF is set to a 1, then the VCS value points to the next contention. If VPF is set to a 0, the VCS value points to network idle time. The settings of VCS and VPF are described more fully later with reference to Table 4.

All stations also maintain a Transmit Counter (TC), a Deferral Counter (DC), a Backoff Procedure Counter (BPC), a NACK response (NACKcount) counter and a "No Response" Counter (NRC). All are initially set to zero. TC is incremented every time a frame is transmitted. The BPC is incremented each time the backoff procedure is invoked. The NRC is incremented each time no response is received when a response is expected. The MAC unit also maintains a frame timer ("FrmTimer"), which is set with a maximum frame lifetime value. A packet to be transmitted (or re-transmitted) is dropped when the FrmTimer expires (reaches zero) except while transmitting (including the response interval).

CW takes an initial value of seven and takes the next value in the binary exponential series every unsuccessful transmission or when DC is zero. CW and BPC are reset after a successful transmission and when the transmission is aborted (due to TC reaching its maximum allowed threshold value or the frame exceeding the maximum lifetime of FrmTimer). TC is reset to zero after any transmission for which an ACK is received when an ACK is expected, or transmission completes for unacknowledged service. The truncated binary exponential series for CW is defined as $2^n-1$, where n ranges from 3 to 6. CW and DC are set based on the value of BPC according to these rules: for an initial transmission (BPC=0), CW=7 and DC=0; for a first retransmission (BPC=1), CW=15 and DC=1; for a second retransmission (BPC=2), CW=31; and DC=3; and for third and subsequent retransmissions (BPC>2), CW=63 and DC=15.

In addition to the VPF, the MAC unit 18 also stores and maintains a Contention Control (CC) flag corresponding to the CC bit in the like-named fields in the frame control fields 98, 102 and 124. The CC flag is set or cleared based on the frame control information in each received delimiter and is also cleared when the VCS value reaches 0 and VPF is 0. A value of zero indicates normal contention. A value of 1 indicates no contention (i.e., contention-free access) unless a higher priority frame is pending.

Figure 20:
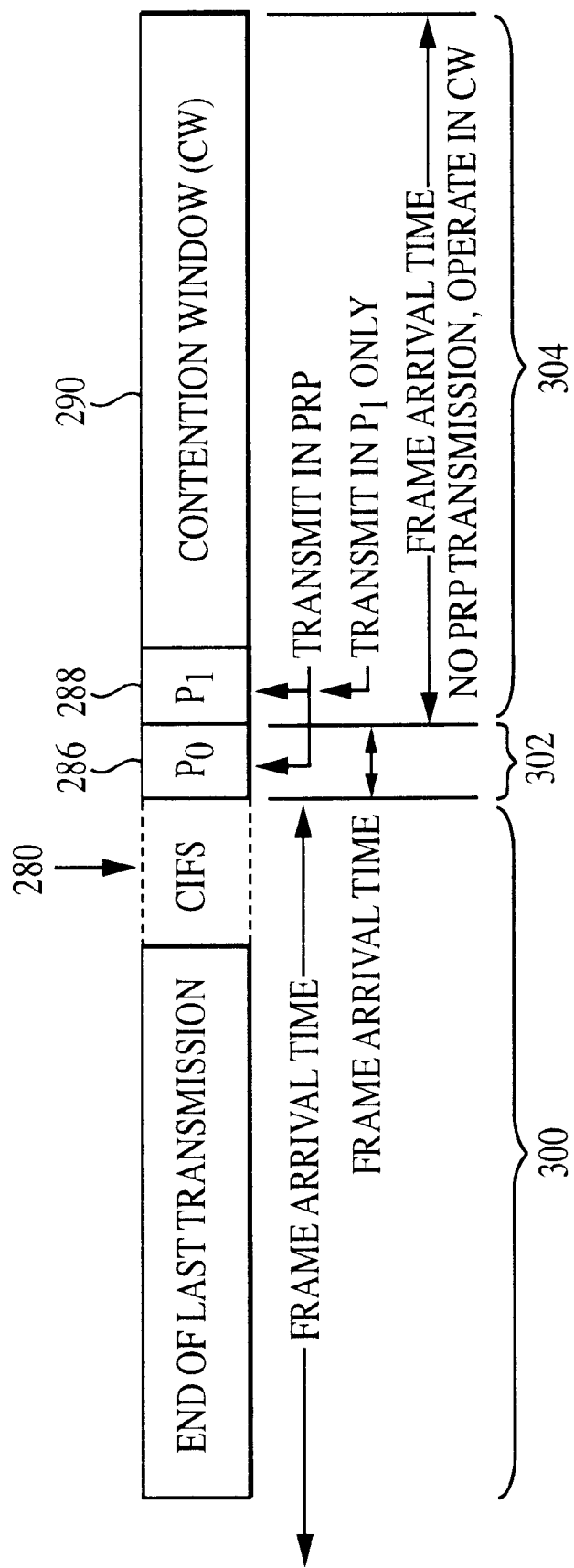
FIG. 20 is a depiction of priority and contention resolution slot signaling based on the arrival time of the frame to be transmitted.

Referring to FIG. 20, frame or packet arrival time determines the extent to which the station participates in the PRP and Contention Window signaling. If the packet arrival time (i.e., the point at which the packet is queued for transmission at the PHY and thus deemed "pending") occurs during the transmission of another packet or the subsequent CIFS interval (indicated as a first packet arrival time 300), then the station that intends to transmit participates in the PRP slots 286, 288 and the Contention Window 290 according to the channel access procedure described. If the frame is queued for transmission by the MAC during P₀ 286 (indicated as a second packet arrival time 302), then the station can participate in the P₁ slot 288 so long as the priority of the frame was not already pre-empted under the above rules for priority resolution. The frame can follow the backoff procedure if the station is able to contend based on the results of priority resolution. If the frame is queued for transmission during P₁ 288 or the Contention Window 290 (indicated as a third packet arrival time 304), the station cannot participate in the PRP but follows the backoff procedure during the Contention Window 290 so long as the priority of the frame to be transmitted is not pre-empted under the above rules for priority resolution.

After transmitting a frame that requires a response, the transmitter waits a response interval before determining that the frame transmission has failed. If frame reception has not started by the end of the response interval, the transmitter invokes its backoff procedure. If frame reception has started, the station waits for the frame end to determine whether the frame transmission was successful. Reception of a valid ACK is used to deem the frame transmission successful and to commence with the next segment or report successful transmission. Reception of a valid NACK causes the transmitter to invoke its backoff procedure for retransmission of the frame and reset BPC to zero. If the transmitter receives a valid FAIL, the transmitters delays for a predetermined period before resetting BPC and invoking the backoff procedure. The reception of any other valid or invalid frame is interpreted as a failed transmission. The station invokes the backoff procedure at the end of reception and processes the received frame.

Transmitting stations continue retransmission until the frame exchange is successful or the appropriate TC limit is reached, or the transmit lifetime (FrmTimer) is exceeded. Stations maintain the transmit count for each frame transmitted. The TC is incremented with every transmission of the frame. The transmit count is reset to zero when the frame is successfully transmitted, or when the frame is discarded because either the retransmission limit or transmit lifetime has been exceeded.

As indicated above, the VCS Timer is maintained by all stations to improve reliability of channel access. The VCS timer is set based on information contained in the Frame Control field of the frame delimiters. Stations use this information to compute the expected busy condition of the medium and store this information in the VCS timer. The VCS timer is updated with the information from every correctly received Frame Control field. Receiving stations follow the rules defined in Table 4 based upon the reception of the specified Delimiter types, where Frame length is measured in number of symbols.

TABLE 4

| Received Frame Control Delimiter Type | New VCS Timer Value | New VPF Value |
|---|---|---|
| Start of frame with no response expected | Frame Length × SymbolTime + EGF + DelimiterTime + CIFS | 1 |
| Start of frame with response expected | Frame Length × SymbolTime + EFG + DelimiterTime + RIFS + DelimiterTime + CIFS | 1 |
| End of frame with no response expected | CIFS | 1 |
| End of frame with response expected | RIFS + DelimiterTime + CIFS | 1 |
| Frame response of any type | CIFS | 1 |
| Priority Resolution Symbol greater than the frame queued for transmission | EIFS | 0 |
| Reserved frame type for frame with bad CRC | EIFS | 0 |
| Frame control with bad CRC | EIFS | 0 |

TABLE 4-continued

| Received Frame Control Delimiter Type | New VCS Timer Value | New VPF Value |
|---|---|---|
| Start of frame length field a reserved value | EIFS | 0 |

The VCS timer is also updated at the end of a PRP when the station determines that it cannot contend for access.

As mentioned above, the MAC unit 18 supports segmentation/reassembly. The process of partitioning MSDUs from the host into smaller MAC frames is referred to as segmentation. The reverse process is called reassembly. Segmentation improves chances of frame delivery over harsh channels and contributes to better latency characteristics for stations of higher priority. All forms of addressed delivery (unicast, multicast, broadcast) may be subject to segmentation.

An MSDU arriving at the MAC unit 18 is placed in one or more segments depending on the size of the MSDU and the data rate the link will sustain. Every effort is made to transmit all of the segments of a single MSDU in a single, continuous burst of MAC frames. Acknowledgments and retransmissions occur independently for each segment.

When an MSDU is segmented into a number of segments, the segments are sent in a single burst, if possible, to minimize the demands on the receiver resources and maximize the throughput of the network, while still taking into account latency response and jitter performance. Segment bursting is accomplished by using the Contention Control and Channel Access Priority fields in the Frame Control, as discussed earlier with reference to FIG. 5B. A segment burst may be preempted by a station with a transmission of a higher priority.

When sending a segment burst, a station contends for the medium in the normal fashion, that is, in the manner described above. Once the station has control of the medium, it sets the Contention Control bit to 0b1, inserts the priority of the MSDU (to which the segment belongs) into the Channel Access Priority field of the Frame Control and transmits the segments in a burst without further contending for the medium with stations having transmissions of the same or lower priority. The station defers to transmissions having a higher priority that are indicated in the priority resolution period following the transmission of every segment. In the last segment of the MSDU, the station clears the Contention Control Bit to 0b0 in the Frame Control before transmitting the segment to allow normal contention by all stations in the PRP following the conclusion of the transmission.

If a station receives a transmission request for a frame of a higher priority than the priority of the segment burst that is occupying the medium, it contends for the medium in the PRP immediately following the transmission of the current segment. If the segment burst is pre-empted by a higher priority pending frame, the station that had been performing the segment bursting contends for the medium to resume the segment burst. The station resumes the segment burst when it has regained control of the medium.

Thus, segment bursting provides a single station control of the medium at a given priority level. By assuming the highest priority level (CA3), a station may preclude any other station from accessing the medium for the duration of the segment burst and the segment burst can proceed uninterrupted. Because bursting at the CA3 priority level blocks higher priority traffic (i.e., contention-free traffic) and thus impacts QoS, however, it is desirable to place restrictions on the use of the CA3 priority level. For example, the CA3 level could be restricted to contention-free transmissions only. Alternatively, segment bursting could be restricted to priority levels CA0 through CA2, as well as CA3 (for contention-free traffic only).

Like priority, latency plays a critical role in frame delivery performance for QoS. Moreover, poor latency characteristics can have an adverse impact on frame delivery performance at a specified priority level. One way to limit this impact is to bound latency in some manner. In the described embodiment, the length of frames is limited to ensure that any transmission occupies the medium for no longer than a predetermined time threshold, e.g., 2 ms. Preferably, for maximum performance at the highest priority level, the highest priority level traffic is excluded from the frame length restriction or subject to a more relaxed limit. Alternatively, however, for ease of implementation, all levels could be subject to the frame length limit restriction. Another way to bound latency and thus improve delivery performance is to limit segment bursts under certain conditions (for example, in the manner discussed above, so that a segment burst can be interrupted by a higher priority class of traffic).

Figure 21:
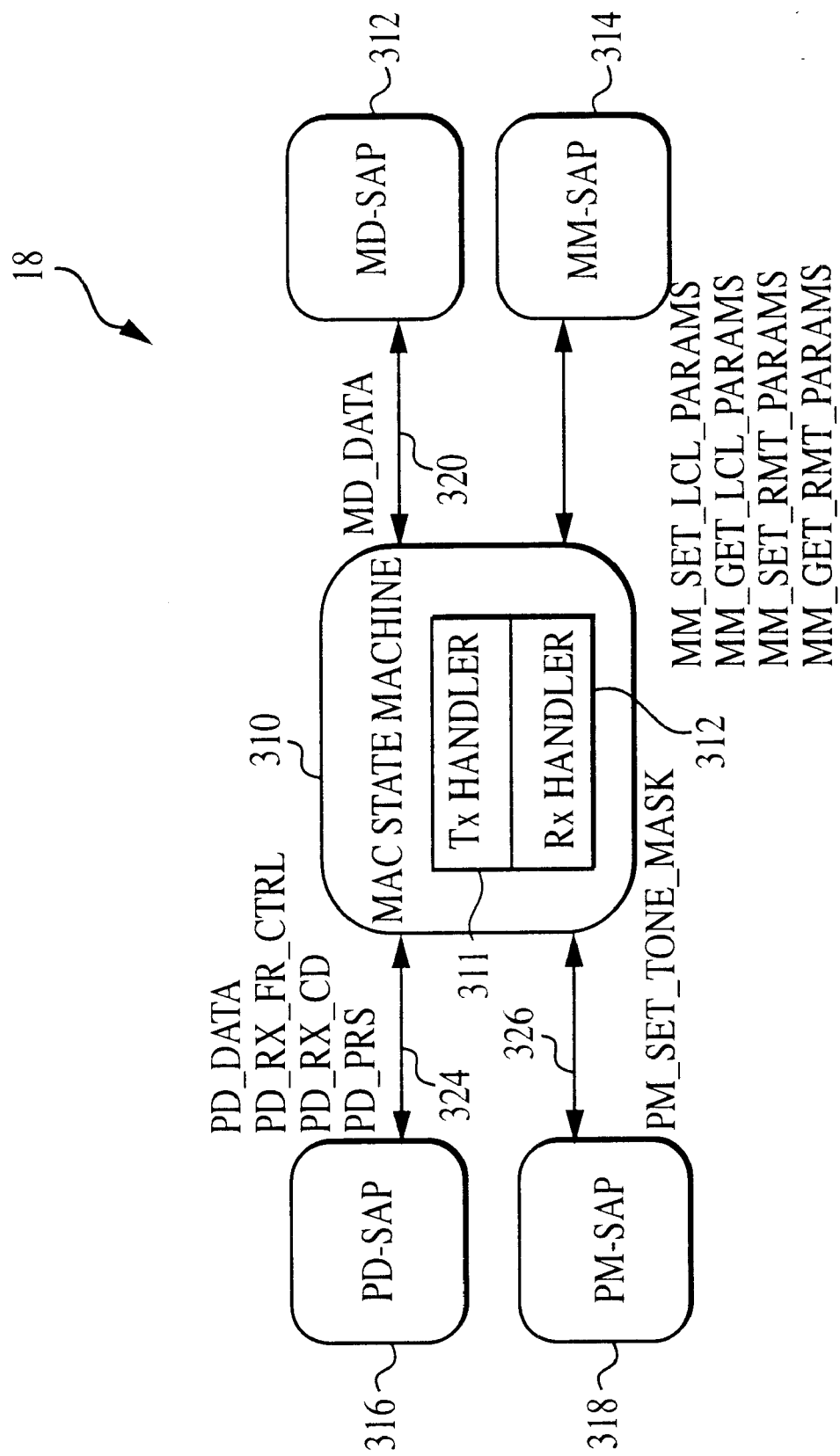
FIG. 21 is a block diagram of the MAC unit (shown in FIG. 1), the MAC unit including a state machine having a Transmit (TX) handler and a Receive (RX) handler.

Referring to FIG. 21, the functionality of the MAC unit 18 is depicted as a MAC state machine 310, including a TX handler 311 and RX handler 312, coupled to several Service Access Points, including, on the MAC-LLC interface side, a MAC Data Service Access Point (MD-SAP) 313 and a MAC Management Service Access Point (MM-SAP) 314, and on the MAC-PHY interface side, a PHY Data Service Access Point (PD-SAP) 316 and a PHY Management SAP (PM-SAP) 318. The MAC state machine 310 provides services to the Logical Link Control (LLC) sublayer through the MAC Data Service Access Point (MD-SAP) 313. The state machine 310 is managed by the LLC sublayer through the MAC Management Service Access Point (MM-SAP) 314. The MAC state machine 310 uses the services of the PHY layer through the PHY Data Service Access Point (PD-SAP) 316 and manages the PHY through the PHY Management SAP (PM-SAP) 318.

The MAC Data Service provides transport of a MSDU from one MD-SAP 313 to one or more such MAC data service access points, allowing the selection of encryption, priority, retry strategy and direct acknowledgment services for each MSDU transmitted, as well as an indication of the priority and encryption services for each MSDU received. The MAC data service includes the following primitives: MD_DATA.Req; MD_DATA.Conf; and MD_DATA.Ind 320. The MD_DATA.Req primitive requests a transfer of an MSDU from a local LLC sublayer to a single peer LLC sublayer entity, or multiple peer LLC sublayer entities (in the case of group addresses). This primitive is formatted to include the following: frame length; MAC sublayer destination address or addresses; MAC sublayer source address of the transmitting station; requested priority (values 0 through 3 or "contention-free") for the frame to be sent; lifetime of frame (amount of time before frame is to be discarded); retry control to indicate the desired retransmission strategy to be used if necessary; encryption key select, an integer value from 0 through 255 that indicates the network encryption key to be used to encrypt the frame prior to transmission; encryption enable to enable or disable encryption; response requested to indicate that a response to this frame is desired from the destination; type to indicate the upper layer protocol type; and data, or more specifically, the upper layer data that is to be transported to the peer MAC sublayer entity at the specified destination address or addresses. The MD_DATA.Conf primitive confirms the receipt of the MD_DATA.Req by the MAC and indicates the result of the requested transmission in the form of a status indicating the success or failure of that transmission. The MD_DATA.Ind primitive indicates a transfer of an MSDU to the LLC sublayer entity from a single peer LLC sublayer entity. It includes the frame length, the DA, the SA of the station that transmitted the frame, the priority at which the frame was received, the encryption key select indicating the encryption key that was used to encrypt the frame; encryption enable; type (again, upper layer protocol) and the data that was transported from the peer MAC sublayer entity at the source address.

The PHY provides services to the MAC through a set of data service primitives 324 and management service primitives 326. The PD_DATA.Req primitive requests that the PHY begin transmission of information onto the medium. In response, the PHY sends the start delimiter, the MAC Protocol Data Unit (MPDU) and the end delimiter. The request includes a TX channel map index value to be used to configure the PHY transmit units, along with the 25 bits of SOF delimiter, payload and the 25 bits of EOF delimiter. The PD_DATA.Conf primitive confirms the transmission requested by the PD_DATA_Req primitive. It indicates the status of the transmission as either a success or failure. The PD_DATA.Ind primitive indicates to the MAC that a transmission has been received by the PHY. It includes channel characteristics, channel access priority, segment length, MPDU and an FEC Error Flag. The channel characteristics include a list of information to be used for channel estimation. The channel access priority is the value of the priority information received in the end delimiter. The MPDU is the information transmitted by the peer MAC entity. The FEC error flag is a value that indicates that the FEC determined that there was an uncorrectable error in the received information. The PD_Data.Rsp primitive causes the PHY to transmit a requested response delimiter and specifies the information to be carried in the response delimiter. It specifies a status (that is, the requested response type to be transmitted, e.g., ACK, NACK or FAIL), the contention control value and channel access priority. The PD_RX_FR_CRTL.Ind primitive provides an indication to the MAC entity of the information received in the start and end delimiters. The PD_RX_FR_CTRL.Rsp primitive is used by the MAC entity to provide control information to the PHY. It includes a receive state to indicate that the PHY should be scanning for delimiters or that the PHY should be in the active receive state. The PD_RX_FR_CTRL.Rsp primitive further specifies a frame length corresponding to the number of symbols that the PHY is expected to receive and the RX channel map listing the tones that are to be used for reception. The PD_PRS_Listen.Req primitive is used by the MAC entity to request that the PHY listen during the PRP slots and the PD_PRS.Ind primitive is used by the PHY to indicate to the MAC entity that a priority resolution symbol was received. The PD_PRS.Req is used by the MAC entity to request that the PHY transmit a priority resolution symbol. The PHY Management Services primitives 326 include the following: PM_SET_TONE_MASK.Req, which requests that the PHY set the mask of tones not to be used for transmission or reception, and PM_SET_TONE_MASK.Conf to indicate the success or failure of that requested operation.

Figure 22:
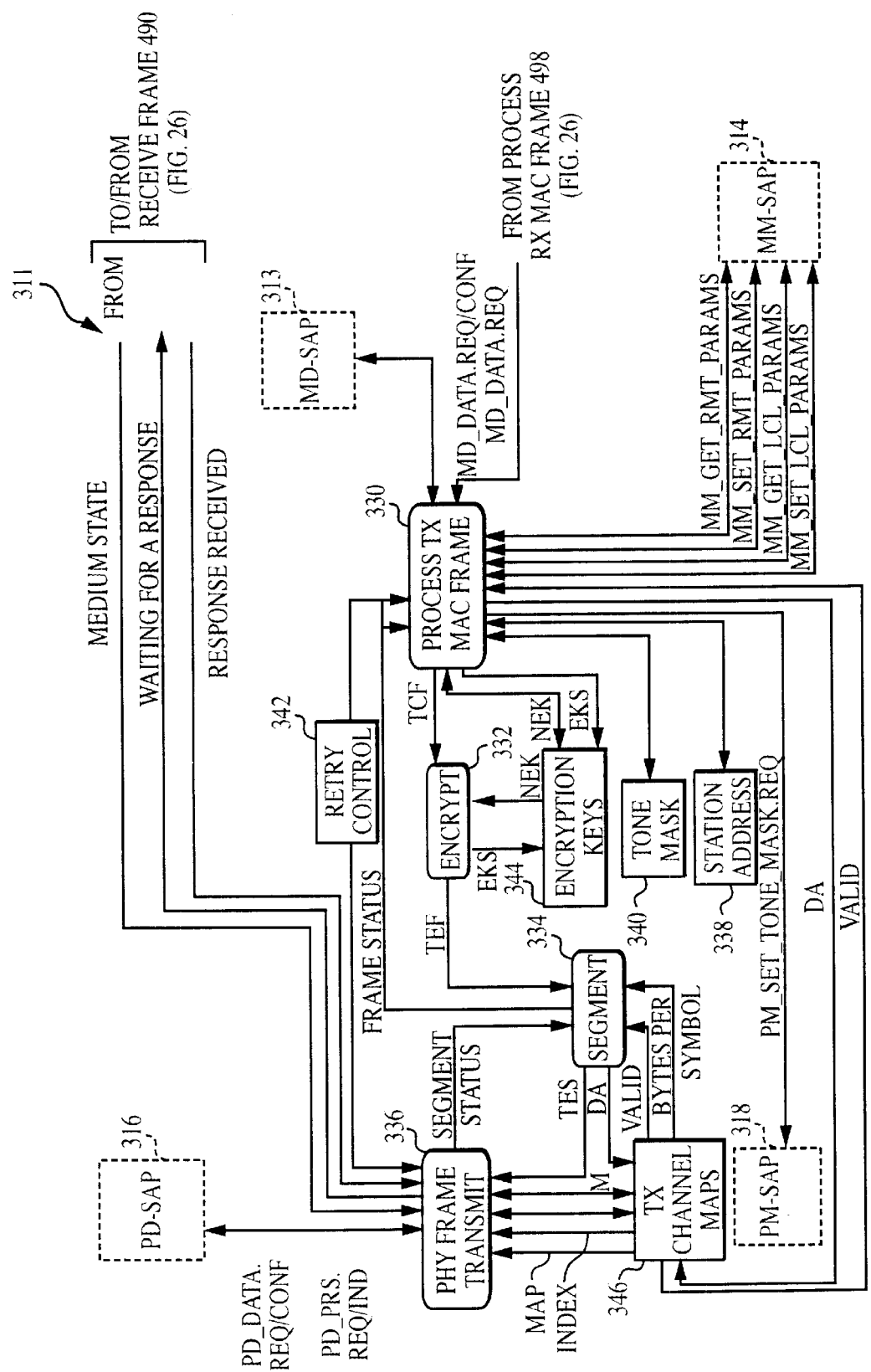
FIG. 22 is a block diagram of the TX handler of FIG. 21.

Referring to FIG. 22, an architectural representation of the MAC transmit (TX) handler 311 is shown. The transmit handler 311 includes four processes: a Transmit MAC Frame Processing Process 330, an Encryption process 332, a Segmentation process 334 and a PHY frame transmit process 336. The TX handler 311 stores the following parameters: station (or device) address 338; tone mask 340, retry control 342, network encryption key(s) 344 and TX channel maps 346.

The TX MAC Frame Processing process 330 operates on data requests and management set/get requests (as earlier described). It receives as inputs the following: MD_Data.Req data primitive from the MD_SAP 313; a Network key from Encryption keys 344; a Tone Mask from Tone Mask 340; station address from the device address unit 338; TX channel map validity and TX frame status; and set/get request management primitives from MM_SAP 314. In response to these inputs, it provides the following: the MD_Data.Conf data primitive; Retry Control; network key and key select; tone mask; new station address; PM_SET_TONE_MASK.Req management primitive; a TX channel map index for the DA; and TX cleartxt frame (TCF), based on the MD_Data.Req. Whether the process 330 inserts in the TCF any MAC management information field subfields depends on the content of the input management primitives, in particular, MM_SET_RMT_PARAMS.req, and other inputs.

The Encryption Process 332 receives as inputs the TX cleartext frame (TCF) and the selected network key. The encryption process 332 determines if encryption is enabled, and if so, obtains the random 8-bytes IV value, appends an Integrity Check Value and encrypts the TEF, the selected network encryption key and the IV to form a TX encrypted frame (TEF). The Encryption Process 332 provides the TEF to the Segmentation Process 334.

The Segmentation Process 334 produces segments based on a maximum frame length. The Segmentation Process 334 segments MSDUs by partitioning the frame body into segments based on a maximum segment (or frame) size until the last segment; however, the partitioning can be suitably adjusted to meet other performance parameters as well. For example, it may be desirable to make the first segment have a minimum length to shorten the amount of time before a hidden node hears the response transmission. Once transmission is attempted for a segment, the content and length shall not change for that segment until the segment is successfully delivered to the destination or a change in modulation is required.

Figure 24:
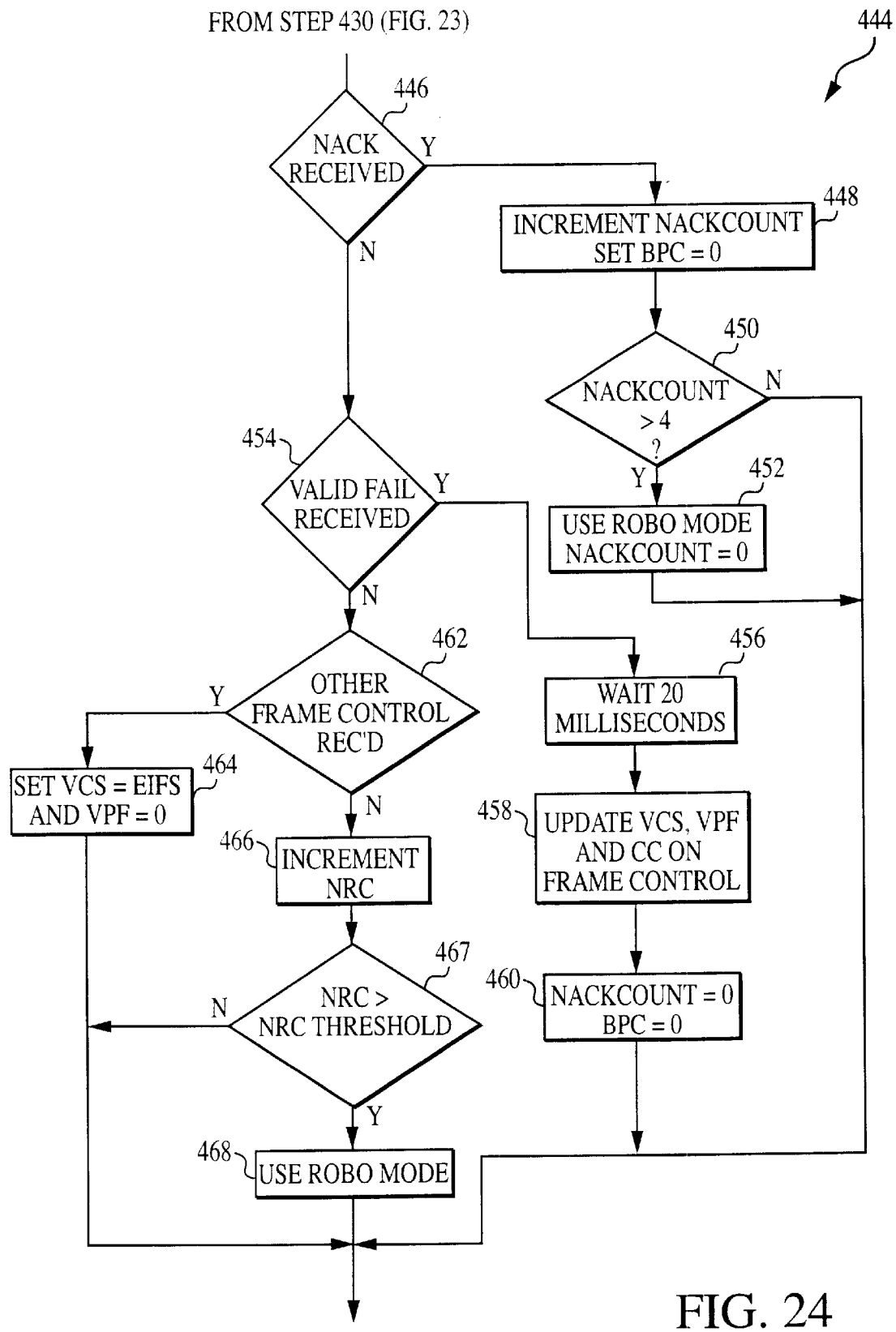
FIG. 24 is a flow diagram of a response resolve process performed by the frame transmit process of FIG. 23.
Figure 25:
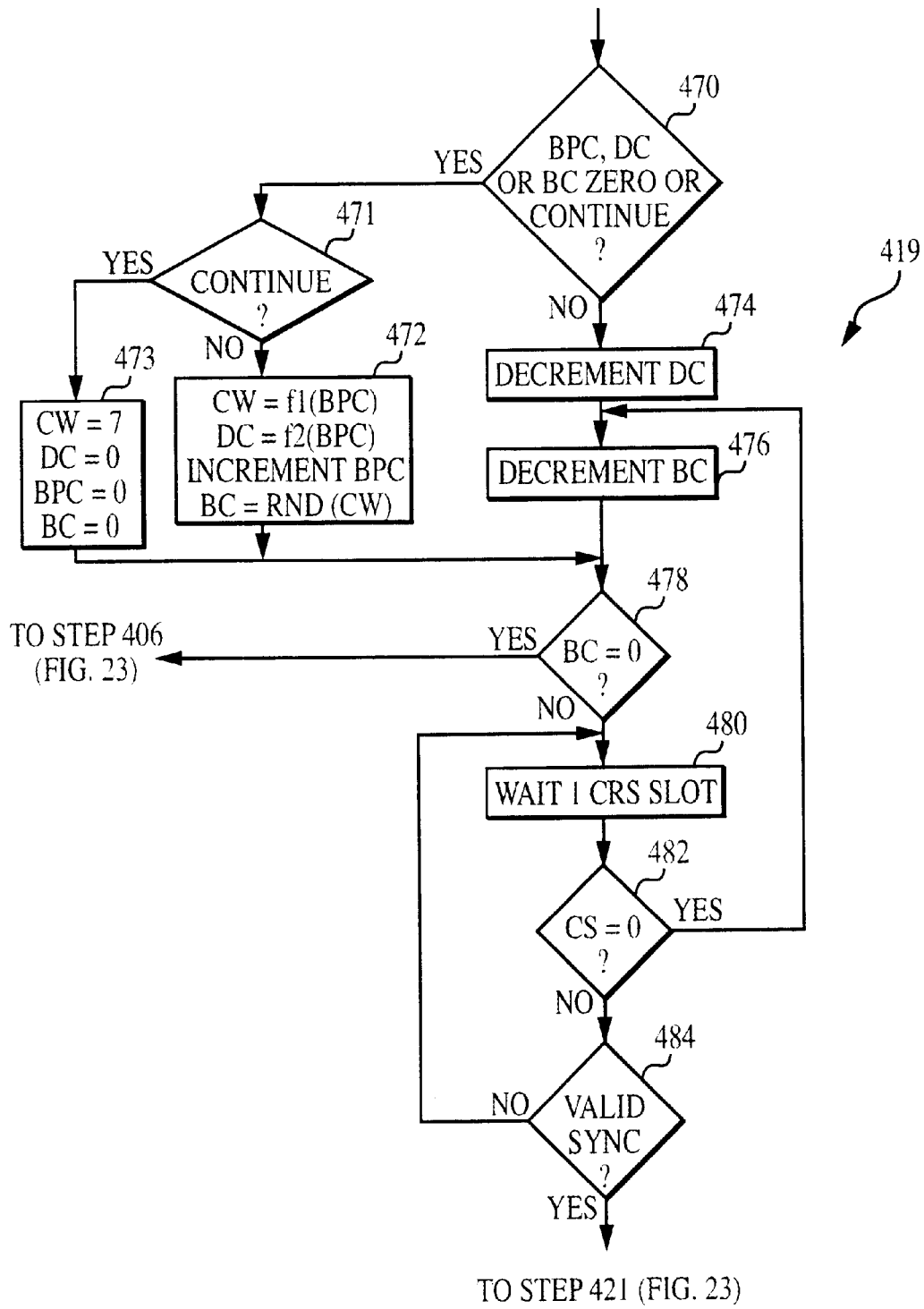
FIG. 25 is a flow diagram of a contend-for-access process performed by the frame transmit process of FIG. 23.

The PHY Frame Transmit Process 336 initiates a transmission or transmission attempt using Channel Contention with priority as discussed above. The PHY Frame Transmit Process 336 is shown in FIGS. 23 through 25.

Figure 23B:
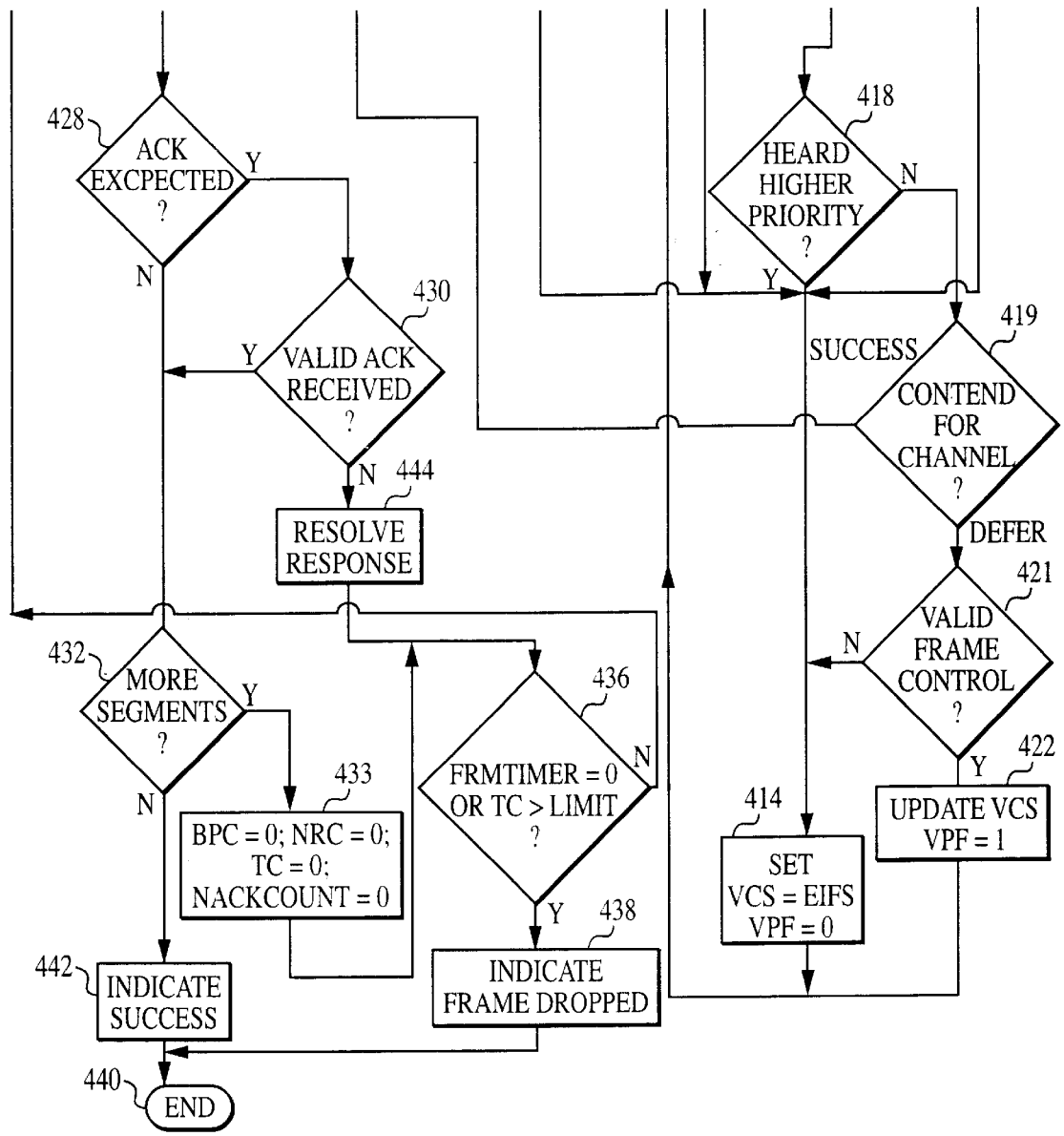
FIG. 23 is a flow diagram of a frame transmit process performed by the TX handler of FIG. 22.

Referring to FIG. 23, the PHY Frame Transmit process 336 begins with the arrival of a frame to be sent over the transmission medium (step 400). The transmitter initializes control for maintaining timing information and priority (step 402). The timing information includes the counts maintained by the Backoff Procedure Count (BPC), the Transmit counter (TC), the NACK counter (NACKcount) and the No Response counter (NRC), each of which is set to a zero value. The timing information further includes the timer corresponding to the transmit lifetime value, FrmTimer. The FrmTimer is set to a maximum value (MaxLife) as a default unless a lifetime value is passed down to the MAC unit by the LLC unit. The priority is set to the value of the channel access priority assigned to the frame. The transmitter detects if the medium is busy by determining if the values of the VCS and CS are equal to zero (step 403). If these values are non-zero, that is, the medium is busy, the transmitter waits until it detects a zero value for both while, at the same time, updating the values of VCS, VPF and CC based on valid delimiters received over the medium (step 404). It then determines if VPF is equal to one (step 405). If VPF is equal to zero, the frame segment is transmitted and TC is incremented (step 406). If, at step 403, the medium is determined to be idle, the transmitter determines if the arrival has occurred during a Carrier Sense Slot (CSS), that is, during CIFS (step 407). If the arrival has occurred during a CSS, or, at step 405, VPF=1, then the transmitter determines if a signal has been sensed in the CSS (step 408). If the arrival occurred during the CSS (at step 407) but no signal was sensed during that period (at step 408), or the arrival occurred during one of slots in the Priority Resolution Slots interval (step 409), then the transmitter determines if the previous transmission indicated contention-free access, that is, included a set CC bit (step 410). If contention-free access is indicated, the transmitter determines whether it can interrupt by comparing its priority (the priority of the frame awaiting transmission) to that of the priority indicated in the EOF and/or response, or continue if the last transmission was a previous segment of the frame to be sent (step 412). If the transmitter cannot interrupt or continue (as part of an already in-progress transmission stream, e.g., during a segment burst or exchange of frames between stations during a contention-free period), it sets the VCS value to the EIFS and VPF to zero (step 414). If, at step 412, it is determined that the transmitter can interrupt or continue, or, at step 410, it is determined that contention-free access is not indicated, the transmitter signals its priority and listens for the priority of other stations also awaiting channel access (step 416).

If the transmitter does not detect a higher priority (step 418), it proceeds to contend for channel access (step 419). If the contention is successful, the process transmits the segment and increments the TC (at step 406). If the contention is unsuccessful (that is, another station is currently transmitting), it determines if the frame control field of the current transmission is valid (step 421). If the frame control field is valid, the transmitter sets VPF to one and updates VCS based on that frame control information (step 422), and returns to step 404 to wait for an idle channel. If the frame control field is invalid (as might be the case for a false synch or weak signal), the transmitter returns to step 414 (setting VCS equal to EIFS and VPF=0).

Referring back to step 409, if the frame arrives after the PRS interval but is determined to have arrived during the Contention Window (step 423), the transmitter determines if the previous frame transmission was contention-free (step 424). If contention-free access is not indicated, the transmitter proceeds to step 418 (for determining if a higher priority has been detected). If contention-free access is indicated, the transmitter determines if it can interrupt the transmission (step 426). If the transmitter cannot interrupt, it updates the VCS and VPF at step 414, and returns to step 404 to wait for the next idle channel. If it is determined that the transmitter can interrupt at step 426, the transmitter proceeds to step 418. If the frame is determined to have arrived after the Contention Window at step 423, the transmitter transmits the frame segment and increments the TC by one at step 406.

After a frame segment is transmitted at step 406, the transmitter determines if a response or acknowledgment is expected (step 428). If an acknowledgment is expected and received (step 430), or an acknowledgement is not expected, the transmitter determines if any additional segments are to be transmitted as part of a data transmission stream or burst (step 432). If so, the transmitter resets BPC, TC, NACKcount and NRC to zero (step 433). The transmitter then determines if the frame should be dropped by determining if the FrmTimer is equal to zero or TC exceeds the transmit limit (step 436). If either condition is true, the transmitter reports that the frame has been discarded (step 438) and the process terminates (step 440). If the frame is not to be discarded but instead re-transmitted, the transmitter returns to step 403. If there are no more segments to be transmitted at step 432, the transmitter reports a successful transmission (step 442), and terminates the process at step 440. If an acknowledgment is expected and not received at step 430, the process further resolves the response (step 444) and proceeds to the frame discarding determination at step 436.

Referring to FIG. 24, the process of resolving the response 444 begins with determining if a NACK has been received (step 446). If a NACK has been received, the NACKcount is incremented and BPC is set to zero (step 448). The process 444 determines if the NACKcount is greater than the NACKcount threshold (in this example, a threshold of 4) (step 450). If the NACKcount is determined to be greater than the threshold of 4, the process resets the NACKcount to zero and uses the robust (ROBO) transmission mode (step 452), and proceeds to step 436 (FIG. 23). If the NACKcount is not greater than the threshold, the process goes to step 436 directly. If a response is expected and a FAIL response is received (step 454), the process waits a predetermined period, in the illustrated example, 20 ms, (step 456) while updating VCS, VPF and CC on any valid frame control information (step 458), sets both NACKcount and BPC to zero (step 460) and returns to step 436. If a response is expected and no response is received (i.e., no FAIL received at step 454), the process determines if other frame control information has been received (step 462) and, if so, sets VCS to EIFS and VPF to zero (step 464). Otherwise, the process increments NRC (step 466) and determines if the NRC is greater than an NRC threshold (step 467). If the NRC is determined to be greater than the NRC threshold, the process uses ROBO Mode (step 468) and again returns to step 436. If it is determined that the NRC is not greater than the NRC threshold at step 467, the process returns to step 436 without adjustment to modulation mode.

Referring to FIG. 25, the channel access contention process 419 begins by determining if the BPC, DC or BC is zero (step 470). If yes, the process determines if the segment to be transmitted is a continuation of a previous transmission (step 471). If it is not, the process performs the following: establishes the Contention Window CW and the Deferral Count DC as a function of the BPC, that is, CW=f1(BPC), where f1(BPC)=7, 15, 31, 63 for BPC=0, 1, 2, >2, respectively, and DC=f2(BPC), where f2(BPC)=0, 1, 3, 15 for BPC=0, 1, 2, >2, respectively; increments BPC; and sets BC=Rnd(CW), where Rnd(CW) is a uniformly distributed random integer from the interval (0, CW) (step 472). If a continuation (at step 471), then the process sets CW=7, DC=0, BPC=0 and BC=0. If BPC, DC or BC are not zero at step 470, the process decrements DC (step 474) and decrements BC (step 476). After steps 472, 473 or 476, the process 419 determines if BC is equal to zero (step 478). If BC is zero, then the process goes to step 406, initiating packet transmission and incrementing TC (FIG. 23). If BC is not equal to zero, the process waits for one CRS slot (step 480), and determines if CS is equal to zero (step 482). If CS is zero (i.e., a carrier is not detected), the process returns to step 476 (decrementing BC). If CS is not equal to zero at step 482, the process 419 determines if the synchronization signal in the current transmission is valid (step 484). If the signal is invalid, the process 419 returns to step 480 to wait the duration of another CRS slot. If the synchronization signal is valid, the process 419 proceeds to step 421 (FIG. 23) to determine the validity of the frame control field in the delimiter of the current transmission and thus no further contention is permitted.

Figure 26:
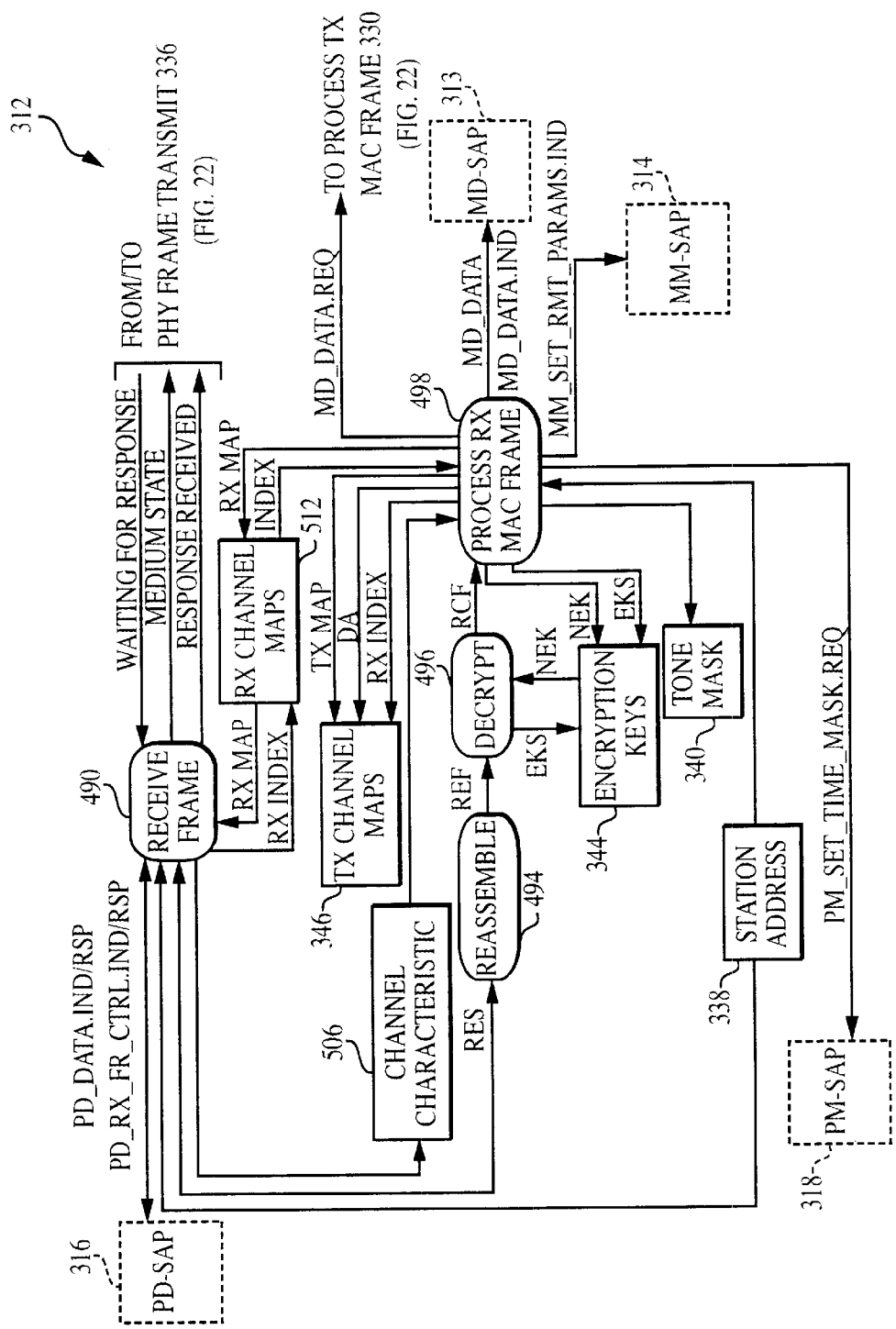
FIG. 26 is a block diagram of the RX handler of FIG. 21.

Referring to FIG. 26, an architectural representation of the MAC receive (RX) handler 312 is shown. The RX handler 312 includes four functions: a PHY Frame Receive process 490, a Reassembler 494, a decryption process 496 and a Receive MAC Frame Processing process 498. The RX handler 312 stores the following parameters: station address 338, tone mask 340, encryption key(s) 344, channel characteristics 506, RX channel maps 512 and the TX channel maps 346.

The PHY Frame Receive process 490 receives RX (optionally) encrypted segments (RES). That is, it parses frame control fields of any incoming segments, as well as receives the body of any incoming segments. It stores the channel characteristics and makes available the RES to the reassembly process 494.

Figures 27, 27A:
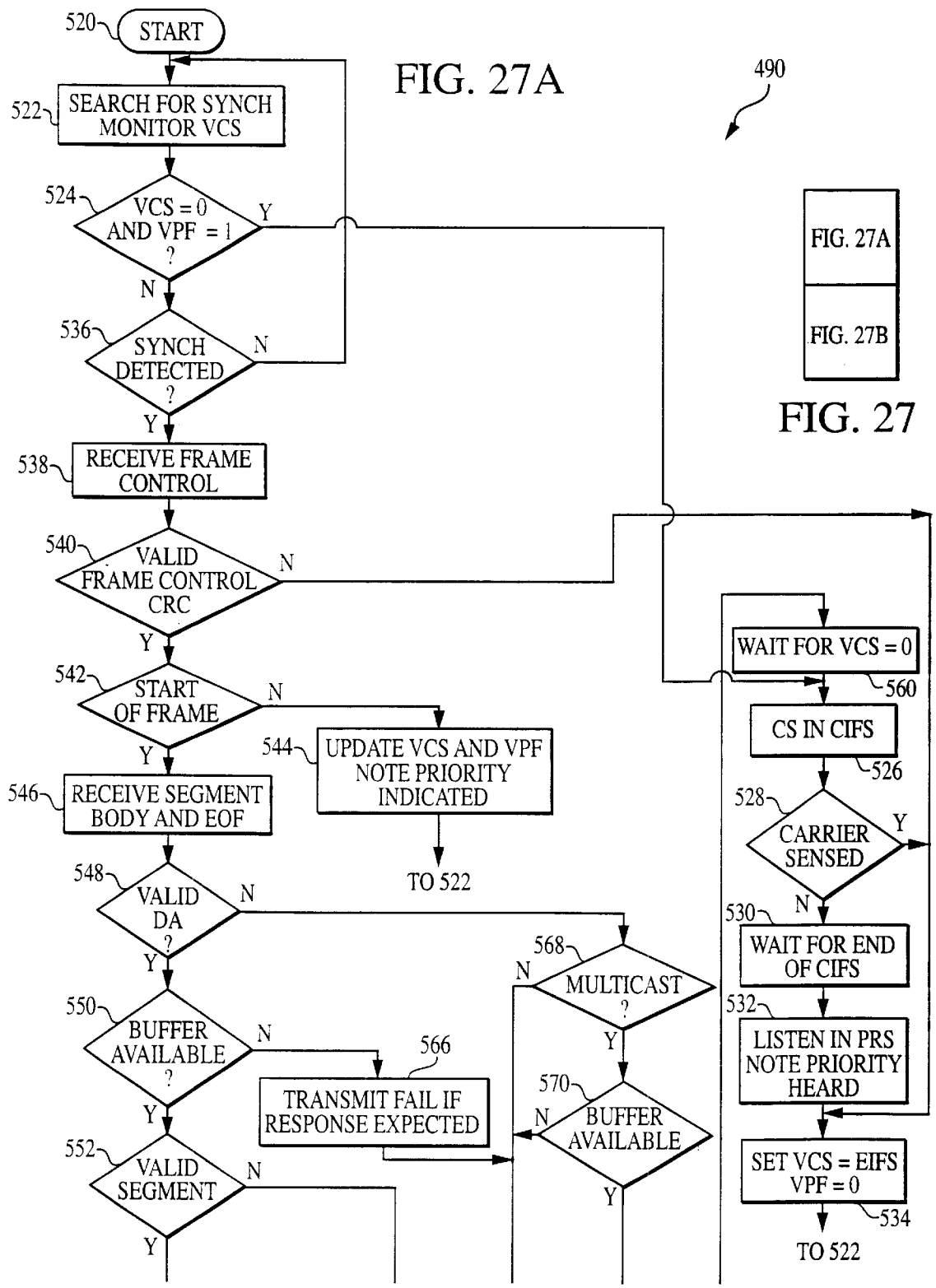
FIG. 27 is a flow diagram of a frame receive process performed by the RX handler of FIG. 26.
Figure 27B:
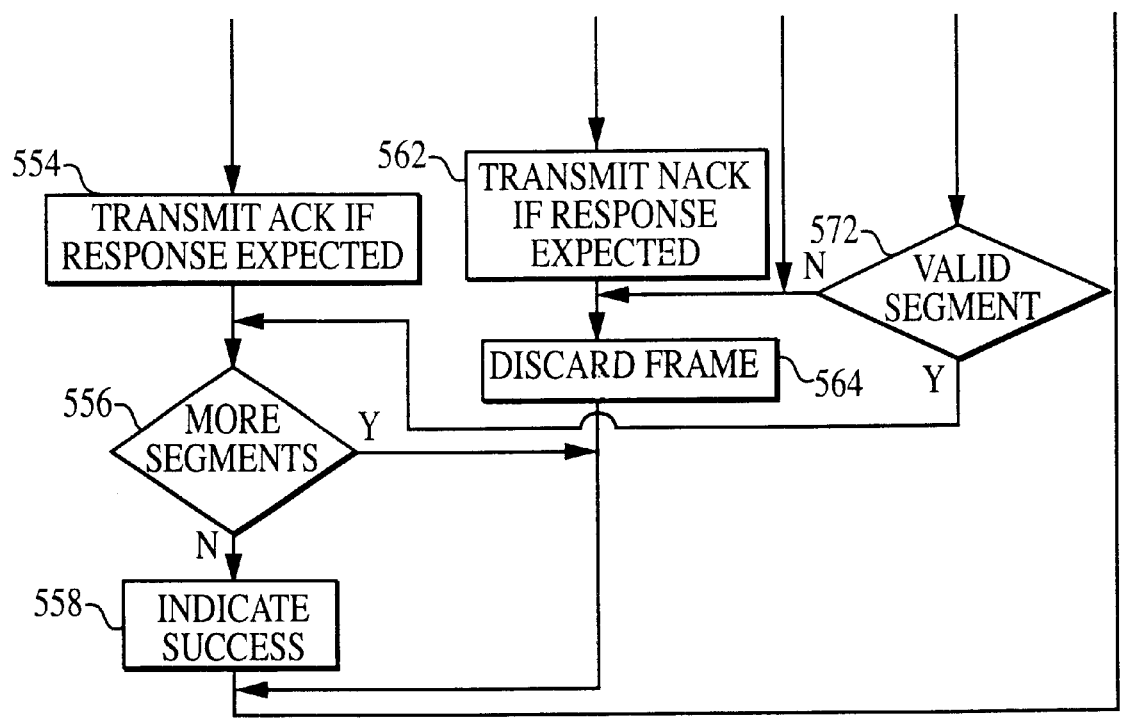

Referring to FIG. 27, the Frame Receive process 490 is as follows. The process 490 begins (step 520) by searching for a synchronization signal and monitoring VCS (step 522). The process 490 determines if VCS is equal to 0 and VPF is equal to 1 (step 524). If VCS is equal to 0 and VPF is equal to 1, the process senses for carriers in the CIFS (step 526) and determines if a carrier is sensed (step 528). If no carrier is sensed (at step 528), the process waits for the end of the CIFS (step 530) and listens in the PRS, noting any priority heard in that interval (step 532). It then sets VCS equal to EIFS and VPF equal to zero (step 534) and returns to step 522. If a carrier is sensed at step 528, then the process proceeds directly to step 534.

If VCS is not equal to 0 and VPF not equal to 1 (at step 524), the process determines if a synchronization signal has been detected (step 536). If the process determines that a synchronization signal has not been detected, the process returns to step 522. If the process determines that a synchronization signal has been detected (at step 536), the process receives and parses the frame control field in the delimiter of the incoming segment (step 538). The process determines if frame control is valid (based on the FCCS field) (step 540). If the frame control is invalid, the process proceeds to step 534. If the frame control is valid, the process determines if the frame control indicates a start-of-frame (step 542). If not a start-of-frame, the process updates the VCS and VPF, as well as notes the priority indicated by the frame control (step 544) and returns to step 522. If the frame control indicates a start-of-frame, that is, the frame control is in the start delimiter (and thus includes an index to the RX channel maps, a length, whether or not a response expected and contention control flag), the process receives the segment body and end delimiter (if an end delimiter was included in the frame)(step 546). The process determines if the DA is valid (step 548). If the DA is valid, the process determines if an RX buffer is available (step 550). If buffer space is available, the process determines if the segment is received in error by checking the FEC error flag and determining if a calculated CRC is not equal to the FCS (step 552) and, if valid and a response is requested, the process prepares and directs the transmission of an ACK response (using PD_DATA.Rsp with status=ACK), as well as stores the RES and the channel characteristics (step 554). The process determines if additional segments are to be received as part of a segmented frame (step 556). If no more segments are to be received, the process indicates successful frame reception (to the other RX processes 494, 496 and 498, shown in FIG. 26) (step 558) and proceeds to carrier sensing in the CIFS at step 526 after waiting for the value VCS to be equal to 0 in step 560.

Still referring to FIG. 27, and referring back to step 552, if the segment is invalid, and a response is expected, the process prepares and causes the transmission of a NACK response (that is, PD_Data.Rsp with status=NACK)(step 562). The process discards the frame (step 564) and returns to step 560. If, at step 550, buffer space is not available, and a response is expected, the process prepares and causes the transmission of a FAIL response (PD_DATA.Rsp with status=FAIL)(step 566) and returns to the step of discarding the frame at step 564. If, at step 548, the DA is invalid, the process determines if the segment is multicast addressed (step 568). If the segment is multicast-addressed, the process determines if buffer space is available (step 570). If buffer space is available, the process determines if the segment is valid (step 572). If the segment is valid, the process proceeds to step 556 to check for additional incoming segments. If, at step 568, the segment was determined to be unicast addressed, or, the process determines that the segment is multicast but that insufficient buffer space is available at step 570, the process proceeds to step 564 (discarding the frame).

Referring again to FIG. 26, the Reassembly process 494 accumulates segments received by the PHY frame receive process 490 until an entire frame is assembled. Each segment contains the Segment Control Field 106 (from FIG. 7), which provides the segment length (SL) 168, the segment count (SC) 172 and the last segment flag 170. The SL 168 specifies the number of MSDU bytes in the segment, since the segment is padded to match symbol block sizes, and is used to determine and extract MSDU bytes at the receiver. The SC 172 contains a sequentially increasing integer starting at zero for the first segment. The last segment flag is set to 0b1 for the last or only segment. The reassembly process 494 uses this and other information in each segment to reassembly the MSDU. The receiver reassembles the MSDU by combining segments in Segment count order until a segment with the last segment flag set to one is received. All segments are reassembled prior to decryption to extract the MSDU.

The process 494 begins by receiving the RES and determines if the SC is equal to zero. If SC=0 and the last segment flag is set, the RES is the only segment in the MSDU and the process provides the RES as a received encrypted frame (REF) to the decryption process 496. If the SC is not equal to zero, the process uses the segment control information to accumulate all of the segments in order until it sees the last segment flag set and reassembles the MSDU (or REF) from the accumulated segments. It then passes the REF to the decryption process 496.

The Decryption Process 496 generates cleartext from the REF. The decryption process 496 receives the encrypted, reassembled frame from the reassembler 494 and retrieves the NEK identified by the EKS in the EKS field 192 of the Encryption Control field 112 (from FIG. 8). If the IV in the REF is zero, the REF is determined to be unencrypted (actually, a receive cleartext frame or RCF) and the RCF is passed to the RX MAC Frame Processing process 498. If IV is not zero, the process 496 decrypts the frame using the DES algorithm with the IV and NEK. The process 496 determines if there are any errors in the REF and performs this task regardless of whether the REF is actually encrypted or not. If there are no errors detected by the decryption process for the REF (that is, the ICV in the REF is equal to the value calculated by the decryption process), the process 496 redefines the REF as an RCF and provides the RCF to the RX MAC Frame Processing process 498.

The RX MAC Frame Processing process 498 parses and processes the cleartext frame body. It determines the type of frame body from the type value specified in the first occurring type field. If the frame does not include the MAC management information field 182, then the type is that specified in the type field 184 indicating that the frame data to follow is MSDU data in the frame data field 186 (FIG. 8) and the type field 184 and the frame data 186, along with the DA field 108 and the SA field 110 (FIG. 3) are provided to the LLC layer for further processing. Otherwise, and referring back to FIG. 9, the type is specified in the type field 200 of the MAC management information field 182. If the number of entries indicated in the MCTRL field 206 is greater than zero, the process 498 processes each entry 204 in the MAC management information field 182 according to its respective entry type (as indicated in MTYPE field 218 in the MEHDR field 206). For example, if the MTYPE field 218 identifies the entry as the Multicast with Response entry 210H (FIG. 17), the process determines if the station address 338 matches any multicast destination addresses 272 specified in the entry 210H. Referring to FIG. 12B, if the entry is the Channel Estimation Response 210B, the process 498 associates the RXCMI 230 with the SA (specified in the frame header) as the DA, and stores the channel map information from the entry (and indexed by the RXCMI 230) in the TX channel maps 346 (FIG. 26) for use in transmissions to the frame's sender. If the entry is the Request Channel Estimation entry 210A (FIG. 12A), the process causes a Channel Estimation Response to be prepared (via the Channel Estimation process, as discussed earlier) and transmitted back to the frame's sender. If, and referring to FIG. 16, the process 498 determines that the entry type is the Set Network Encryption Key entry 210G (FIG. 16), the process 498 stores the EKS 266 in association with the NEK 268 in the Encryption Keys store 344 for use in encrypting/decrypting frame data for a logical network to which the key is assigned. Thus, the RX handler's process 498 takes any action appropriate to the type of data entry 204.

Figure 28:
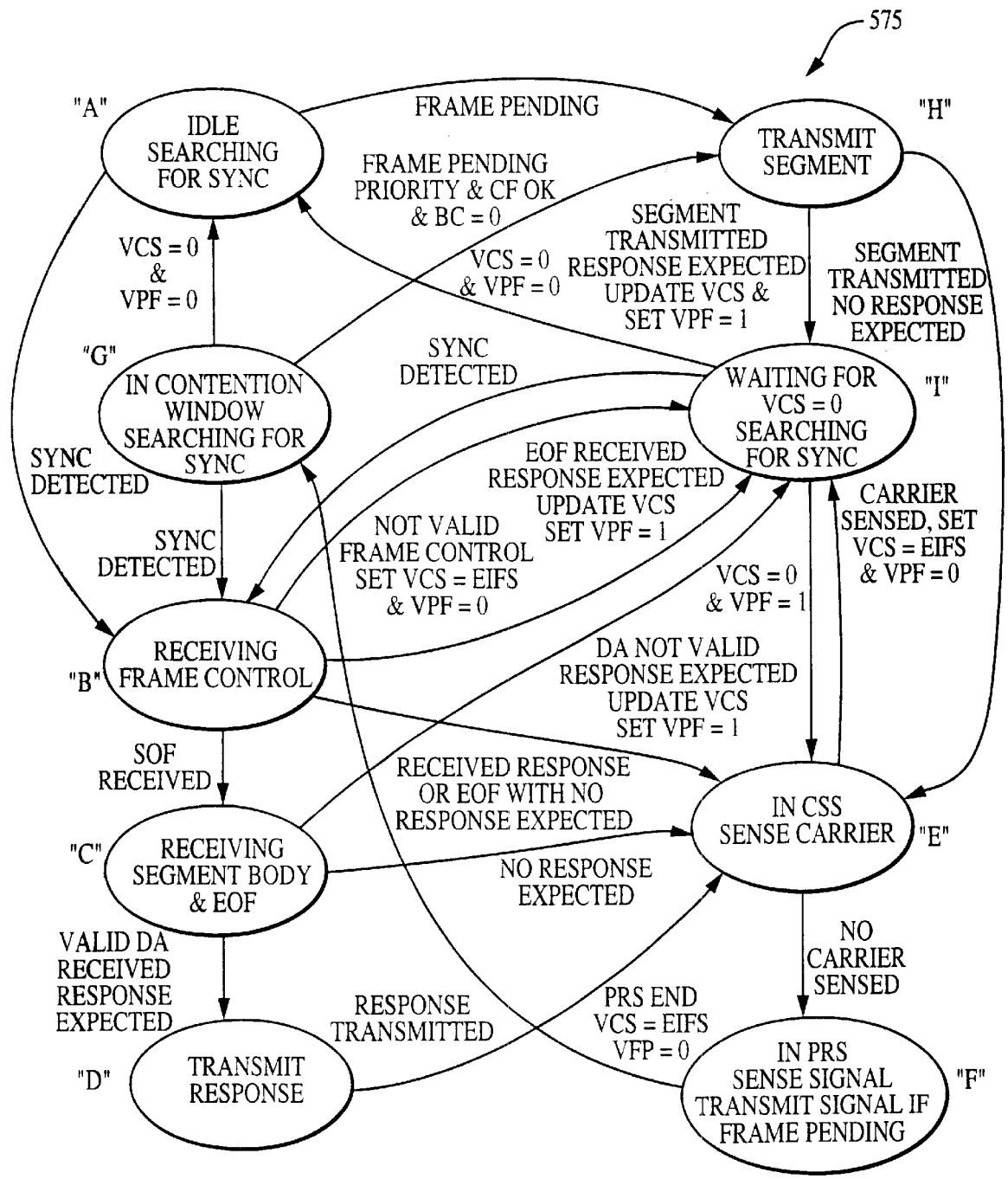
FIG. 28 is a state diagram illustrating aspects of the frame transmit process and the frame receive process illustrated in FIGS. 23 and 27, respectively.

In an alternative depiction of the transmit/receive processes, FIG. 28 is a state diagram depicting the transmit and receive processes (processes 336 and 490, respectively) of the MAC state machine 310 as a single transmit/receive state machine 575. Referring to FIG. 28, the state machine 575 begins in an idle state, searching for a synch signal (state "A"). If a synch signal is detected, the machine transitions to receiving frame control information (state "B"). If the received frame control indicates an SOF, the machine receives the segment body and EOF following the SOF (state "C"). If a valid DA is received and a response is expected, the machine transmits a response (state "D"). In the event that a response is transmitted (during state "D"), or if the frame control received at state "B" is a response or an EOF with no response expected, or, at state "C", no response is expected, the machine transitions to a state of sensing carrier in the CSS (state "E"). If no carrier is sensed, the machine enters a state of sensing PRS signaling (state "F"). Upon detecting the end of the PRS slots, the machine sets VCS=EIFS and VPF=0, and transitions to a state of searching for a synch in the contention window (state "G"). If VCS times out and VPF=0, the machine returns to state "A". If a frame is pending during state "A" or state "G" (and the backoff counter has a zero value during state "G"), the machine transmits the pending segment (state "H"). If a synch is detected during state "G", the machine again receives frame control information (state "B"). If, while in the receiving frame control state "B", the machine determines that the frame control is not valid, the machine sets VCS=EIFS and VPF=0, and proceeds to a state of waiting (for VCS=0) and searching for synch (state "I"). If, while in the receiving frame control state "B", the machine determines that an EOF was received and a response is expected, or, at state "C", determines that the DA is not valid and a response is expected, the machine updates VCS and sets VPF=1 and goes to state "I". If, at state "I", a synch is detected, the machine receives the frame control information (state "B"). If, during state "I", the VCS times out while VPF is 0, the machine returns to the idle state (state "A"). Otherwise, if VCS=0 and VPF=1, the machine enters state "E". If a carrier is sensed during state "E", the machine sets VCS=EIFS and VPF=0, and transitions to state "I". Returning briefly to state "H", if a segment is transmitted with no response expected, the machine enters state "E". If, during state H, a segment is transmitted with a response expected, the machine updates VCS and sets VPF=1, and then enters state "I".

As indicated above, a number of MAC functions are made available through the use of the MAC Management Information field 182 (FIG. 9), in conjunction with other frame fields. These features include, but are not limited to: encryption-based logical networks, partial ARQ for multicast and broadcast transmissions; bridging (with a bridge proxy); and such media access control techniques as token passing and polling.

Referring back to FIG. 1, the stations 12 in the network 10 may be logically separated for privacy. For example, and referring to FIG. 29, the station 12a and the station 12b located in a first dwelling that are able to communicate with the station 12c and the station 12d located in a second dwelling over a shared transmission medium 14 are separated logically into logical networks, that is, with stations 12a and 12b belonging to a first logical network 580 and stations 12c and 12d belonging to a second logical network 582. This logical separation of stations in a physical network into logical networks occurs in the MAC unit 18 and allows sets of stations on the physical network to operate as if there were a unique, separate network for each set. Privacy is provided by the 56-bit Data Encryption Standard (DES) encryption and authenticated key management.

All stations in a given logical network share a network key as a common key. That network key is the key that is assigned to the logical network. In addition to the network key, each station has a unique default key, typically preprogrammed by a manufacturer. A station's user generates the default key from a password (also provided by the manufacturer). The default key is used to allow secure communication between the station and one or more other stations that are members of logical networks, in order for the station to securely receive network keys for those logical networks. An exemplary mechanism for generating the default key from the password is the PBKDF1 function, as described in the PKCS #5 v2.0 standard, Password-based Cryptography Standard, using MD4 as the underlying hash algorithm. Thus, every station enters a logical network for the first time through the use of its password-derived default key.

Figure 30:
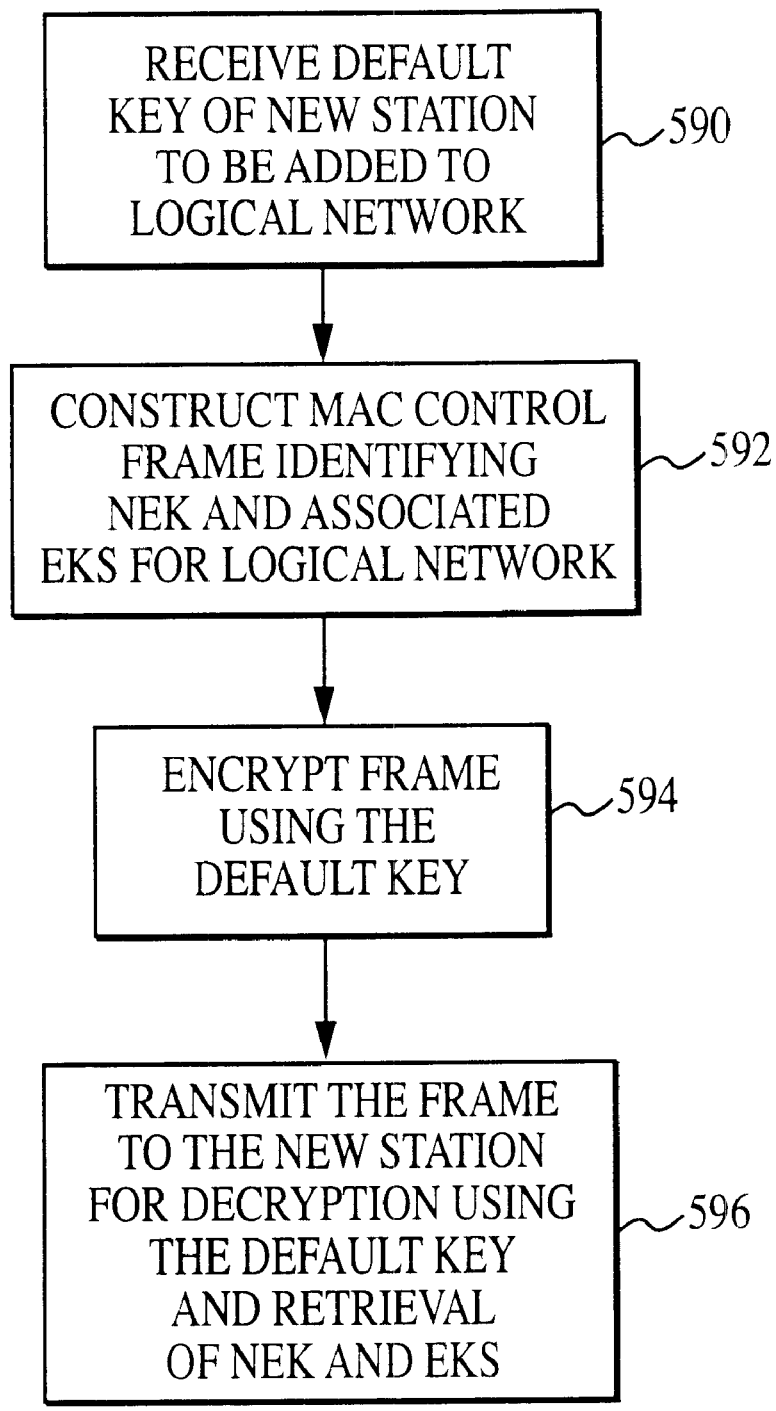
FIG. 30 is a flow diagram of a process for adding a new station as a member of a logical network (and using, as an example, one of the logical networks shown in FIG. 29).
Figure 31:
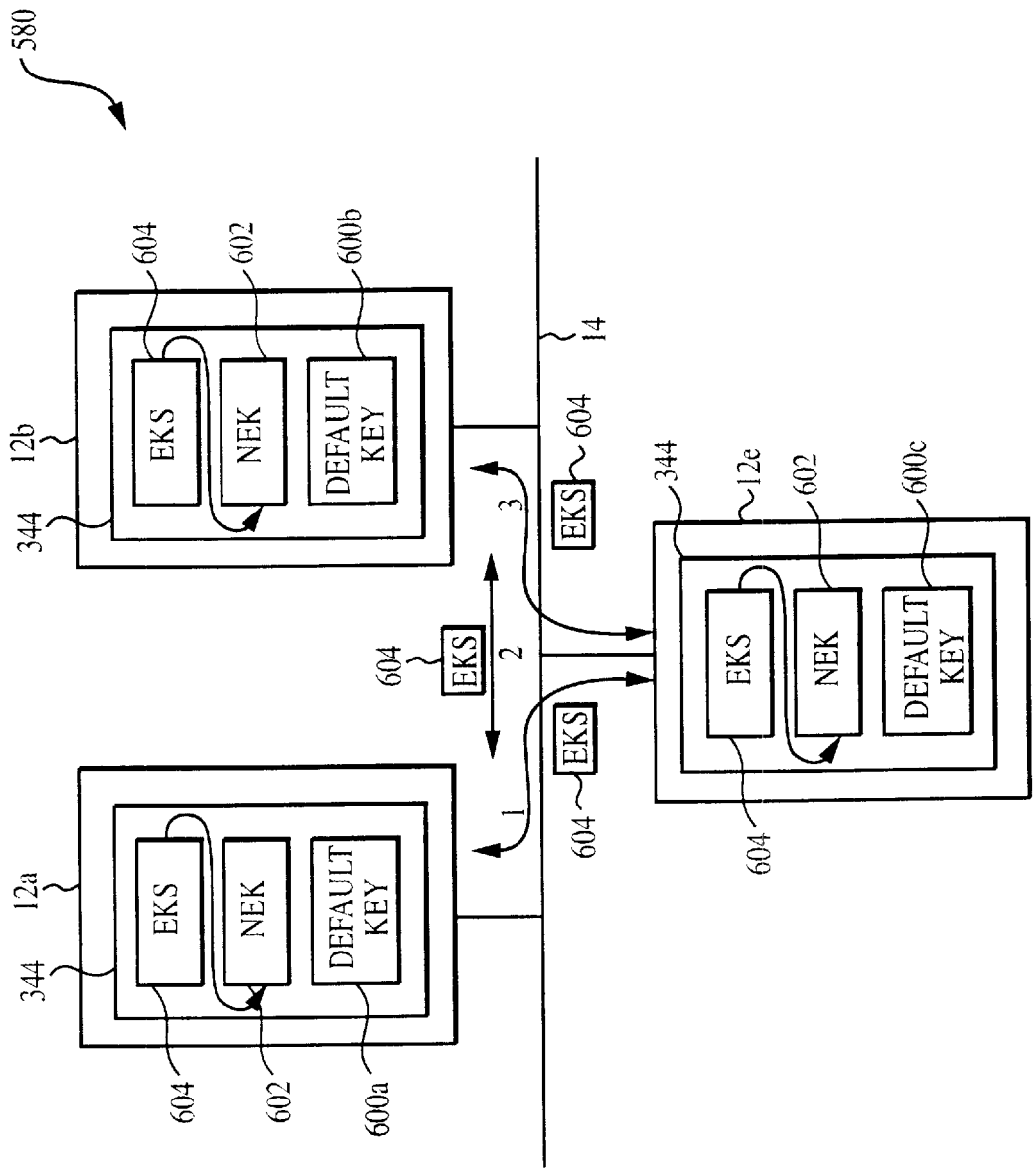
FIG. 31 is a more detailed depiction of the logical network member stations (of one of the logical networks shown in FIG. 29), each member station maintaining a network key and select pair for that logical network.

Referring to FIGS. 30 and 31, a process of adding a new station, e.g., the station 12e, to a logical network, e.g., first logical network 580, is as follows. A station that is already a member of the logical network, or "master" station (e.g., station 12b, in FIG. 29) receives the default key of the new station (step 590). Typically, the default key of the new station is manually entered into the master station. The master station builds a frame that includes a Set Network Encryption Key MAC Management entry (entry 210G from FIG. 16) (step 592), the entry identifying a 56-bit DES Network Encryption Key or NEK (in the NEK field 268) and an associated 8-bit Encryption Key Select (in the EKS field 266) for the logical network. The master station encrypts the frame using the received default key (step 594) and transmits the encrypted frame to the new station for decryption by the new station using the default key (step 596) and retrieval of the network key and associated select from the decrypted frame.

The master station may use the channel estimation function and channel estimation MAC management entries (FIGS. 12A and 12B) described earlier to make the passing of the network encryption key to the new station more secure. The master station can send to the new station a channel estimation request, causing the new station to perform a channel estimation process and return a channel estimation response with a new channel map resulting from the channel estimation process. Upon receipt of this response, the master station utilizes the channel map specified in the response to send the encrypted frame (containing the NEK) to the new station.

Referring to FIG. 31, the stations in the logical network 580, that is, stations 12a, 12b and 12e) each store in the respective encryption keys stores 344 a respective unique default key 600a, 600b, 600e (to be used for re-key operations only), as well as an identical network encryption key (NEK) 602 and an associated encryption key select (EKS) 604 to be used for all other transactions within the logical network 580).

The value of the Encryption Key Select 604 is placed in the EKS field 192 of the frames in all transmissions between members of the logical network for which the Network Encryption Key 602 is applicable (as indicated in the figure by the arrows 1, 2 and 3), and the Network Encryption Key 602 is used to encrypt/decrypt all frames for those members.

Thus, logical networking to ensure privacy is provided through encryption. Each logical network has its own default and network keys, providing separation of the information of one logical network from another. Because this mechanism uses the encryption capability incorporated in each station, every station has the ability to participate in any number of logical networks, limited only by the required storage of each logical network's default and network keys, and a mapping of the members of each logical network's set of member stations. For example, station 12a could also be a member station of the second logical network 582, or station 12d could be a member of a third logical network (not shown) as well as the second logical network 582. Consequently, a station may in fact store more than one Encryption Key Select and Network Encryption Key pair, that is, one for each logical network to which it belongs.

The partial ARQ scheme allows one member of a multicast group to acknowledge a transmission (directed to the multicast group) as a proxy for the rest of the group. Partial ARQ does not guarantee delivery to a multicast group, but does provide an indication that the message was received by at least one multicast group member. MAC-level acknowledgments occur immediately following the frame to which they are responding without relinquishing the channel to new transmissions.

One of the stations returning an updated channel map (in the Channel Estimation response during a Channel Estimation process) is selected to act as the multicast proxy. The selection may be random, but, preferably, it is based on channel map information (contained in the channel maps of the responses) that allows the transmitting station to identify the weakest path in the multicast transmission. By identifying a station that is the least likely to receive the transmission and selecting that station as the proxy, the partial ARQ mechanism is made all the more reliable. In one exemplary selection mechanism, the proxy may be selected by determining which responder station's channel map supports the lowest data rate, indicative of worst-case channel characteristics. Such selection can be made in various ways, for example, by comparing the actual data rates to determine the lowest data rate or, alternatively, by determining which channel map indicates the least number of bytes in a block (also indicative of the lowest date rate).

The transmitter prepares a multicast frame by setting the DA field to the selected proxy station's address. It stores a multicast address representing the group of multicast addresses intended to receive the multicast frame or, alternatively, the individual addresses in the multicast group in the Multicast With Response MAC Management Entry 210H, described above with reference to FIG. 17, and also sets the MCF 164 in the SC 106 (FIG. 7). The transmitter also sets the DT field in the frame's start and end delimiters with a value that indicates that a response is requested.

The proxy station specified by the DA field provides an appropriate response type on behalf of the multicast group whenever it receives a frame with a DT requiring a response. Transmission of the Response begins after an RIFS period regardless of the busy state of the medium, as discussed above.

Although the partial ARQ mechanism is described above as using an intended recipient of the multicast frame as the selected proxy, it need not be so limited. The proxy may be any device connected to the same medium as the intended recipients of the multicast frame, e.g., any station or a bridge connected to the medium.

As earlier mentioned, the MAC protocol supports a bridging mechanism for use by a subnetwork (such as the power line network 10, from FIG. 1) when the subnetwork needs to communicate with a station that is reached by a bridge. The bridging mechanism allows each bridge connected to the subnetwork to serve as a proxy for destination addresses that are accessed through the bridge.

Figure 32:
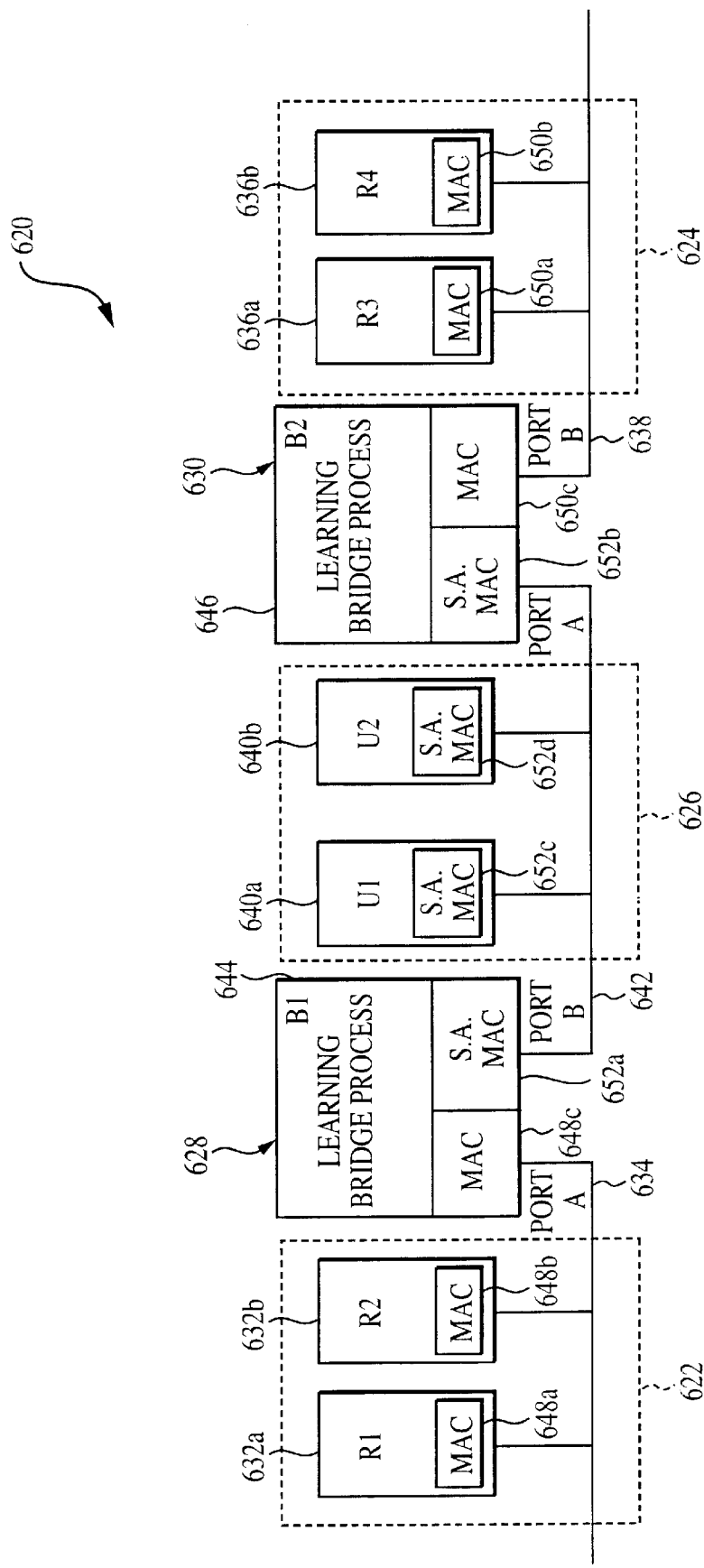
FIG. 32 is a block diagram of an extended network including two reliable subnetworks of stations connected to an unreliable subnetwork of stations by bridges, each of the stations in the unreliable subnetwork and the bridges capable of supporting a bridge proxy mechanism.

Referring to FIG. 32, a network 620 includes first and second subnetworks 622, 624, which are based on reliable media (those with very low bit error rates) and thus referred to as "reliable" subnetworks, and a third subnetwork 626, which is based on a noisy medium (one having a relatively high bit error rate), and referred to herein as an "unreliable" subnetwork. Examples of reliable media include conventional Ethernet and Fiber-Optic cabling technologies. Examples of noisy media include power lines and wireless media, such as RF. The network 620 further includes bridges 628 (B1) and 630 (B2) for connecting the subnetworks 622, 624 and 626. The first reliable subnetwork 622 includes stations 632a (R1) and 632b (R2), which are connected to a first reliable medium 634. The second reliable subnetwork 624 includes stations 636a (R3) and 636b (R4), which are connected to a second reliable medium 638, which may or may not be the same type of medium as medium 634. The unreliable subnetwork 626 includes stations 640a (U1) and 640b (U2), which are connected to a noisy or unreliable medium, such as a power line 642. The bridge 628 (B1) is connected to first reliable medium 634 (at port A) and the unreliable medium 642 (at port B). The bridge 630 (B2) is connected to the unreliable medium 642 (port A) and the second reliable medium 638 (port B). The bridges 628, 630 each support bridge functionality that includes, but is not limited to, a learning bridge unit shown as learning bridge processes 644 and 646, respectively. Each of the stations and bridges includes at least one MAC device. Stations 632a, 632b, bridge 628 and stations 636a, 636b, and bridge 630 include an appropriate type of conventional MAC device, MAC devices 648a, 648b, 648c, 650a, 650b and 650c, respectively, for supporting the reliable medium to which they are attached. For supporting operations on the unreliable medium, in particular, a source-aware bridging proxy function (as will be described), the bridges 628, 630 and the stations 640a, 640b include source-aware MAC devices 652a, 652b, 652c and 652d, respectively. The source-aware MACs 652, that is, those MACs that participate in source-aware bridging, are required to know that a particular destination address is reached through a bridge (in this case, one of the bridges 628 or 630).

Each such source-aware MAC has the capability to allow the bridge (or device acting as a bridge) to serve as a proxy for the destination. By acting as a proxy for a destination address, the bridge accepts responsibility for forwarding packets to that destination and participates in the ARQ scheme directly as an individual address (when necessary).

The stations U1, U2 (as well as bridges B1 and B2) are made aware of the need to use a bridge proxy through the same channel estimation process that is required for all stations to acquire Channel Map indexes. If the Channel Estimation Response MAC Management entry 210B (FIG. 12B) received from either of bridges 628, 630 has the Bridge Proxy bit 236 set, the receiving device understands that that bridge is enabled and forwarding to one or more addresses on another subnetwork. The receiving device associates that bridge's Source Address, which is identified in the SA field, with the CMI (along with the VT, RATE and MOD fields), as it would for any other station on the network. The receiver also associates this same information with each Bridged Destination Address (BDA) 246 in the Channel Estimation Response MAC Management entry 210B. The BP flag 236 indicates that the BDA 246 is accessed via the bridge's Source Address. In this manner, each station is able to construct a first data structure in the form of a first list, referred to herein as a BPDAlist, that maps each bridge's SA to one or more BDA. Each bridge constructs and maintains a second data structure or list that is its own list of each DA for which it serves as proxy ("I am Proxy" list, or, IAPlist).

Subsequent transmission through the bridge proxy to a DA in the BPDAlist, once established, is accomplished by sending a frame having MAC Management Information field entry of the Replace Bridge Address type. An MSDU addressed to a Destination Address for which a Bridge Proxy is active is transmitted with the Frame Header Destination Address 108 (FIG. 3) set to the bridge's address. The Frame Header Source Address 110 (FIG. 3) is the address of the transmitting station. The Replace Bridge Address MAC Management Information Entry includes the Original Destination Address (ODA) and Original Source Address (OSA), thus allowing the bridge to reconstruct the original MSDU for transmission.

Figure 33:
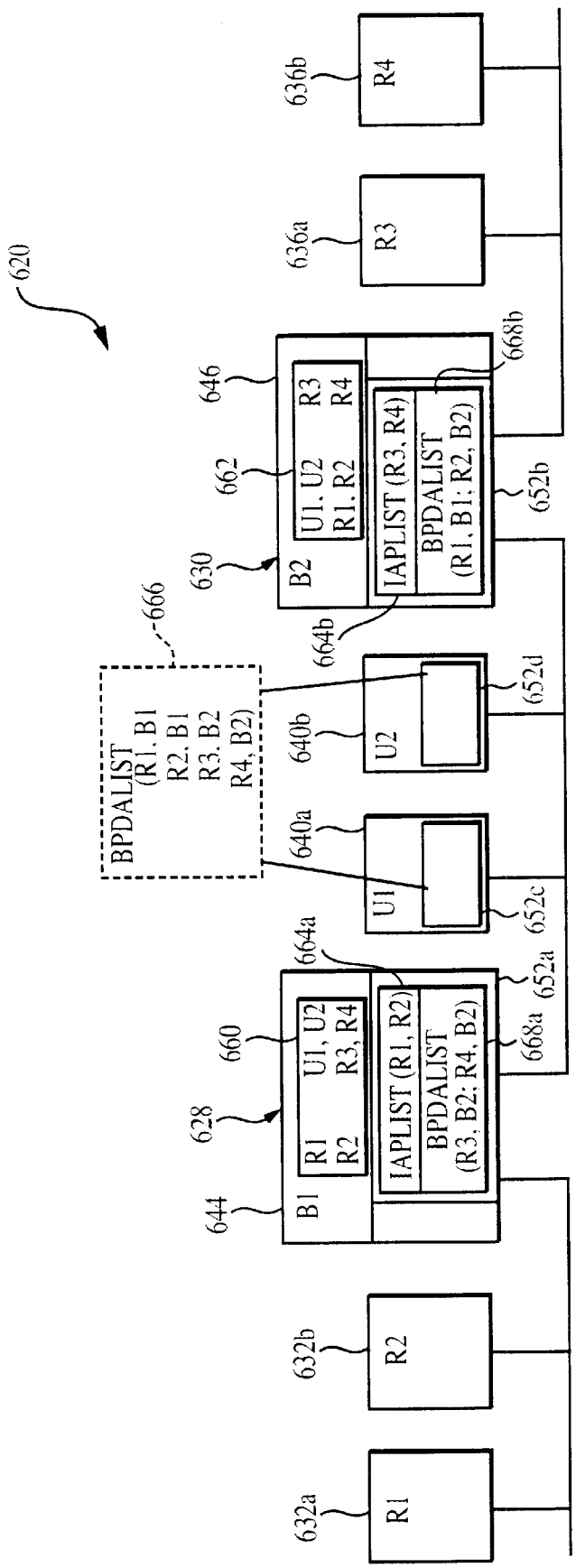
FIG. 33 is a block diagram of the extended network of FIG. 32 configured so that the bridges each serve as a bridge proxy for stations in the reliable subnetworks to which they are connected when those stations are accessed by the stations of the unreliable subnetwork.

The network 620 in a configured state is shown in FIG. 33 as configured network 620'. In the configured state, the learning bridge processes 644, 646 maintain per-port learned addresses lists 660, 662, respectively, for all of the stations. Thus, B1 maintains the station/port list 660 to include, for port A, the stations R1 and R2, and, for the port B, the stations U1, U2, R3 and R4. The bridge B2 maintains the station/port list 662 to include U1, U2, R1 and R2 for port A, and R3 and R4 for port B. The bridge source aware MACs 652a and 652b maintain IAPlists 664a and 664b, respectively, which include addresses for which those bridges serve as proxy. The IAPlist 664a includes addresses of R1 and R2 and the IAPlist 664b includes the addresses of R3 and R4. The IAPlist addresses are passed to the source aware MAC by the LLC (in a local management entry) or are learned (via the learning bridge process, which provides the addresses to the source-aware MAC, or when the MAC receives from the LLC a frame with a SA that is not its own). A source aware MAC function IAP(SA) adds these addresses to the IAPlist.

Additionally, the stations 640a and 640b each maintain learned or received BPDA information in a respective Bridge Proxy DA list (BPDAlist) 666. Since two bridges are connected to the subnetwork 626, each of those bridges (bridges 628 and 630) must also maintain a bridge proxy list for the destination addresses reached through the other bridge. Consequently, bridges 628 and 630 maintain BPDAlists 668a and 668b, respectively. They receive this list over the channel in a MAC management entry—i.e., a channel estimation response MAC management entry from a bridge—or from the host (local MAC management entry). The list can be a list of pairs of addresses including a destination address (DA) and the bridge proxy's DA (BPDA) associated with the DA, or, alternatively, a list of DA's associated with each BPDA. The BPDAlist can be learned when bridged frames are received from a particular SA where the SA and the OSA do not match. They are stored by a RecordBPDA(OSA,SA) function that stores the OSA, SA address pair in the BPDAlist as DA and BPDA, respectively. Local MAC management get/set primitives are used to support the LLC (and upper layers) in storing and providing the station with the BPDAlist.

Figure 34:
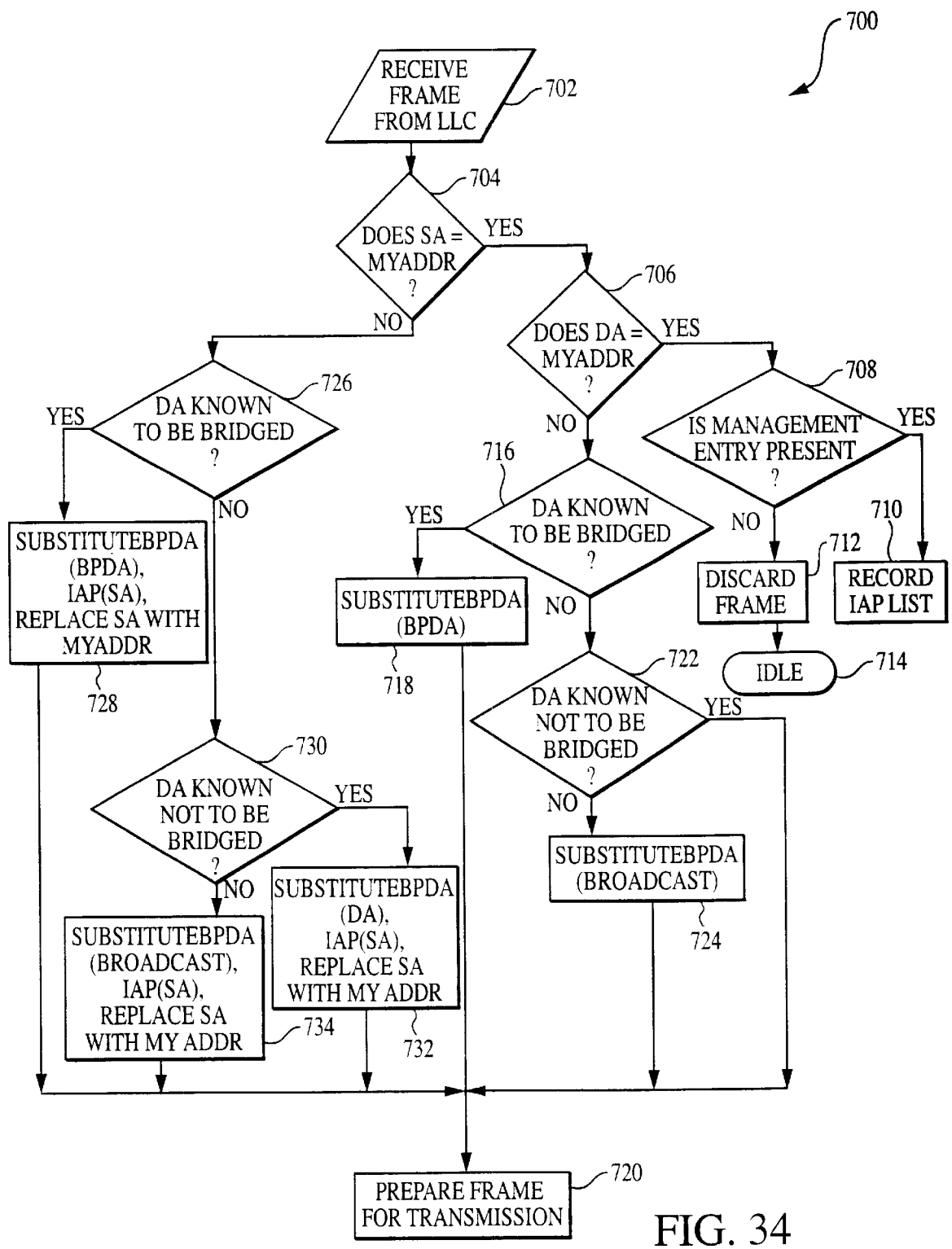
FIG. 34 is a flow diagram of a bridge proxy transmit process.

Referring to FIG. 34, a source-aware MAC TX process for self-configuring a device (such as U1, U2, B1 or B2) in a source-aware bridging network (network 620) 700 is shown. The process 700 starts with the receipt of a frame by the source aware MAC 652 in the device from the LLC (step 702). The frame may be intended for transmission to a destination device or as a management frame for the MAC itself The process determines if the SA identified by the frame matches the MAC's own SA (MyAddr) (step 704). If there is a SA match, the process determines whether the DA identified by the frame matches the MAC's own DA (MyAddr) (step 706). If there is a DA match as well, the frame is being passed to the MAC itself and is not intended for transmission on the medium. The process determines if a MAC management entry is present in the frame (step 708). If the frame includes a MAC management entry containing information intended for local use, the process invokes the RecordIAP to store an IAP list if such a list is present in the entry (step 708). If the frame does not include a MAC management entry (as determined at step 708), the process discards the frame (step 712) and returns to an idle state (step 714).

If, at step 706, it is determined that the DA in the frame is not equal to the MAC local address (as is normally the case for a frame that is to be transmitted), the process determines if the DA is known to be bridged (step 716), that is, associated with a bridge (through which it is accessed) in the station's BPDA list from a previous RecordBPDA function (as discussed above and described in greater detail with reference to FIG. 36). If the DA is known to be bridged, the process performs a SubstituteBPDA function (step 718) by replacing the frame's DA with the DA of the associated bridge in the frame's DA field, and placing the frame's original DA and SA in the ODA and OSA fields, respectively, in the Replace Bridge Address MAC Management Entry 210F (from FIG. 15). The process directs the frame to a process of preparing the frame for transmission (step 720).

If the DA is not known to be bridged at step 716, and in fact is known not to be bridged at step 722, the process directs the frame to transmission preparation (step 720) without the bridge address processing. If the DA is not known (at step 722), the SubstituteBPDA function is executed with the DA set to the broadcast address (step 724), and the process proceeds to step 720.

Referring back to step 704, if the frame's SA does not equal the station's address (MyAddr), the device performing the process is a bridge and the processing continues as follows. The process determines if the DA is known to be bridged (by a previous RecordBPDA function, channel map response, or local management 'set' primitive) (step 726). If the DA is known to be bridged, the process performs the SubstituteBPDA function, performs the IAP(SA) function (as earlier described), and replaces the SA with MyAddr (step 728) prior to preparing the frame for transmission at step 720. Otherwise, and if the DA is known not to be bridged (i.e., a channel map exists for the DA or other indication) (step 730), the process performs the SubstituteBPDA function without changing DA, performs the IAP(SA) function and replaces SA with MyAddr (step 732) before preparing the frame for transmission at step 720.

If the DA is not known (from the determination at step 730), the process performs the SubstituteBPDA function with DA set to the broadcast address and performs the IAP(SA) function, as well as replaces SA with MyAddr (step 734) before preparing the frame for transmission at step 720.

Figure 35:
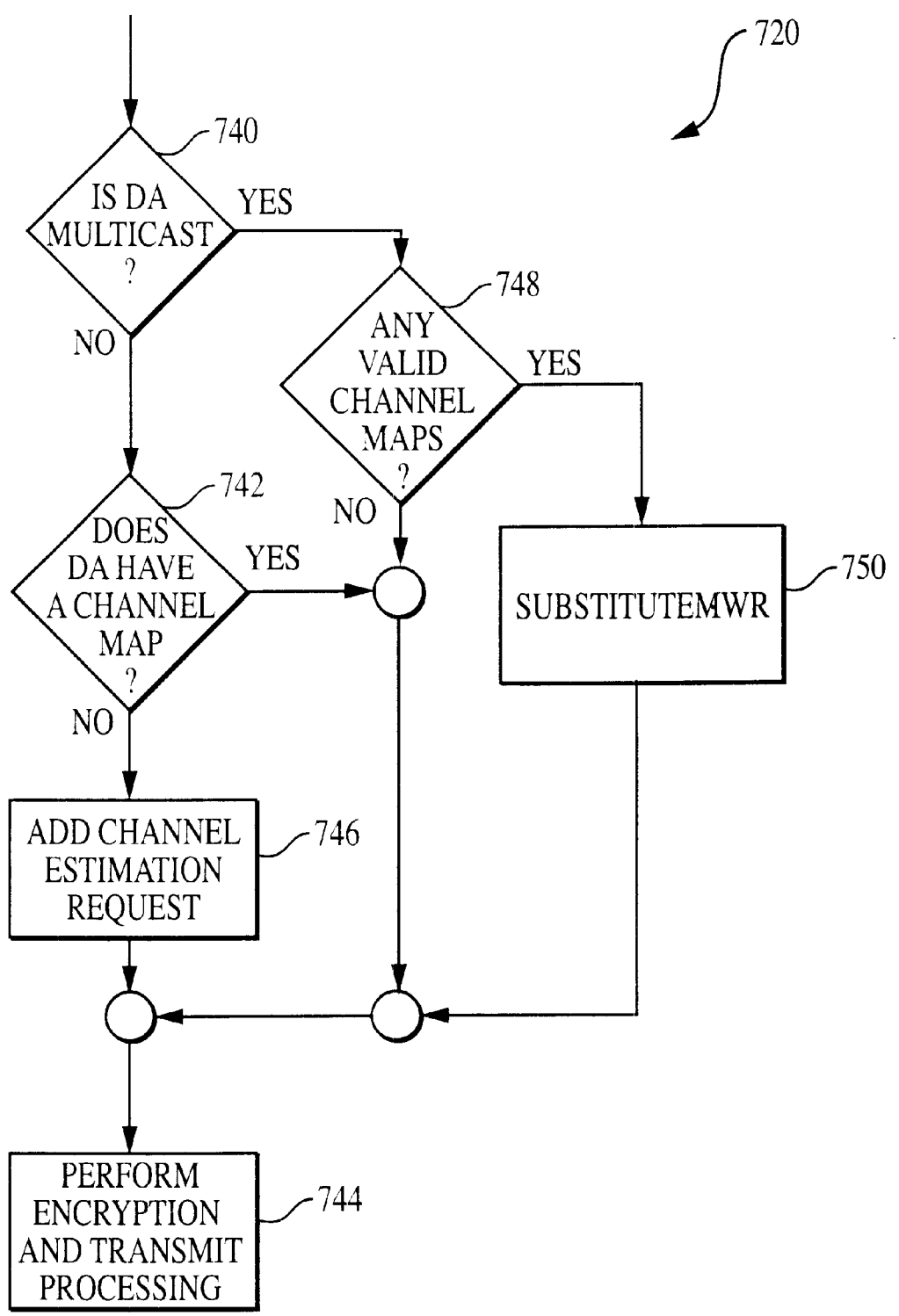
FIG. 35 is a flow diagram of a multicast processing portion of the bridge proxy transmit process.

Referring to FIG. 35, the transmission frame preparation process 720 is shown. Preferably, this process is executed after the auto-configuration for source-aware bridging of FIG. 34. By ordering the processing in this fashion, improved reliability for broadcast and multicast packets through the use of Partial ARQ is maintained. First, the process 720 determines whether the DA is a multicast address (step 740). If the DA is not a multicast address, the process determines if a channel map exists for the DA (step 742). If a channel map exists for the DA, the process directs the frame to be encrypted and transmitted according to the channel access procedure (step 744). If the process determines that a channel map does not exist for the DA at step 742, the process causes a Channel Estimation Request MAC Management Entry to be added to the frame (step 746) before encryption and transmission at step 744. If the DA is determined to be multicast at step 740, the process determines if any valid channel maps exist (step 748). If no valid channel maps exist, the Partial ARQ process cannot be executed, and the frame is simply encrypted and transmitted at step 744. If a valid channel map exists at step 748, the Partial ARQ process is executed by a SubstituteMWR function. The SubstituteMWR function copies the DA to the Multicast With Response Management Entry, replaces the DA with a DA for which a valid channel map exists, and sets the Multicast Flag (step 750).

Figure 36:
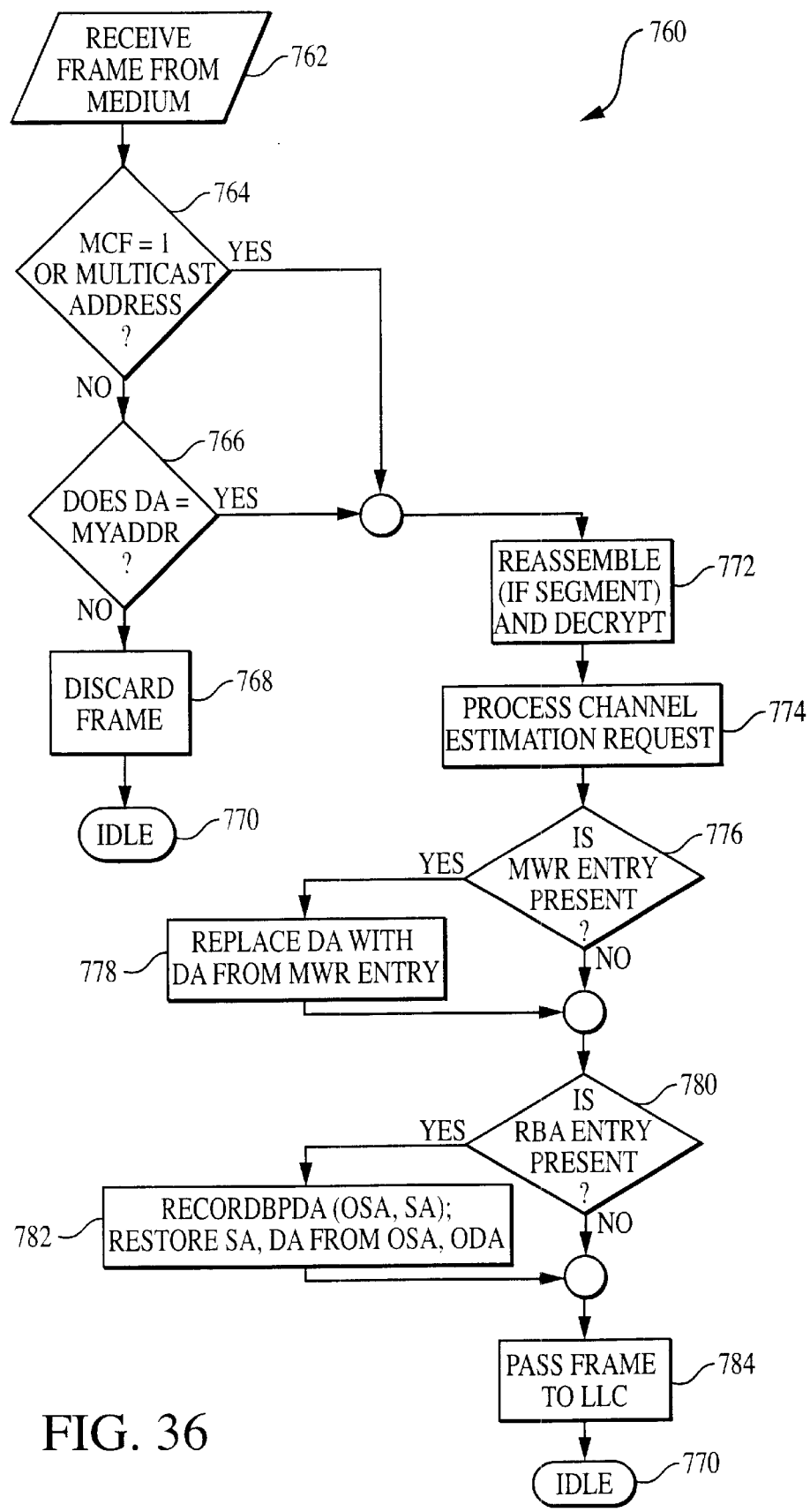
FIG. 36 is a flow diagram of a bridge proxy receive process.

Referring to FIG. 36, a source-aware MAC RX process for self-configuring, source-aware bridging on receive (that is, as frames are received by the MAC unit from the medium) 760 is shown. Processing occurs in the reverse order from the transmission processing described above with reference to FIGS. 34–35. That is, partial ARQ processing is followed by bridge proxy data processing. The process 760 receives a frame from the medium 762. The process determines if the Multicast Flag is set to one or the DA is a multicast address, i.e., address MSB=1 (step 764). If the process determines that neither the MCF is set nor the DA is multicast, the process determines if the DA is equal to MyAddr (step 766). If the DA is not equal to MyAddr at 766, the frame is discarded (step 768) and the process returns to an idle state (step 770). Otherwise, that is, if either the MCF is set or the address is a multicast address, or DA is equal to MyAddr, the process causes the frame to be reassembled (if appropriate) and decrypted to extract any MAC Management Entries that might be present (step 772). If a Channel Estimation Request MAC Management Entry is present in the frame, the process 760 processes the request by preparing a Channel Estimation Response that includes the BPDA list taken from the bridge's IAP list if such list exists (step 774). The process determines if a MWR Management Entry is present in the frame (step 776). If so, the DA is replaced with the DA contained in the entry and the management header is removed (step 778). If an MWR entry is not present, the process determines if a Replace Bridge Address entry is present in the frame (step 780). If the process determines the presence of the RBA entry in the frame, it performs a RecordBPDA(OSA, SA) function to add this pair of addresses to the station's BPDAlist (if OSA and SA are different), and the DA and SA are restored from the ODA and OSA (step 782). Once the process removes any management entries from the frame and passes the frame to the LLC for delivery to the host (step 784), it returns to the idle state (step 770).

As shown in FIG. 32, the bridges B1 and B2 include a learning bridge process coupled to a source aware MAC on the port connected to the unreliable network. The learning bridge process is "IAP aware" and is thus able to pass the list of forwarding addresses to the IAP function of the unreliable MAC for storing in the IAPlist.

Although the bridges B1, B2 use a learning bridge function with IAP awareness, other embodiments are contemplated. For example, the bridges B1, B2 may be implemented with a standard, commercially-available bridge chip (typically having built-in Ethernet MACs 648 for each port) and an external source-aware MAC 532 connected to at least one port so that the use of the source-aware bridging on that at least one port is hidden from the learning bridge process. In such an implementation, although the bridge is not IAP aware and is therefore unequipped to pass IAP list information to the source-aware MAC, the source-aware MAC supports other mechanisms that can be used to generate and maintain the IAPlist, e.g., MAC management entries or other source-aware MAC learning mechanisms, as discussed earlier.

Referring again to FIGS. 32–33, although the device 628 and 630 are shown and described as stand-alone bridges, they could be implemented as stations (with or connected to hosts). If implemented as a station, the bridge device 628 would be viewed as a station on both of the subnetworks 622 and 626. Likewise, if the bridge device 630 were to be implemented as a station, it would be considered a station on both of the subnetworks 626 and 624. The control structures and operations related to the bridging mechanism would be modified as appropriate. For example, the station/port list 660 would be expanded to include, for port B, the device 630 (B2), and, the station/port list 662 would be similarly adapted to include, for port A, the device 628 (B1).

Figure 37:
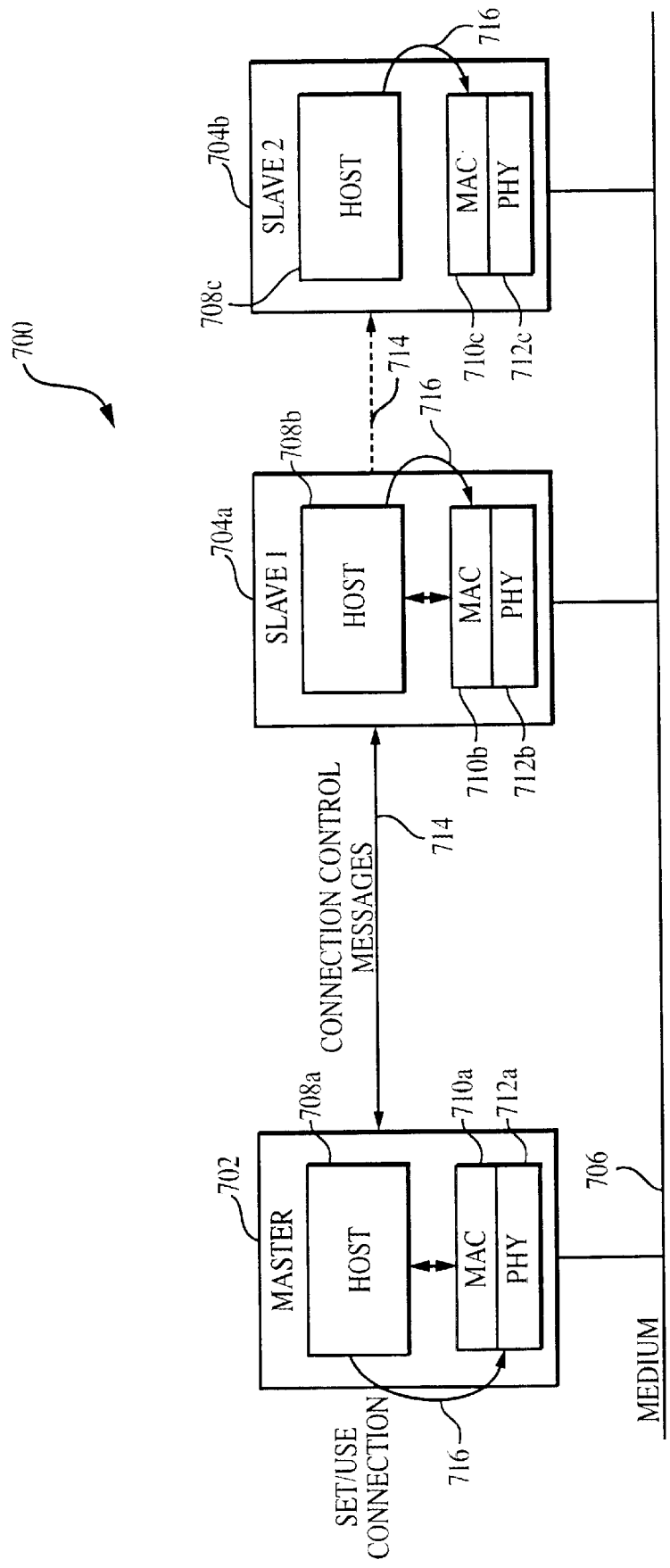
FIG. 37 is a network of stations having one of the stations serving as a master and the other stations serving as slaves to support sessions of contention-free intervals.

As indicated earlier, the use of the contention-free access mechanism enables a single station to control access to the medium. Additionally, the contention-free access mechanism allows a station to act as a network controller. Referring to FIG. 37, a multi-node network 700 capable of supporting periodic contention-free intervals (sessions) for guaranteed quality traffic as well as contention-oriented access is shown. The network 700 includes a station designated as a master 702 and stations 704a, 704b (shown as first and second slaves, respectively) connected to a shared physical medium 706. Typically, the selection of the master 702 is made by a network administrator (not shown), or is device or product specific. The stations 702, 704a and 704b include hosts 708a, 708b, 708c, respectively, MAC layers 710a, 710b, 710c, respectively, and PHY layers 712a, 712b, 712c, respectively. Each host 708 is coupled to the MAC layer 710, which is also coupled to the PHY layer 712. Preferably, the MAC layer 710 operates in the same manner and thus includes the functionality of the MAC unit 18 (FIG. 1). Likewise, the PHY layer 712 preferably includes at least the functionality of the PHY unit 22 (also from FIG. 1) and the medium 706 is a power line. However, other types of media could be used. The host 708 is intended to represent at least one or more networking software components operating above the MAC sublayer 710.

A connection between the master 702 and any one or more of slaves 704a, 704b that wish to participate in a session of contention-free intervals is established and maintained through an exchange of Connection Control messages 714 between master and slave hosts (that is, host 708a and host 708b, and 708a and 708c, if both slaves are to be members of the session) using normal contention-based access prior to the contention-free session. Stations are added to and removed from the session using the same mechanism, that is, using the Connection Control messages 714, which are delivered outside of the contention-free intervals during the session for these purposes. The host 708 communicates the details of the connection (once established or as subsequently modified) by sending Set Connection and Use Connection messages 716 to that station's MAC 710.

The Connection Control messages 14 involving master/slave communications include the following primitives: MASTER_SLAVE_CONNECTION.Request (Req)/Confirm (Conf); SLAVE_MASTER_CONNECTION.Req/Conf; MASTER_SLAVE_RECONFIGURE.Req/Conf; and SLAVE_MASTER_RECONFIGURE.Req/Conf. Each of these primitives includes the following parameters: Period; Frame Length; Minimum Frame Time; Maximum Frame Time; Start Time; Connection Duration; Connection Number; and Last Contention-Free Frame (CFF). The Period defines the time from the start of one contention interval to the start of the next contention-free interval. The Frame Length defines (in number of bytes) the average frame length to be transmitted during each interval. The Minimum Frame Time and the Maximum Frame Time define the minimum and maximum durations of a frame (plus associated response), respectively. The Start Time specifies the approximate first time participation in (or start of) the contention-free interval. The Connection Duration specifies the duration of the connection (in seconds). A value of 0 indicates that the connection is cancelled, while a MaxValue indicates that the connection is good until canceled). The Connection Number is the connection number assigned to a particular station-to-station (that is, master-to-slave) connection. The Last CFF indicates that the slave station (receiving this parameter) is to transmit the last frame in the next contention-free interval and should set the CC field in that frame to a zero value (and thus signal the end of that particular contention-free interval to all stations in the network). The master controls the setting of the Connection Control message parameters, so a slave making a request (.req message) sends requested values to the master. The confirm response from the slave simply confirms the values returned by the master if those values are acceptable.

An exemplary connection control message exchange between a master and slave is as follows. A handset station (slave) initiating a telephone call sends a message to a base station (master) requesting a call setup (Connection Request). The master responds with a message that indicates timing and other information required for the connection to be established and maintained.

In addition to the connection control message parameters discussed, any requests or responses concerning channel maps for a new connection are delivered prior to the start of the first contention-free interval (in which the connection is to participate) using contention-based access. All other messages pertaining to the maintenance of or changes to the connection are also exchanged outside of the contention-free intervals.

Still referring to FIG. 37, the master 700 can pass master control to another station (the "new" master), for example, a station that has been acting as a slave (like one of stations 704) or a station that has not been acting as a slave (not shown). It will be appreciated that the network 700 may be partitioned into logical networks with each logical network having a designated master, for example, the master 700 being designated a first master in one logical network (and acting as master) and the station 704b being designated a second master in another logical network, and for master/session control to be passed from the master 700 to the other (new) master 704b. To that end, the connection control messages 714 also include messages for passing master and session control information from the master to a new master. These messages are in the form of MASTER_MASTER_CONTROL_TRANSFER.Request and MASTER_MASTER_CONTROL_TRANSFER.Confirm messages for conveying the following parameters: Period, Frame Length, Min Frame Time, Max Frame Time, Start Time, Session Duration, Connection Number and Requested Interval Length. The Period defines the time from the start of one contention-free interval to the next contention-free interval. The Session Duration defines the length of the session (for the master that is taking session control) in seconds. The Requested Interval Length specifies the total length (in milliseconds) of the requested contention-free interval. The Connection Number is the unique number assigned to the master-to-new_master connection. The logical networks' respective designated masters 702, 704b are thus able to pass control back and forth between them for a smooth transition between sessions of the logical networks.

Figure 38:
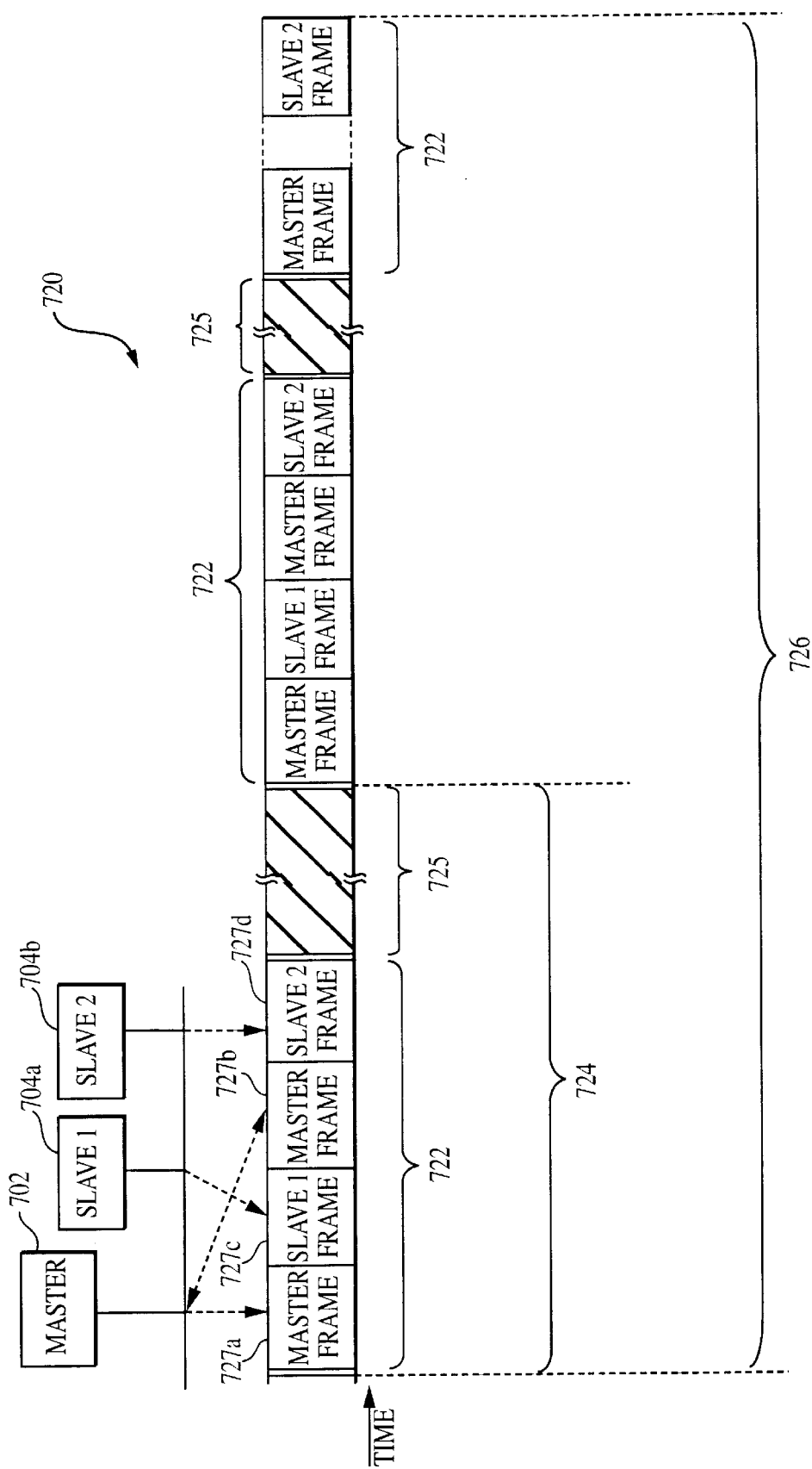
FIG. 38 is a diagram of time slices during a contention-free intervals session.

Referring to FIG. 38, an exemplary contention-free session 720 of contention-free intervals 722 is shown. The contention-free intervals 722 occur periodically on a fixed time interval 724 (specified as the Period in the Connection Control Messages 714). Preferably, the contention-free interval is restricted to some portion of the overall Period or cycle, such as 50%, so that other stations have an opportunity to contend for the medium during normal contention-oriented intervals 725 (shown as shaded in the figure, as the intervals 725 are not part of the session 720). A session interval 726 is the duration of the session 720. It may be of a fixed duration (as shown) or last for as long as the session is needed. Typically, the session is established by the master at the time that the master becomes aware of the need for a session (for example, when a first connection request is received). Other connections may be added to an already established session or connections participating in the session may be removed from the session (at such time as those connections are terminated). In the example shown in FIG. 38, it is assumed that the host became aware of requests from both slaves stations 704a, 704b at approximately the same time and, therefore, the session 720 was established at the time those connections were established.

Still referring to FIG. 38, each contention-free interval 722 is divided into frame time slots 727, and each frame time slot 727 is either allocated to downstream traffic (from the master), that is, slots 727a, 727b, or upstream traffic (from a slave), slots 727c, 727d. In the configuration shown, the master sends one of its own frames in a downstream traffic slot (for example, sends a frame in slot 727a, which is immediately followed by the upstream traffic slot allocated to a slave participating in the contention-free interval 722 (again, using the illustrated example, slot 727c, used by slave 1. To initiate contention-free access for each of the member slave stations 1 and 2, the contention-free interval begins with the master queuing a frame for immediate delivery and transmitting to the slave station 704a a first downstream frame 727a having the CAP=3 and the CC=1. Once the downstream frame 727a has been received by the slave 704a and the slave 704a determines that the transmission of downstream traffic has completed, the slave 704a transmits an upstream frame 727c (which was already queued by that slave's host). The slave station 704a determines that it should transmit a queued frame when a last (or only) segment is received and meets certain conditions, that is, has a SA matching that of the master, CAP=3, CC=1 and a CN that matches the assigned connection number.

Still referring to FIG. 38, the master continues transmitting additional contention-free frames (if there are other slaves participating in the session) after receipt of the expected frame from the slave 1, or after a predetermined transmit time if no frame is received (i.e., either the downstream or upstream frame failed due to poor channel conditions). In the example shown, the master transmits downstream traffic in a second downstream traffic slot 727b, thus causing the slave station 704b to transmit upstream traffic during the fourth slot, or second upstream traffic slot 727d (when the SA, CAP, CC and CN field settings in the downstream frame so indicate). In this manner, therefore, the downstream traffic of the master is able to effect a polling mechanism.

The contention free interval 722 is terminated by setting CC=0 in the last frame. A station has knowledge that a particular frame is the last from the Last CFF field in the Connection Control information exchanged (between hosts) during setup and maintenance of the connection.

Thus, it can be seen from FIG. 38 that a contention-free intervals session 726 can be employed by a CSMA network (such as network 10 in FIG. 1) to alternate between distributed media access control (such as CSMA) achieved during the contention-oriented intervals 725 and centralized media access control (like TDMA) of the contention-free intervals 722 for different levels of QoS.

Figure 39A:
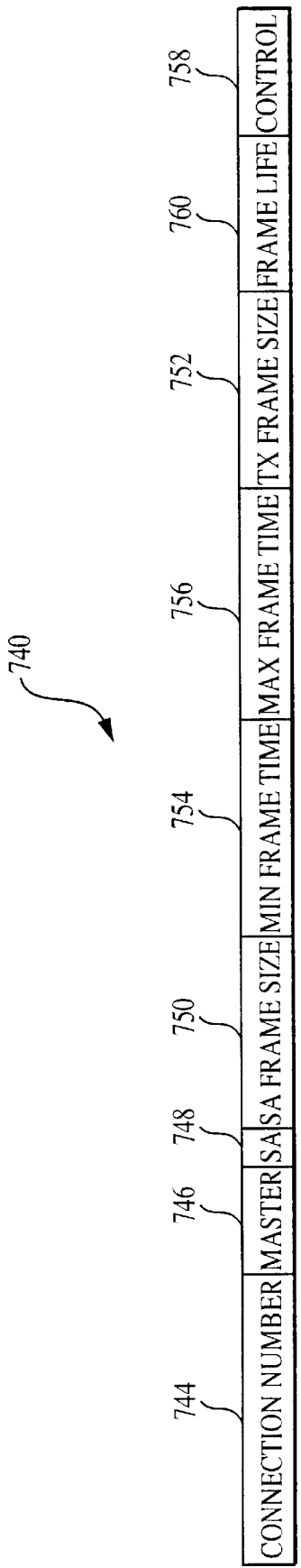
FIG. 39A is a format of a Set Connection MAC management data entry.
Figure 39B:
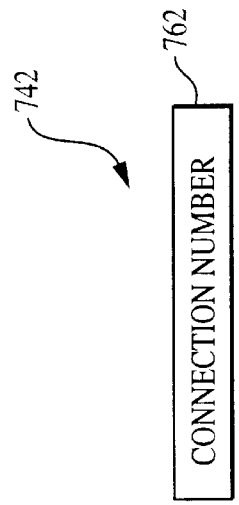
FIG. 39B is a format of a Use Connection MAC management data entry.

Each station's MAC layer is set up to transmit frames at the appropriate time by the Connection Control messages 714 exchanged by hosts and the Set Connection MAC management messages 716 (FIG. 37) provided by the host to the MAC layer. The Set and Use Connection messages 716 are delivered to the MAC in MAC management information entries. Referring to FIGS. 39A and FIG. 39B, a Set Connection MAC management data entry 740 and a Use Connection MAC management data entry 742, respectively, are shown. Referring to FIG. 39A, the Set Connection data entry 740 includes a Connection Number field 744 for identifying the connection number assigned to a particular connection and a Master field 746 for indicating if a station is acting as Master or Slave for the connection identified by the Connection Number field 744. If set, the Master field 746 indicates that the station is acting as Master. The entry 740 further includes an SA field 748 and an SA Frame Size field 750. The SA field 748 provides the address of the station that will cause transmission of a frame (of length specified by the SA Frame Size field 750) queued for the identified connection. When a queued frame is the first frame to be transmitted during a given contention-free interval, the SA Frame Size field 750 is set to zero and the SA field 748 is ignored. If the Master field 746 is set and a queued frame is not the first frame to be transmitted during a given contention-free interval, the master uses the length given by the SA Frame Size field 750 (in conjunction with the channel map for the identified SA) to set a Transmit Timer for measuring the time interval between the end of the previous transmission and the beginning of the transmission of the queued frame. When the Transmit Timer expires, a queued frame is transmitted as soon as the medium becomes idle. The Transmit Timer value is used to continue the contention free interval when an upstream frame fails (e.g., is corrupted or not transmitted).

Preferably, the Transmit Timer value is approximately equal to the duration of the expected upstream frame so that additional jitter is not introduced for the following traffic in the contention free interval, and can be estimated from the latest channel map from the slave with knowledge of the average frame length. It should be noted that the EIFS must be defined to be longer than the longest gap that could occur when an upstream frame is missed so that these potential gaps do not cause other stations to disrupt the contention free interval, particularly when stations hear traffic using CAP=3 and CC=1. It may be desirable to use two different values of EIFS, a longer EIFS (as earlier defined) when delimiters with CAP=3 and CC=1 are detected, and, otherwise, a shorter EIFS that is optimized for contention-based traffic.

Still referring to FIG. 39A, the entry 740 also includes a TX Frame Size field 752, a Minimum Frame Time 754 and a Maximum Frame Time 756. The TX Frame Size field 752 specifies an average expected frame size (in bytes) and is used to create dummy frames of appropriate length as needed. Typically, a dummy frame is used to replace an actual frame to be delivered when that frame does not arrive at the MAC in time for transmission (either because of a delay in frame arrival or as a result of network jitter causing the transmission time to occur before a timely frame arrival). A dummy frame is approximately the same length as the normally transmitted frame and includes an indication (e.g., in a MAC management entry) that it is a dummy frame. The Minimum Frame Time 754 specifies a minimum duration of a frame (and any associated response, if expected). If the size of a frame based on the current channel map does not meet this minimum requirement, the frame is padded with an appropriate number of bits to meet this minimum value. The Maximum Frame Time 756 specifies a maximum duration of a frame. When the size of a frame based on the current channel map causes the frame to exceed this maximum requirement, the frame is truncated prior to transmission (or a dummy frame of appropriate length is sent) and a fail is indicated to the host). The purpose of the Minimum/Maximum Frame Time is to control jitter. Channel maps can be computed or optimized with the knowledge of these timing requirements and the average frame size.

Also included in the Set Connection MAC management entry 740 are a Control field 758 and a FrameLife field 760. The Control field 758 indicates to the station the passing of Master Control to another station (if the station is Master) or from another station (if the station is a Slave) for the connection identified by the connection number. The FrameLife field 760 specifies the frame timer value (FrmTimer, described earlier). When this timer value expires, a queued frame awaiting transmission is discarded.

Referring to FIG. 39B, the Use Connection entry 742 includes a Connection Number field 762, which specifies the same connection number as the like-named field in the Set Connection entry for the same connection. It is delivered to the MAC by the host with any data frame to be transmitted on the medium using that connection. The connection number is placed in the Connection Number field 162 of the Segment Control field 106 (of FIG. 7) when the data frame is prepared for transmission.

Although not shown in FIG. 38, the master can use the contention-free interval (e.g., the contention-free interval 722) to send multiple frames back-to-back during the contention free interval 722. To use an upstream traffic slot for downstream traffic (in order to achieve back-to-back downstream traffic transmissions), the master would set the Connection Number field 162 in the Segment Control field 106 (shown in FIG. 7) in a downstream frame to some connection number other than that which is assigned to the master-to-slave connection between the master and the slave that would normally transit during the following slot. In other words, the master uses the CN field 162 to control whether or not the downstream traffic serves to poll a slave (and thus trigger an upstream frame in the next slot). Additionally, the master can send a dummy frame to the slave to initiate one-way, upstream traffic only, if desired. The master can pass master control to another station in a contention-free interval downstream slot (when the two stations have agreed upon the control passing in an exchange of Connection Control messages prior to the beginning of that contention-free interval, as described earlier) using the same mechanism, that is, setting SA to the master's SA, CAP=3, CC=1 and setting CN to the appropriate connection number. The station to whom master control is passed accepts the role as master upon correctly receiving this frame where SA matches the master SA, CAP=3, CC=1 and CN matches the assigned connection number. Control passing can occur dynamically between the contention-free intervals as well.

If stations have different Network Encryption Keys, set-up and control-passing communications between hosts occurs with encryption disabled for the set-up and control messages (frames). No other information is included in these frames as encryption is disabled.

Although the Connection Control messages have been described as including a Start Time, it will be appreciated that the Start Time could be eliminated as a Connection Control message parameter. The start time could be implied based on the assumption that the master and slave stations begin the first contention-free interval immediately upon agreement of connection parameters (via the exchange of Connection Control messages for connection set-up) and the use of the Transmit Timer and FrmTimer would allow the two stations to become fully synchronized thereafter.

Although the Connection Control messages are exchanged between contention-free intervals (with CC=0), it is desirable to send the messages at the highest priority (CAP=3) so that they do no compete with the data traffic of other stations.

Frame forwarding (or relaying) can increase overall network coverage, reliability and throughput for a noisy (wireless or wired) network. Thus, the MAC protocol of MAC unit 18 (FIG. 1) supports an efficient mechanism for forwarding frames through an intermediate station. The frame forwarding involves three of the stations 12. Within the context of an exemplary frame forwarding activity, a first one of the stations (e.g., 12a) is a source station "A", a second one of the stations (e.g., station 12k) is a destination station "B", and a selected, third station (e.g., station 12b) is an intermediate (or forwarding) station "I". In one frame-forwarding scenario, station A and station B cannot communicate with each other due to channel conditions (i.e., high attenuation and/or noise level), but station A can communicate with station I and station I can communicate with station B. In an alternative, rate-adaptive frame-forwarding scenario, station A can communicate with station B only at a relatively low data rate (e.g., using ROBO Mode), and throughput could be increased significantly by communicating with B through an intermediate station.

Prior to communication with station B, station A learns how best to communicate with station B. This task is accomplished through a learning process whereby station A transmits to each station in the network a frame that includes the Connection Information Request MAC management entry 210C (from FIG. 13A). This request solicits information from each of the stations 12 about that station's ability to communicate with station B. The request may be sent in a unicast frame transmission to each known station, or in a broadcast frame transmission to all stations that can hear station A. Each station that is aware that it can communicate with B responds by returning a frame that includes the Connection Information Response MAC management entry 210D (from FIG. 13B). The Bytes field 249 in the entry 210D includes the number of bytes per 40 symbol block to station B (based on the stored or recently requested and returned channel map to station B). (Alternatively, a responder station could return the capacity (in bytes) of a maximum length frame to station B.) Thus, the Bytes field 249 indicates the data rate for the connection of the responder station to station B. The response could include other pertinent information about that connection (e.g., a measure of connection quality or reliability, and/or an updated TX channel map for the station A if the frame that included the Connection Information Request also contained the Channel Estimation Request entry 210A, (FIG. 12A)). After receiving the responses, the responder station that provided the highest capacity or throughput that meets connection quality or reliability requirements (based on the combination of both connections station A to the responder station and the responder station to station B) is selected as the intermediate station I.

Because these channel information requests and responses do not contain sensitive information (that is, information that cannot be overheard by the other stations), they may be transmitted in cleartext to eliminate the need to exhange network encryption keys (if the keys are not already available) or reduce processing time. Preferably, the station A receives updates of the channel information for the I-to-B connection whenever the station B sends to the station I a new channel map that changes the Bytes value (i.e., bytes per 40 symbol block). The station A can manage the receipt of such updates or, as an option, the station I may be given the responsibility of updating the station A with new Connection Information Response. Station I is capable of handling this task if it made aware that it is forwarding traffic from the station A to the station B based on observation of the frame-forwarding traffic.

Figure 40:
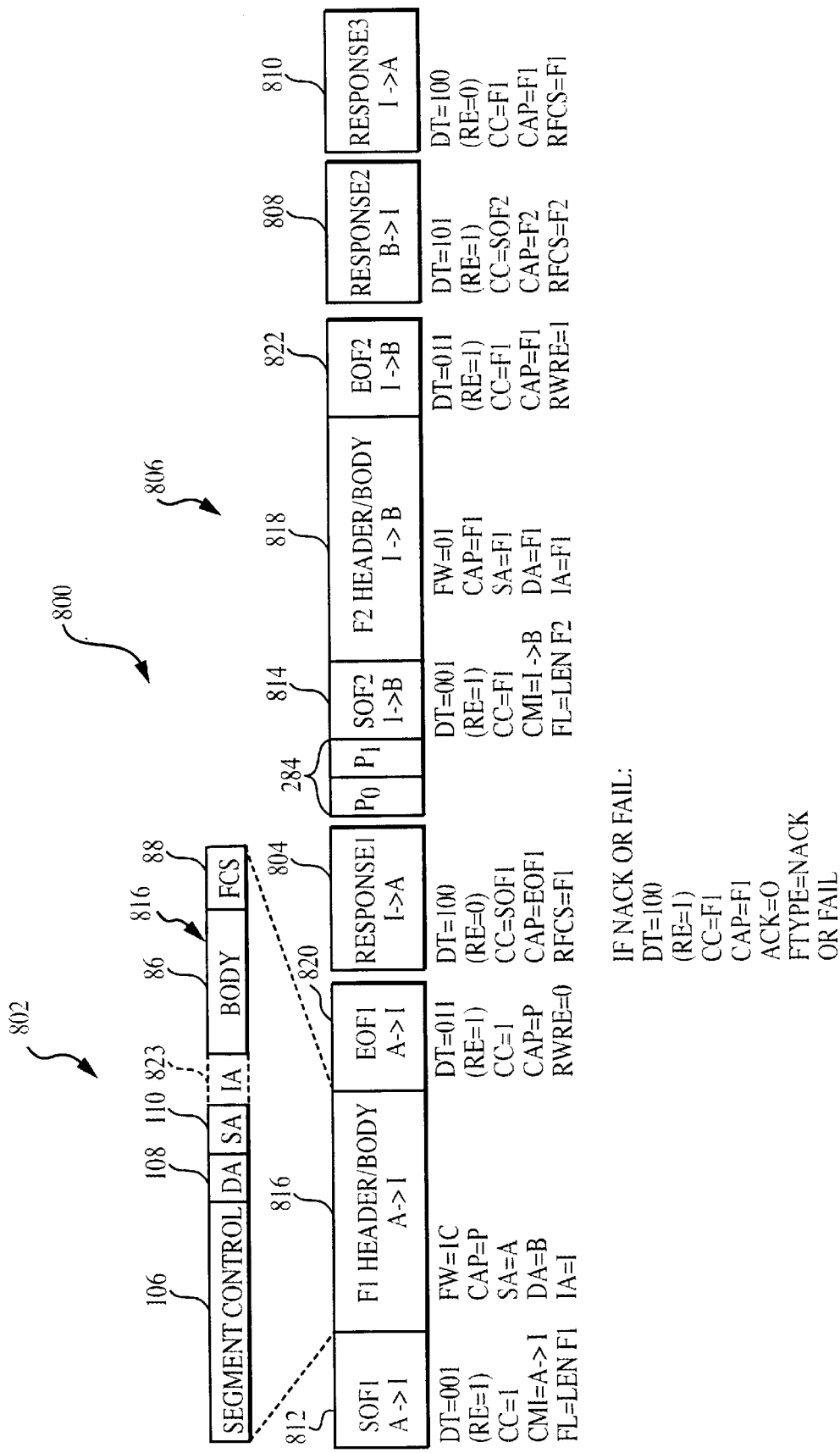
FIG. 40 is a depiction of a forwarding frame structure for frame forwarding with responses.

Referring to FIG. 40, the station A delivers frames using acknowledged service to station B through station I according to the forwarding frame structure for frame forwarding with a response expected after both frames 800. The forwarding frame structure 800 includes a first frame 802, a first response (RESPONSE1) 804, a second frame 806, a second response (RESPONSE2) 808 and a third response (RESPONSE3) 810. Each of the first frame 802 and second frame 806 includes an SOF delimiter, a first SOF delimiter (SOF1) 812 and a second SOF delimiter (SOF2) 814, respectively. The frames 802, 806 also include a frame payload (F1, F2) 816, 818, respectively. The frames 802, 806 each further include an EOF delimiter, a first EOF delimiter (EOF1) 820 and a second EOF delimiter (EOF2) 822, respectively. It will be understood that the SOF delimiters, EOF delimiters, payloads and response have the same structure defined for the SOF delimiter 92 (FIGS. 3 and 5A), the EOF delimiter 94 (FIGS. 3 and 5B), and the response 120 (FIGS. 4 and 6). With respect to the first frame 802, the station A selects a maximum segment size based on the smaller of the maximum frame capacity based on the channel map to the station I and the byte capacity indicated in the response from the station I to assure the frame fits in a single segment for both frames (frame 802 and frame 806) of the frame relay. In the frame header/body 816, the SA is set to the address of station A, the DA is set to the address of station B, the FW 161 in the Segment Control field 106 is set to 0b10 or 0b11 (indicating the presence of an intermediate station address field IA 823, that the frame is being sent to an intermediate station and the LSB of FW indicating the intended/original value of CC when the MSB of FW is 1) and the address field IA 823 is set to the address of station I. The DT in the SOFI delimiter 812 and the EOFI delimiter 820 is set to a value that indicates that a response expected and CC is set to indicate contention-free status. The value of CAP in the EOF1 delimiter 820 is set to the channel access priority that is assigned to the frame (or, priority "P"). The RWRE field 145 in the EOFI delimiter is set to 0. When station I receives the frame 802, it detects the FW field set to either 0b10 or 0b11 (indicating that the station I should check IA instead of DA for the destination address) and matches IA to its own address. If the SOF1 indicates a response is expected (as it does in this example), the station I returns the response 804 using the value of CC and CAP contained in EOF1 if returning an ACK. If the station I returns a NACK or FAIL, it uses the value of CC and CAP contained in Segment Control to indicate a failed forwarding attempt. If an ACK is to be returned, the station I sets FW to 0b01 (indicating the presence of address field IA and that the frame is being sent to a final station), re-computes the value of FCS, indicates if a response is expected in the SOF2 814 and EOF2 822 and sets the RWRE bit 145 in the EOF2 822 to indicate (for the benefit of the VCS of other stations) that a double response is expected. The CC fields in SOF2 814 and EOF2 822 are set to the value of CC received in FW (CC=LSB of FW) rather than the value received in the EOF1 820. The CAP field 144 in the EOF2 822 is set to the value received in the Segment Control field 106. The CMI field 142 and the FL field 140 in the SOF2 814 are set according to TX channel map for DA (station B) and the frame is transmitted using the TX channel map indicated in the CMI field 142.

The station B receives the second frame 806 from the station I and recognizes from the value of FW (FW=0b01) that the frame 806 has been forwarded. Since SOF2 814 indicates that a response is expected, the station B returns a response 808 indicating that another response is expected to follow (RWR type, DT=101). The response 808 includes the value of CC received in the SOF2 814 and the value of CAP 144, along with the RFCS 148 based on the FCS received in the frame 806. The station I processes the response 808 and generates the third response 810 to the station A. The response 810 is of the same type (ACK, NACK or FAIL, except DT=0b100 instead of 0b101) and uses the values of CC, CAP and FCS (if the response is an ACK) received in frame from station A.

The frame payload in each transmission is identical except for the FW field in Segment Control and the FCS. This minimizes the processing required by the MAC to prepare the frame for retransmission.

With respect to FIG. 40, as well as FIGS. 41 and 43–45 to follow, the symbol "=" followed by "SOF1", "SOF2", "EOF1", "EOF2", "F1" or "F2" is used as a short-hand notation for "is assigned the value received in". Additional short-hand notations and abbreviations not already mentioned above include: "LEN" for "length, "P" for original/intended channel access priority value associated with a frame and "C" for original/intended CC value associated with a frame. Thus, for example, "FL=Len F1" indicates that the field FL is equal to the length of frame F1, and "CAP=EOF1" indicates that CAP is assigned the value received in EOF1.

Figure 41:
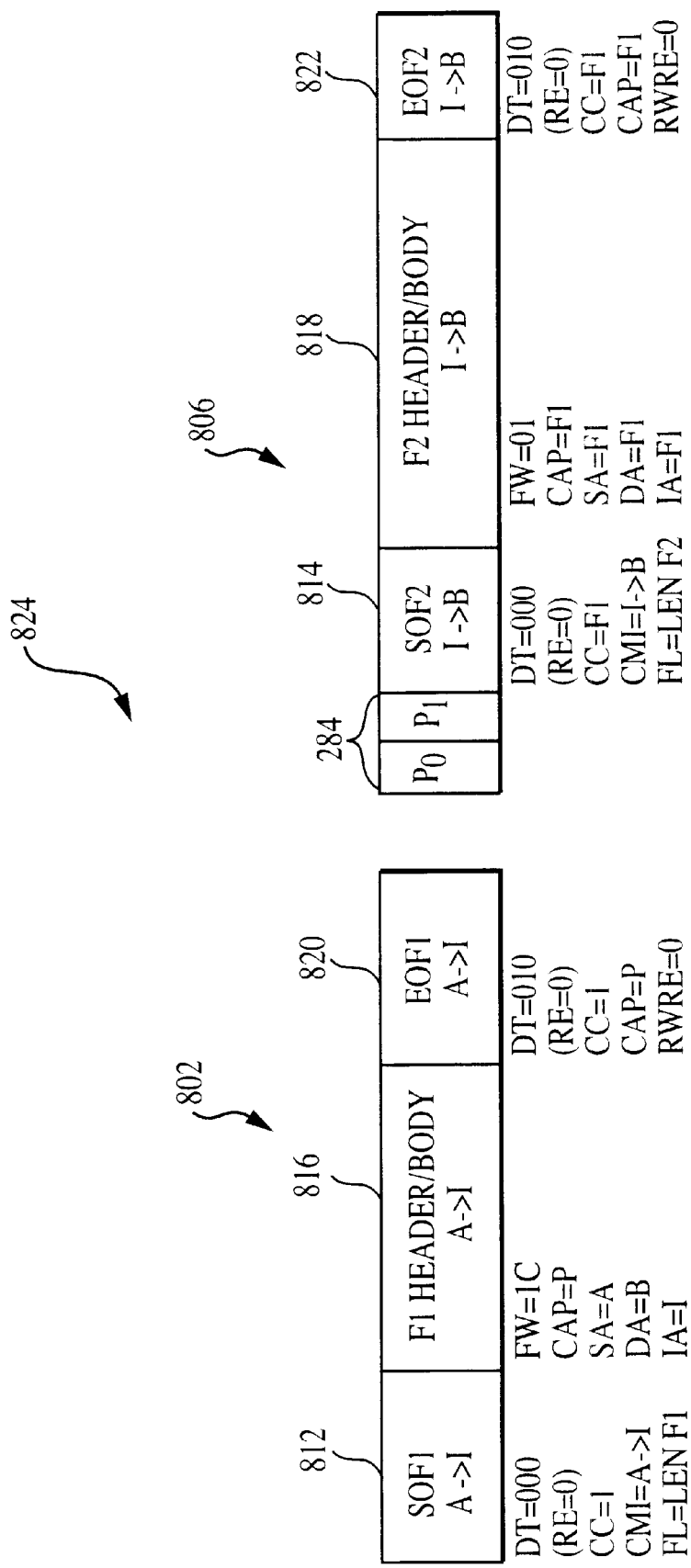
FIG. 41 is a depiction of a forwarding frame structure for frame forwarding without response.

Referring to FIG. 41, a frame forwarding structure for frame forwarding with no response expected 824 (i.e., broadcast) is shown. In this sequence, the SOF delimiter and EOF delimiter fields in both of the frames 802, 806 are set to indicate that response is not expected. That is, the DT field in SOF1 812, SOF2 814 is set to a value of 000 and the DT field in the EOF1 820, EOF2 822 is set to a value of 010. All other field settings are the same as they were for the frames 802, 806 in the frame forwarding structure shown in FIG. 40.

Frequent interruptions may occur during periods of heavy, higher-priority traffic. To prevent other traffic from interrupting during frame forwarding, station A can indicate CAP=3 in the EOF1 820 of the frame 802 to station I, which then uses that CAP value in its response, the response 804. Contention by station A for the medium is based on the actual CAP and CC of the first frame 802 (including signaling in the PRP 284 and decision to interrupt other transmissions). Station I contends based on CAP=3 and CC=1 (which always wins since contention-free was indicated in the first frame). The actual CAP of the frame from station I is restored in EOF2 and the following responses since the original value is sent in Segment Control of both frames. When this technique is used, that is, if the frame has a CAP less than 3 or CC=0, the originating station selects the maximum segment size (in bytes) to ensure that the total time for all frames in the forwarding transmission is less than the maximum allowed frame length (in time) to control latency for higher priority traffic. This can be determined from the information contained in the TX channel map (station A to I) and the Connection Information Response received from station I.

Figure 42:
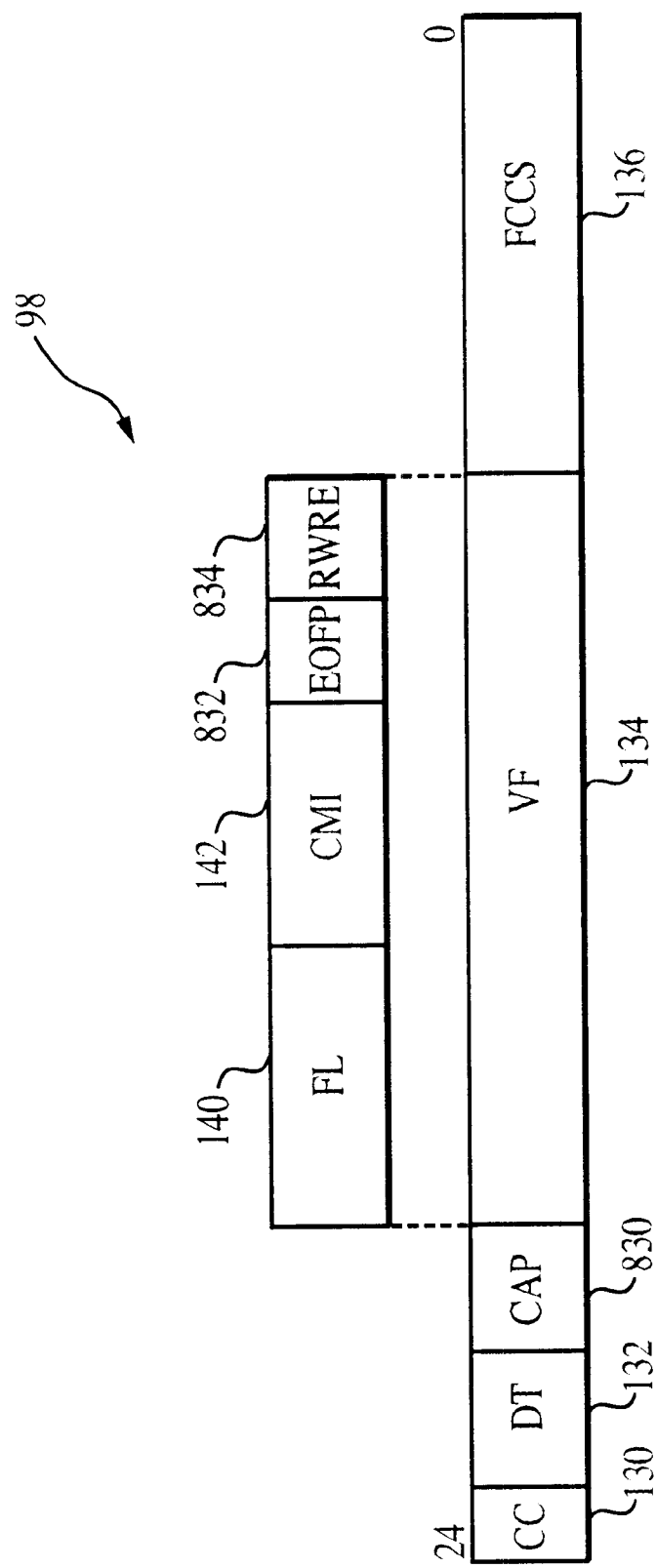
FIG. 42 is a depiction of an alternative start delimiter frame control field format for use in frame forwarding involving frames that do not use end delimiters.

Other embodiments of the frame forwarding mechanism are contemplated. For example, and with reference to FIGS. 42–45, a frame forwarding structure for frame forwarding with reduced-overhead is achieved by eliminating each of the EOF delimiters 820, 822 and modifying each of the SOF delimiters 812, 814 to convey information that had been present in the EOF delimiters. Referring to FIG. 42, the SOF delimiter frame control field 98 (FIG. 98) can be modified by shortening each of the FL and FCCS fields (fields 140 and 136, respectively) by 2 bits to make 4 bits available for use, and using those available 4 bits to add an SOF CAP field 830 (2 bits), a 1-bit EOFP field 832 for indicating, when set, the presence of an EOF in the frame and a 1-bit SOF RWRE (Response with Response Expected) field 834, which, when set, indicates that two responses are to follow.

Figure 43:
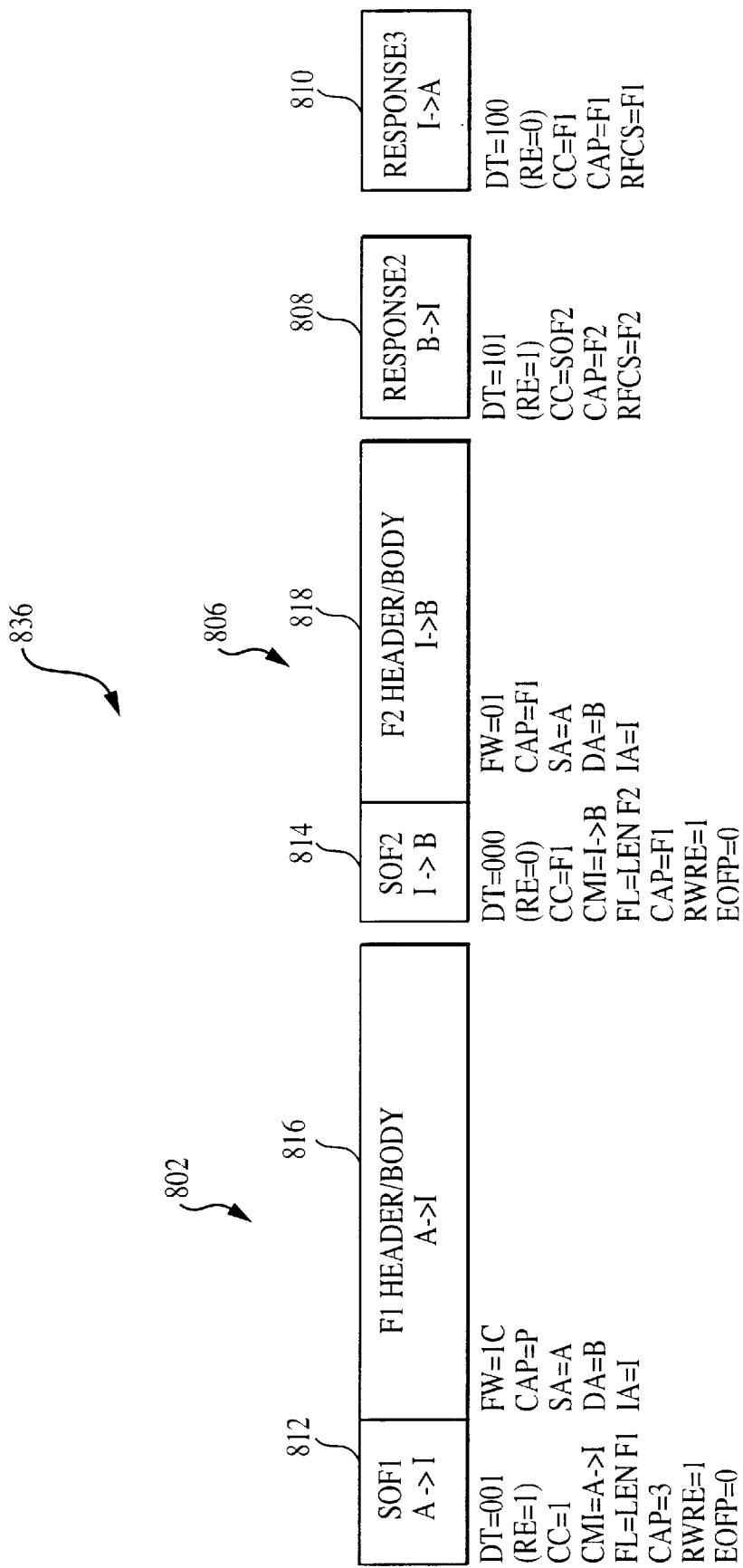
FIG. 43 is a depiction of a forwarding frame structure that uses the start delimiter frame control field of FIG. 42 for frame forwarding with response only after a frame forwarding frame.

In this reduced-overhead scheme, and referring to FIG. 43, a frame structure for frame forwarding with response only after the last frame 836 is shown. The station A sends a frame in which the SOF delimiter indicates that a response is expected, and has the following settings: CAP=3, CC=1, EOFP=0, RWRE=1 and DT for response expected. The settings indicate that the first frame 802 is to be forwarded with the second frame 806 that is sent in place of the response to the first frame 802 (if an ACK would otherwise be returned), no PRP is to occur after the first frame and two responses (the RWR responses 808 and 810) are expected at the end of the second frame 806. The FW in the Segment Control 106 of the first frame 802 is set to 0b01 or 0b11 based on the value of CC for the first frame 802. No stations can interrupt the transmission of the second frame 806 as CAP=3 and CC=1 and there is no PRP present. If the station I receives the first frame 802 correctly and would otherwise send an ACK, the station I sets the SOF2 delimiter 814 to indicate that no response is expected and RWRE=1 (thus conveying that two responses will follow the second frame. The second frame 806 also uses the CAP and CC values received the Segment Control field 106 in the first frame 802, and sets the EOFP=0 and FW=b01. The station I re-computes the FCS and sets the SOF2 to indicate that no response is expected before it transmits the second frame 806. The station A detects the SOF2 814 of the second frame 806 transmitted by the station I and infers an ACK. The station B returns the first of the two RWR responses, i.e., the response 808, with CC set to the value received in the SOF2 delimiter 814, and CAP and RFCS set to the values received in the second frame 806. The station I returns the second of the two RWR responses, that is, the final response 810, in which the CAP, CC and RFCS values are the same as the values received in the first frame 802. To control latency, the overall transmission time including the responses 808, 810 is limited to the maximum allowed frame length (in time). Note that there is no PRP between the frames since a response is expected and the second frame is substituted in the place of the response.

Referring to FIG. 44, a frame forwarding structure for forwarding a response only after the last frame, with a NACK or FAIL after the first frame 838, is shown. The first frame 802 is transmitted in the same manner as that described above with reference to FIG. 43; however, in this example, the first frame of the frame forwarding fails. Thus, the response 804 is transmitted immediately after the first frame to indicate the failure of the frame forwarding. In the response 804, the ACK field is set to 0 to indicate that a response other than an ACK is being returned, and the value of FTYPE appropriately reflects the type of other response (NACK or FAIL).

Still using the reduced-overhead frame format and referring to FIG. 45, a frame forwarding structure for frame forwarding with no response 840 is shown. In this structure, the first frame 802 is a frame for which no response is expected and is forwarded by setting the SOF1 delimiter 812 with response expected (DT=001) and RWRE=0. The station I transmits the second frame 806 in place of the expected response to the first frame 802 if an ACK would otherwise be sent. In the second frame 806, the SOF2 delimiter 814 indicates that no response is expected and that RWRE=0. Consequently, no responses are transmitted after the second frame 806 and the PRP (not shown) immediately follows. Although not shown, it will be appreciated that a response like the response 804 with settings for a NACK or FAIL (as shown in FIG. 43) would be returned after the first frame (in lieu of the second frame 806) if the first frame fails.

Figure 46:
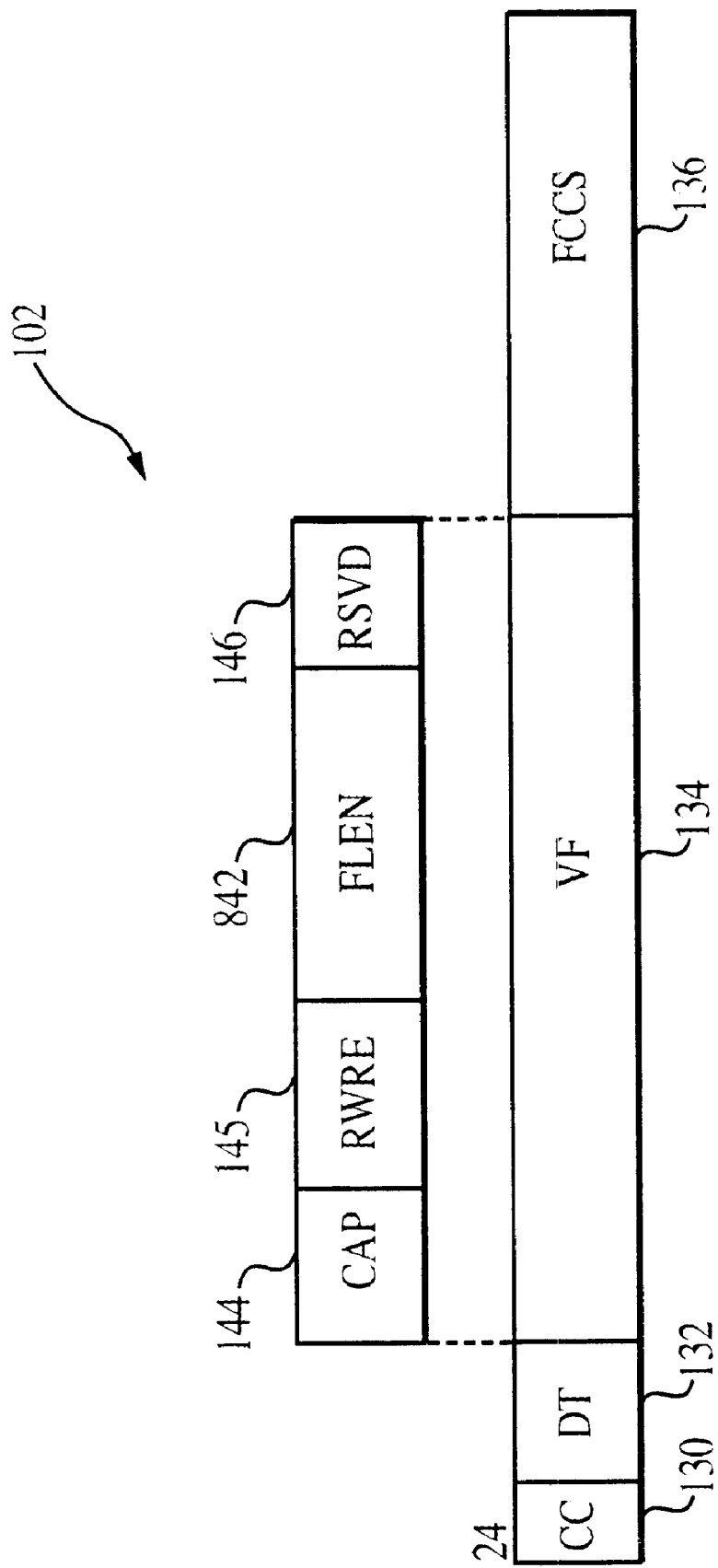
FIG. 46 is a depiction of an alternative end delimiter frame control field format having a frame length field for specifying the length of a second frame in a frame forwarding scheme.

In yet another alternative embodiment, in which the EOF delimiter is used, and referring to FIG. 46, the EOF delimiter 102 is modified by shortening the RSVD field 146 to accommodate a new length field (FLEN) 842. The FLEN field 842 indicates the projected length of the second frame 806 to help improve hidden station (node) performance. Station A would have a reasonable estimate for FLEN based on the connection information received from the station I. Thus, referring briefly to FIG. 40 in conjunction with FIG. 46, the EOF1 delimiter could be formatted to include the FLEN field 832 and the FLEN field 832 would be set with the value of length of the second frame 806 (or, using the short-hand notation of FIG. 40, FLEN=Len F2).

The normal backoff procedure is executed by station A in the case where station A does not receive (or infer) an ACK after the first frame 802 and/or the second frame 806. A particular access attempt is completed early when a NACK, FAIL, or no response is received (i.e. ACK is not received or inferred) after the first frame.

Intermediate station resources (i.e., a receive buffer) must be available for a station to receive any frame that may be intended for it. In the case of an intermediate station acting as a relay, no additional receive buffer is required since the receive buffer is immediately emptied (frame retransmitted) and made available before any other traffic can arrive at the station (since the medium will be busy for the duration of the frame to and from the intermediate station). If the frame to be relayed cannot be retransmitted immediately, it will be dropped. A frame may not be able to be transmitted immediately (and is therefore dropped) if the forwarding frame is interrupted by a higher priority, or if the frame is too long to fit in a single segment because of the frame length and current channel map. In the latter case, the station returns a FAIL to the originating station. The reserved bits in FAIL could be used for a REASON field to return a fail reason code (i.e. indicate frame too long to forward) if there is more than one reason to return a FAIL.

Other Embodiments

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of operating in a network of devices connected to a shared transmission medium, wherein a frame is to be transmitted to a plurality of the devices, comprising:
   selecting one of the devices as a proxy for the plurality of devices to which the frame is to be transmitted; and
   indicating in the frame to be transmitted onto the shared medium to the plurality of devices that a response is expected from the proxy but not from each of the plurality of devices.

2. The method of claim 1, wherein indicating comprises: specifying in the frame an address of the selected device as a destination address.

3. The method of claim 2, wherein indicating further includes specifying MAC management information for indicating actual destination addresses of the intended recipients of the frame.

4. The method of claim 2, wherein indicating further includes specifying MAC management information for indicating a group address associated with the actual destination addresses of the intended recipients of the frame.

5. The method of claim 1, wherein indicating includes setting a multicast flag to indicate that the frame is intended for more than one recipient.

6. The method of claim 1, wherein the frame is a multicast frame.

7. The method of claim 1, wherein the frame is a broadcast frame.

8. The method of claim 1, wherein the selected device is a station.

9. The method of claim 1, wherein the selected device is a bridge.

10. The method of claim 1, wherein selecting comprises:
    identifying which of the devices is least likely to receive the frame.

11. The method of claim 10, wherein identifying comprises:
    using channel maps for the devices to determine which of the channel maps supports a lowest data rate.

12. The method of claim 1, wherein selecting comprises:
    randomly selecting the device from among those of the devices that correspond to the intended recipients.

13. The method of claim 1, wherein the device selected as the proxy is one of the plurality of devices to which the frame is to be transmitted.

14. The method of claim 1, wherein the device selected as the proxy is not one of the plurality of devices to which the frame is to be transmitted.

15. In a network having devices connected to a shared medium, wherein a frame is to be transmitted to a plurality of the devices, a medium access control unit in the devices comprising:
    a transmit MAC frame processing unit to select one of the devices as a proxy for the plurality of devices to which the frame is to be transmitted; and
    a PHY frame transmit unit to indicate in the frame to be transmitted onto the shared medium to the plurality of devices that a response is expected from the proxy but not from each of the plurality of devices.

16. The media access control unit of claim 15, wherein the indication includes a multicast flag for indicating that the frame is intended for more than one recipient.

17. The media access control unit of claim 16, wherein further the indication includes MAC management information for indicating actual destination addresses of the intended recipients of the frame.

18. The media access control unit of claim 16, wherein the indication further includes MAC management information for indicating a group address associated with the actual destination addresses of the intended recipients of the frame.

19. The media access control unit of claim 15, wherein the frame is a multicast frame.

20. The media access control unit of claim 15, wherein the frame is a broadcast frame.

21. The media access control unit of claim 15, wherein the selected device is a station.

22. The media access control unit of claim 15, wherein the selected device is a bridge.

23. The media access control unit of claim 15, wherein the transmit MAC frame processing unit includes means for identifying which of the devices is least likely to receive the frame.

24. The media access control apparatus of claim 21, wherein the means for identifying comprises:
    means for using channel maps for the devices to determine which of the channel maps supports a lowest data rate.

25. The media access control unit of claim 15, wherein the device selected as the proxy is one of the plurality of devices to which the frame is to be transmitted.

26. The media access control unit of claim 15, wherein the device selected as the proxy is not one of the plurality of devices to which the frame is to be transmitted.

* * * * *

UNITED STATES PATENT AND TRADEMARK OFFICE
CERTIFICATE OF CORRECTION

PATENT NO. : 6,522,650 B1
DATED : February 18, 2003
INVENTOR(S) : Lawrence W. Yonge, III and Stanley J. Kostoff, II It is certified that error appears in the above-identified patent and that said Letters Patent is hereby corrected as shown below:

Title page,
Item [56], References Cited, OTHER PUBLICATIONS, "Shared Wireless" reference, "cordless" should be -- Cordless --.

Column 4,
Line 37, after "12b", insert -- , --.
Lines 45 and 49, "LAC" should be -- LLC --.

Column 9,
Line 3, after "required", delete the period.

Column 16,
Line 30, after "type", delete the period.

Column 17,
Lines 62-63, after "following", delete the semi-colon.

Column 21,
Tabe 4, line 54, "EGF" should be -- EFG --.

Column 22,
Line 34, "preempted" should be -- pre-empted --.

Column 48,
Line 1, "claim 21" should be -- claim 23 --.

Signed and Sealed this

Sixteenth Day of December, 2003

JAMES E. ROGAN
*Director of the United States Patent and Trademark Office*